US010345764B2

(12) United States Patent
Early et al.

(10) Patent No.: US 10,345,764 B2
(45) Date of Patent: Jul. 9, 2019

(54) INTEGRATED MODELING AND MONITORING OF FORMATION AND WELL PERFORMANCE

(71) Applicants: Rob Early, Houston, TX (US); Oktay Metin Gokdemir, Houston, TX (US); Ian Graham Brown, Houston, TX (US); Christopher J. Freitas, San Antonio, TX (US); Nathan F. Andrews, San Antonio, TX (US); Nicholas J. Mueschke, San Antonio, TX (US); Rhandy Regulacion, San Antonio, TX (US); Eric Thiessen, Houston, TX (US); Coen Smits, Houston, TX (US)

(72) Inventors: Rob Early, Houston, TX (US); Oktay Metin Gokdemir, Houston, TX (US); Ian Graham Brown, Houston, TX (US); Christopher J. Freitas, San Antonio, TX (US); Nathan F. Andrews, San Antonio, TX (US); Nicholas J. Mueschke, San Antonio, TX (US); Rhandy Regulacion, San Antonio, TX (US); Eric Thiessen, Houston, TX (US); Coen Smits, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 367 days.

(21) Appl. No.: 15/057,018

(22) Filed: Feb. 29, 2016

(65) Prior Publication Data
US 2016/0312552 A1 Oct. 27, 2016

Related U.S. Application Data

(60) Provisional application No. 62/269,713, filed on Dec. 18, 2015, provisional application No. 62/153,265, filed on Apr. 27, 2015.

(51) Int. Cl.
*E21B 21/08* (2006.01)
*G05B 13/04* (2006.01)
(Continued)

(52) U.S. Cl.
CPC ............ *G05B 13/041* (2013.01); *E21B 41/00* (2013.01); *E21B 43/00* (2013.01); *G05B 13/048* (2013.01)

(58) Field of Classification Search
None
See application file for complete search history.

(56) References Cited

U.S. PATENT DOCUMENTS 7,963,327 B1   6/2011   Saleri et al.
8,463,585 B2   6/2013   Sun et al.
(Continued)

FOREIGN PATENT DOCUMENTS

WO   2010090825 A2   8/2010
WO   2015077581 A1   5/2015
WO   2015138724 A1   9/2015

OTHER PUBLICATIONS

International Search Report, and the Written Opinion of the International Searching Authority, or the Declaration; PCT/US2016/066951; dated Apr. 10, 2017; 16 pages.
(Continued)

*Primary Examiner* — Robert K Carpenter
(74) *Attorney, Agent, or Firm* — Cantor Colburn LLP

(57) ABSTRACT

A method of performing aspects of an energy industry operation includes simulating an energy industry operation parameter by an analysis module, wherein simulating includes predicting values of the operational parameter via one or more mathematical models of the assembly and a formation region, and estimating an uncertainty range of at least one of the input data and the predicted values of the
(Continued)

operational parameter; generating a performance envelope based on the predicted values and the uncertainty range; generating an operating envelope by the analysis module, the operating envelope prescribing minimum constraints on the operational parameter; during the energy industry operation, receiving real time measurements of the operational parameter by a production performance module, and comparing the measured operational parameter to the operating envelope and the performance envelope; and based on the measured operational parameter being outside the performance envelope, controlling the energy industry operation to adjust the operational parameter.

18 Claims, 42 Drawing Sheets

(51) Int. Cl.
*E21B 41/00* (2006.01)
*E21B 43/00* (2006.01)

(56) References Cited

U.S. PATENT DOCUMENTS

| | | | |
|---|---|---|---|
| 8,676,721 B2 * | 3/2014 | Piovesan | G06Q 10/00 706/11 |
| 8,892,412 B2 | 11/2014 | Ghayour et al. | |
| 2007/0005253 A1 | 1/2007 | Fornel et al. | |
| 2011/0186353 A1 | 8/2011 | Turner et al. | |
| 2014/0324521 A1 | 10/2014 | Mun | |
| 2014/0376710 A1 | 12/2014 | Shaffer et al. | |
| 2016/0164732 A1 | 6/2016 | Suerbaum | |
| 2016/0187508 A1 | 6/2016 | Plost et al. | |
| 2016/0253767 A1 | 9/2016 | Langenwalter et al. | |
| 2016/0312608 A1 | 10/2016 | Brown et al. | |
| 2017/0177761 A1 | 6/2017 | Early et al. | |

OTHER PUBLICATIONS

Mohaghegh, et al.; " Top-Down, Intelligent Reservoir Modeling of Oil and Gas Producing Shale Reservoirs; Case Studies"; INt. J, Oil, Gas and Coal Technoloigy vol. 5, No. 1, 2012; 12 pages.

Vera, et al.; "Describing Shall Well Performance Using Transient Well Analysis"; May 2014; Retrieved from the Internet; URL: http//www.spe.org/enprint-article/?art=537, 5 pages.

Oil States, Oil States Industries, Inc;"Transforming the Equipment or the Device by at least One of Repairing, Modifying, and Replacing the Equipment or the Device for any Production Well Identified as Under-Performing in Order to Improve Performance"; 2017; 6 pages.

* cited by examiner

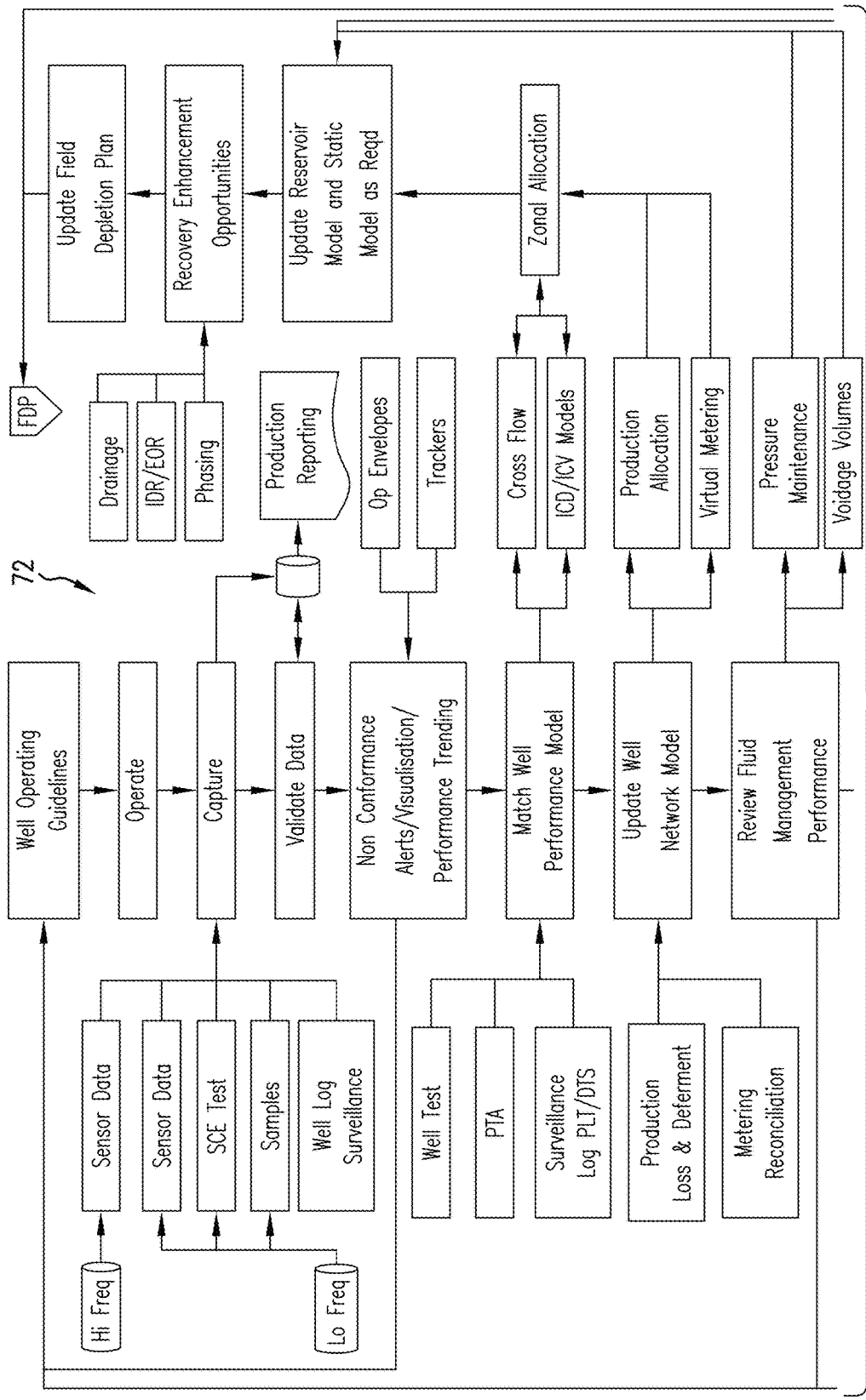
FIG. 16A          Continued on FIG.16B

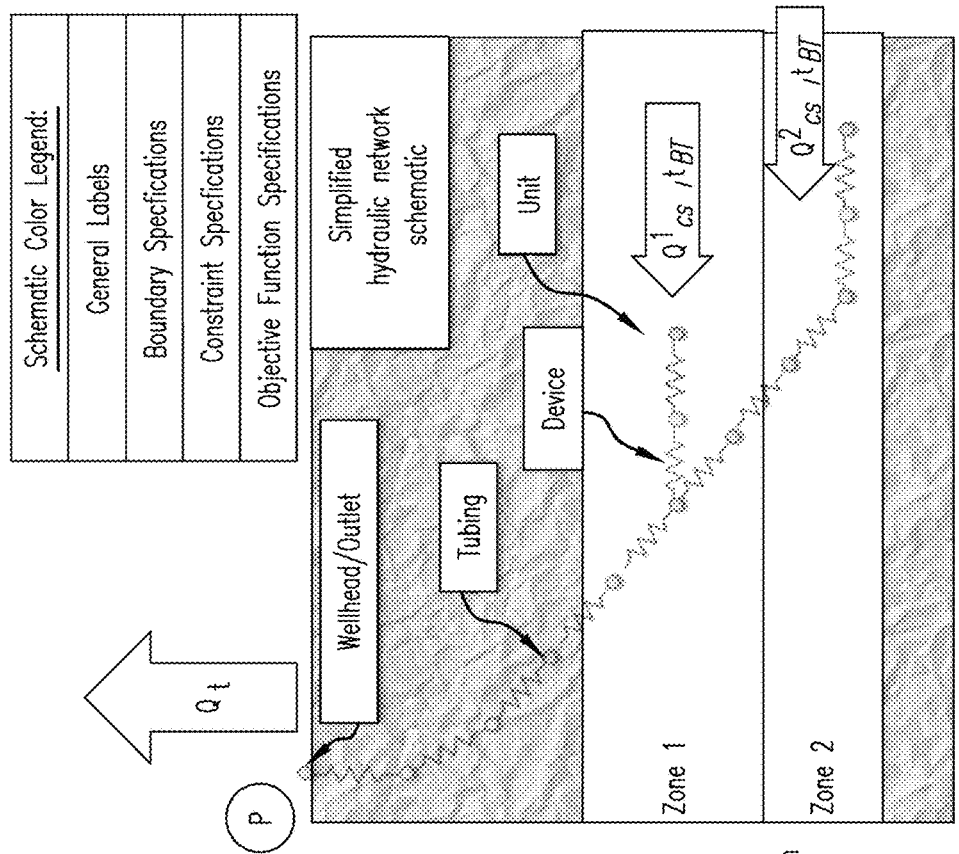

- Objective function model form:
  - Maximize: $\sum_m (Q_{sc}^m)$
    - This function is only valid on a total system basis.
    - Note that C3D/CENTAUR actually solves for the minimum of the negative objective function: $\sum_m (-Q_{sc}^m)$
    - Flow rates are in units of $Sm^3/s$ (surface volumetric conditions)
    - Recall that the relationship between flow in different units is
    $$Q_{sc}^m = \frac{Q_{res}^m (Rm^3/s)}{B_{o,Pres}^m} = \frac{\dot{m}^m}{\rho_{Pres}^m B_{o,Pres}^m}$$
  - With constraints defined on a system basis (as opposed to per unit basis of OPT-OF-4):
    - $t_{BT}^m < t_{BT,target}^m$
- Application requirements for a fully constrained system:
  - Boundary conditions
    - Valid for systems with *prescribed tubing* well head pressure as boundary condition specification
    - There is currently no objective function for systems with prescribed total system flow rate.
  - Required inputs —
    - Specification of the system breakthrough constraints.

FIG. 27

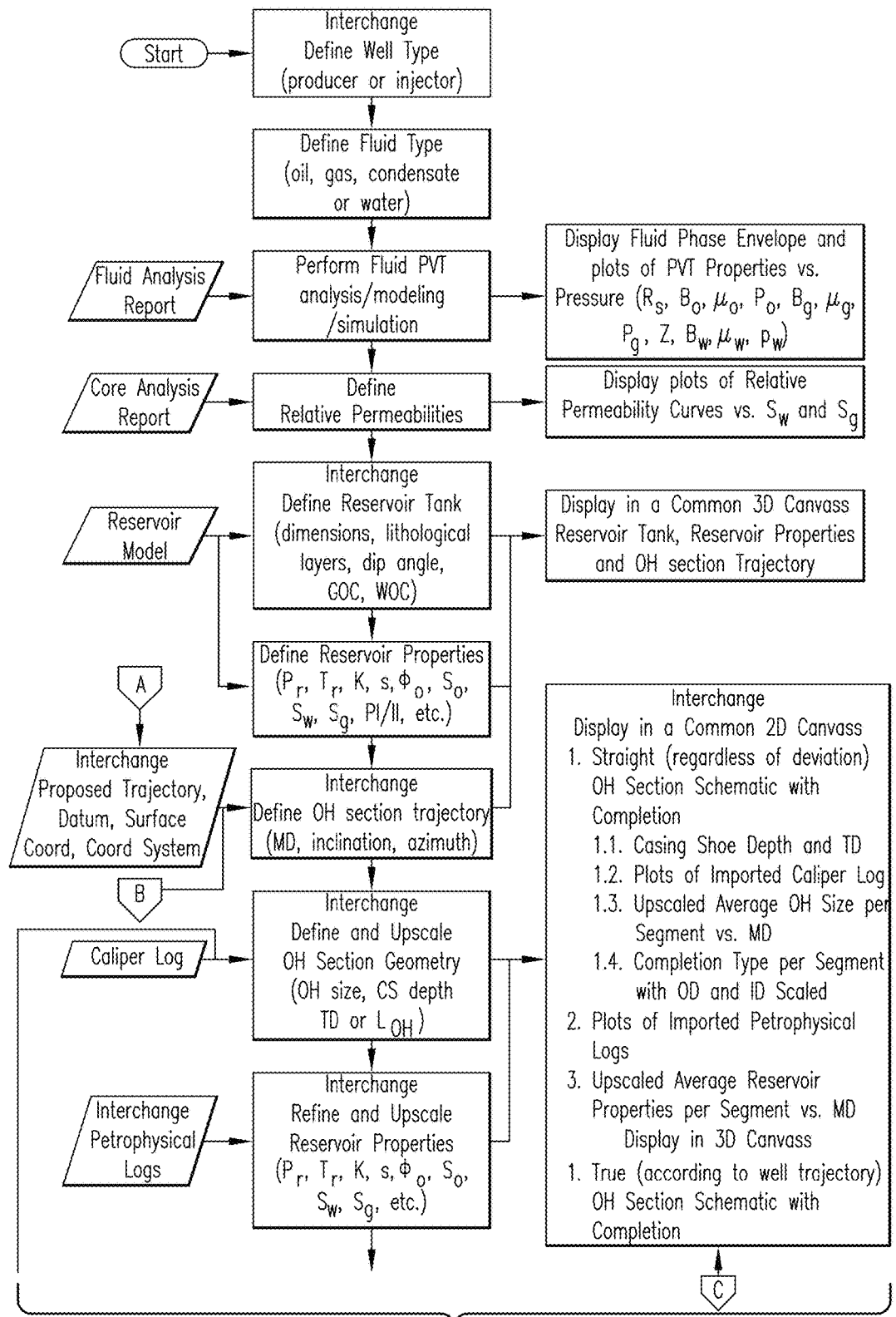
FIG.29A  Continued on FIG.29B

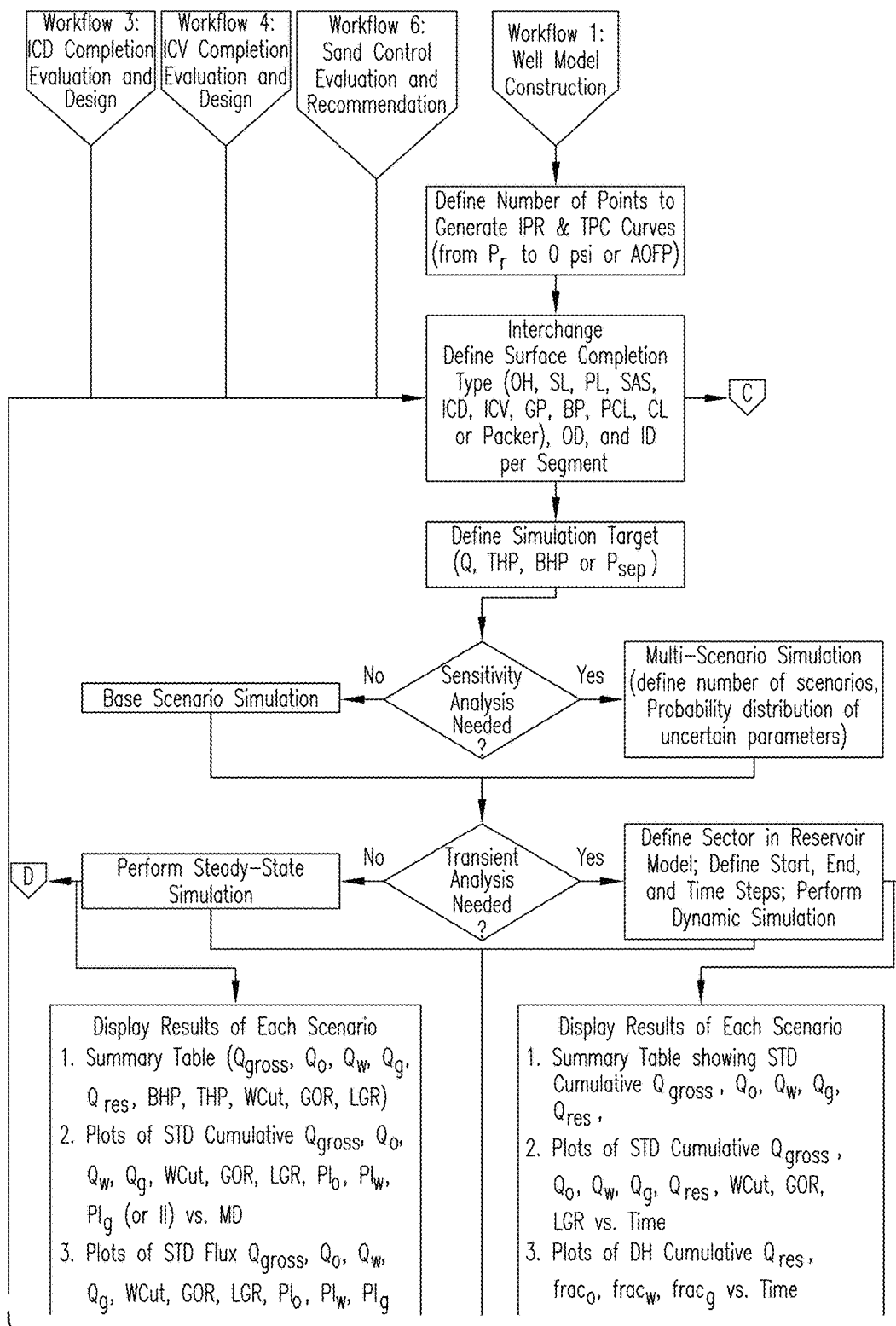
FIG.30A  Continued on FIG.30B

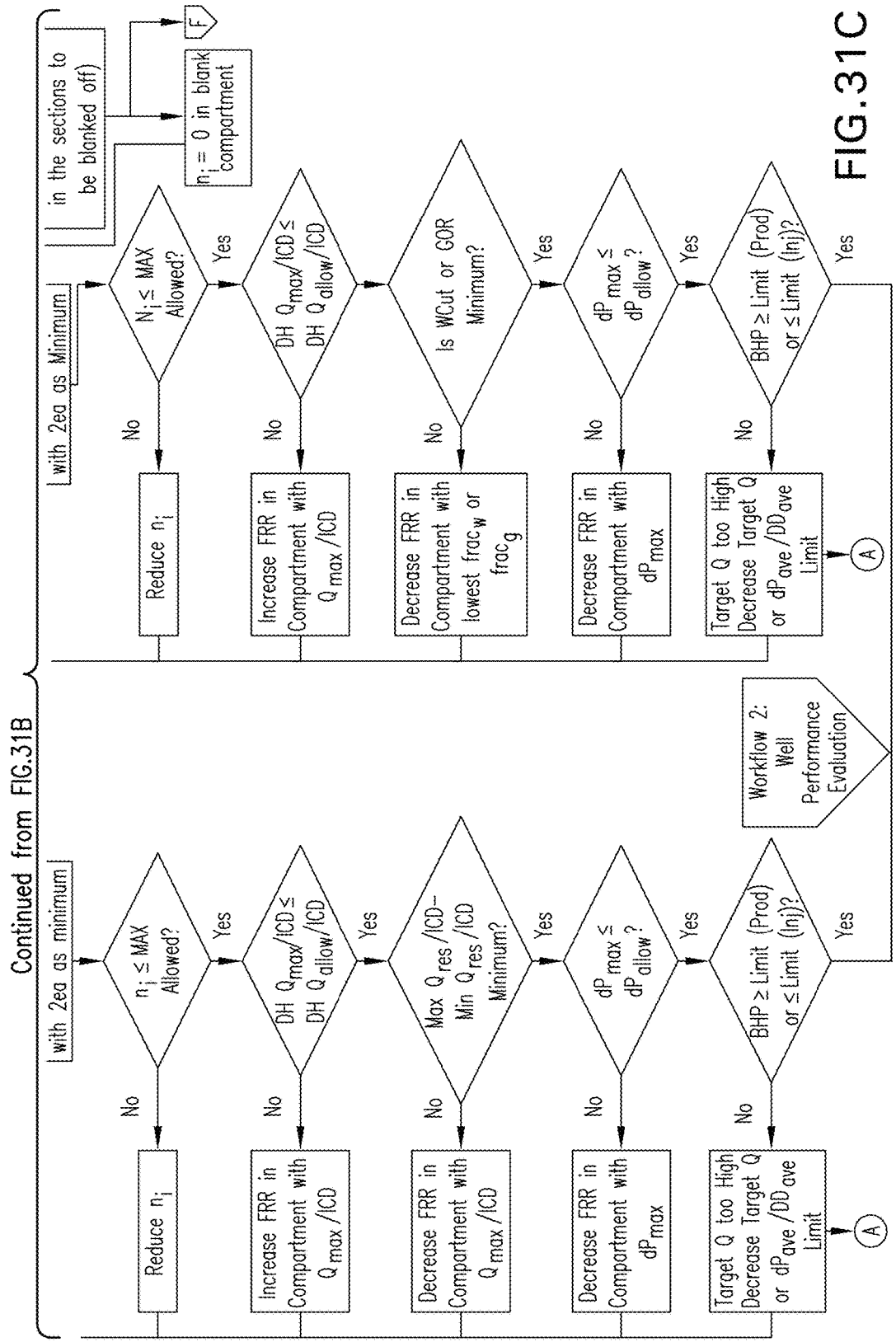

INTEGRATED MODELING AND MONITORING OF FORMATION AND WELL PERFORMANCE

CROSS REFERENCE TO RELATED APPLICATIONS

This application claims the benefit of an earlier filing date from U.S. Provisional Application Ser. No. 62/153,265 filed Apr. 27, 2015, the entire disclosure of which is incorporated herein by reference. This application also claims the benefit of an earlier filing date from U.S. Provisional Application Ser. No. 62/269,713 filed Dec. 18, 2015, the entire disclosure of which is incorporated herein by reference.

BACKGROUND

Oil and gas resources are becoming more challenging and expensive to develop. This challenge can be best demonstrated in the deepwater developments around the world (e.g., Gulf of Mexico, West Africa, and Brazil) where the high cost environment and pressures on cycle time and reservoir complexity have resulted in more reservoir characterization uncertainty being carried over in to the development phase. Operators are seeking more efficient work practices and enhanced analysis techniques to provide greater assurance that reservoir and well performance ranges are fully described and characterized and that risks can be mitigated.

BRIEF SUMMARY

An embodiment of a method of performing aspects of an energy industry operation includes: receiving input data at an integrated analysis system, the input data describing an assembly for performing the energy industry operation, the integrated analysis system including an analysis module and a production performance module; simulating the energy industry parameter by the analysis module, wherein simulating includes predicting values of the operational parameter via one or more mathematical models of the assembly and a formation region, and estimating an uncertainty range of at least one of the input data and the predicted values of the operational parameter; generating a performance envelope based on the predicted values and the uncertainty range, the performance envelope prescribing a preferred range of operational parameter values; generating an operating envelope by the analysis module, the operating envelope prescribing minimum constraints on the operational parameter; during the energy industry operation, receiving real time measurements of the operational parameter by the production performance module, and comparing the measured operational parameter to the operating envelope and the performance envelope; and based on the measured operational parameter being outside the performance envelope, controlling the energy industry operation to adjust the operational parameter.

An embodiment of a system for performing aspects of an energy industry operation includes an assembly including one or more components configured to be disposed in a borehole during an energy industry operation, a sensor configured to measure an operational parameter of the energy industry operation, and a processing device configured to perform: receiving input data at an integrated analysis system, the input data describing the assembly, the integrated analysis system including an analysis module and a production performance module; simulating the energy industry parameter by the analysis module, wherein simulating includes predicting values of the operational parameter via one or more mathematical models of the assembly and a formation region, and estimating an uncertainty range of at least one of the input data and the predicted values of the operational parameter; generating a performance envelope based on the predicted values and the uncertainty range, the performance envelope prescribing a preferred range of operational parameter values; generating an operating envelope by the analysis module, the operating envelope prescribing minimum constraints on the operational parameter; during the energy industry operation, receiving real time measurements of the operational parameter by the production performance module, and comparing the measured operational parameter to the operating envelope and the performance envelope; and based on the measured operational parameter being outside the performance envelope, controlling the energy industry operation to adjust the operational parameter.

BRIEF DESCRIPTION OF THE DRAWINGS

The following descriptions should not be considered limiting in any way. With reference to the accompanying drawings, like elements are numbered alike:

FIGS. 25-28 depict aspects of optimizing a downhole component design based on an objective function model.

DETAILED DESCRIPTION

Figure 1:
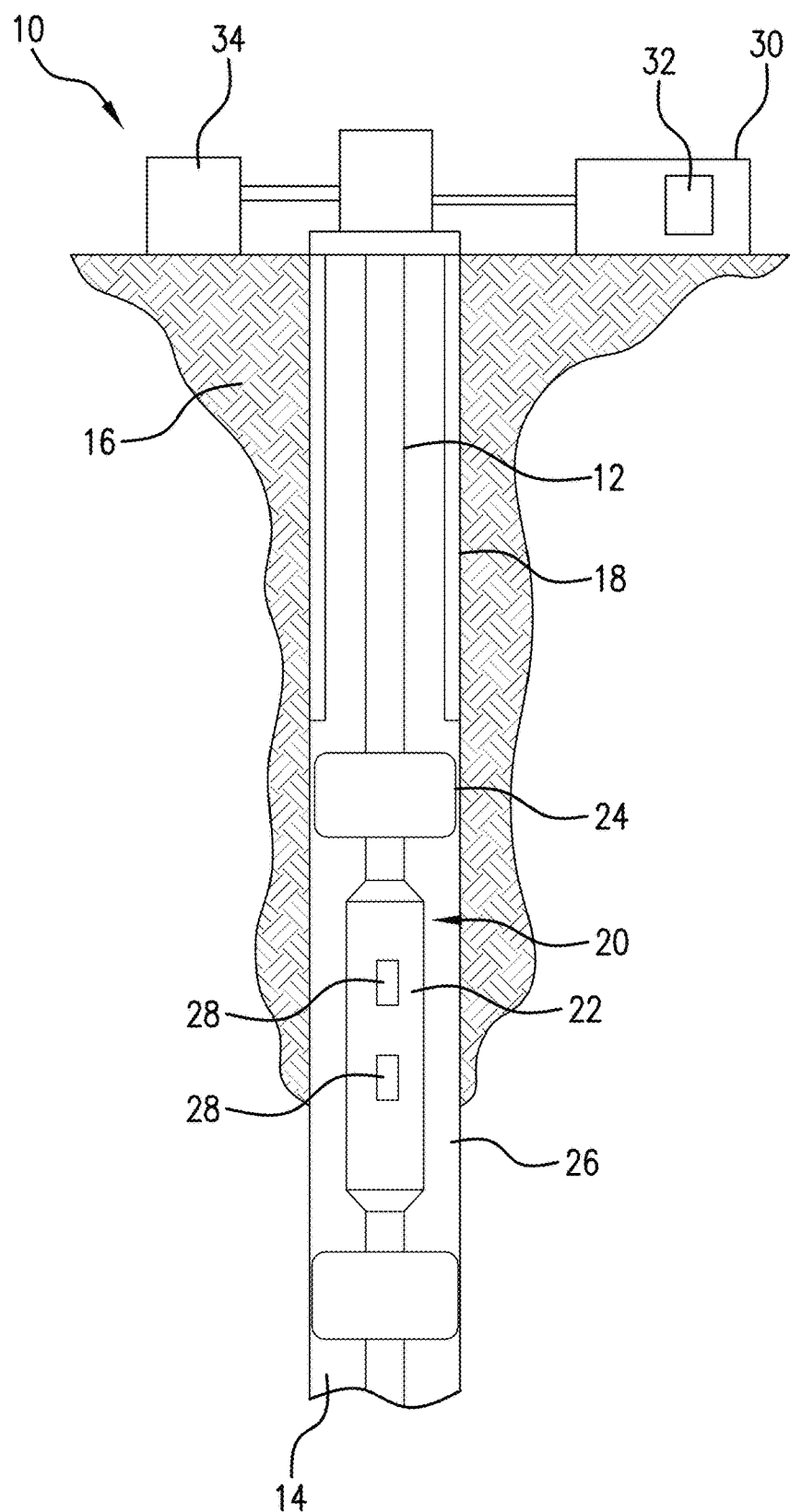
FIG. 1 depicts an embodiment of a hydrocarbon production system.

Systems and methods are described herein that provide for simulation, modeling and evaluation of a downhole environment. An embodiment of a processing system includes an integrated suite of programs and/or processing modules for modeling and simulation of various aspects of a downhole environment, including modeling downhole components such as completion hardware, modeling characteristics of a formation (e.g., multi-phase inflow performance and other aspects of development), performing uncertainty analysis and performing optimization analysis. The systems and methods are applicable to a variety of energy industry systems, such as production wells and injection wells.

Embodiments described herein address current model shortcomings and allow production engineers and other users to model and predict complex nonlinear near wellbore inflow performance with rigour and fidelity to provide improved confidence in performance predictions, supporting product sales, engineering design decisions and operational analysis.

In one embodiment, an integrated processing system is provided that allows a user to access and interface one or more of a variety of simulation and analysis modules, including a formation modeling module, a downhole component design and modeling module, an economics screening module, an uncertainty analysis module, a performance optimization or enhancement module, and an interface module.

The formation modeling module is configured to estimate formation properties based on one or more formation models, such as a near wellbore inflow performance model, a local wellbore simulator, an extended wellbore simulator, a flow control device simulator, and other simulation or modeling algorithms or programs that utilize analytical and/or numerical models. It is noted that a module may represent a single processing unit or configuration, or represent multiple processing modules or devices.

The integrated processing system may be used to execute predictive methodologies based on sets of mathematical models and solution methods which allow for investigating and analyzing through computational simulation the near wellbore region and its characteristics as a function of time and space, and allow for designing and assessing well performance and predicting future operational states. The system also provides for outflow performance modelling and artificial lift methods to enhance performance.

The associated methods and the associated resulting software are applicable to a range of completion types, fluid characteristics, reservoir characteristics, and well operational states. These models and methods may be incorporated into a functional design tool which can be specific to each subsurface environment and conditions, and can aid completion/production engineers during completion design, evaluation, and operation assessments and evaluations.

In one embodiment, the system is a workflow driven system providing an integrated approach aligned with the completion (or other downhole components) design process, taking into account various considerations such as reservoir performance risks, data uncertainties, equipment selection and life of well performance expectations, and costs to optimize design decisions and establish safe operating guidelines. Integrated workflows are provided that can provide options and/or guide a user through various processes, such as near wellbore modeling, borehole modeling, completion design and/or other component modeling, optimization of hardware design and/or operational parameters.

In one embodiment, the system is configured to generate, store and/or present a variety of hierarchical workflows that can be accessed, selected, customized and/or created by a user. The workflows are used by the system and/or a user to execute a hierarchical methodology that includes generating analytical or semi-analytical engineering models that may be applied for quick assessments, and includes more detailed models that the ability to perform multi-dimensional simulations. Such simulations include, for example, flow modeling (e.g., inflow and/or outflow), nonlinear dynamics of a flow field, sand production, transport, filtration, and reservoir failure effects. The multi-dimensional simulations provide capabilities not currently available to the practicing engineer.

The system may include production surveillance and optimization functionality via, e.g., the uncertainty analysis module and the performance optimization or enhancement module, that expands the typical workflow by integrating reservoir and borehole performance monitoring with downhole component modeling, either manually or automatically, to provide predictive, risked based analytics to support effective reservoir and well management planning. In one embodiment, the system is configured to control an energy industry operation (e.g., an injection or production operation) by identifying operational constraints, performing real time performance surveillance, and performing real time validation to ensure that the operation is proceeding within the constraints. The system may also be configured to perform various diagnostics to identify performance enhancement opportunities.

The system closely couples reservoir performance with downhole component (well and completion equipment) performance through an interactive user interface, integrated workflows and common well data sources that allows changing conditions and performance risks to be evaluated with greater speed, and provides greater confidence in forecasting performance predictions. The system provides various benefits, such as enabling engineers to optimize well completion equipment selection decisions matched to life of well performance expectations, thereby reducing capital and operating costs.

Referring to FIG. 1, an exemplary embodiment of a downhole completion and/or production system 10 includes a borehole string 12 that is shown disposed in a borehole 14 (also referred to as a well) that penetrates at least one earth formation 16. In this embodiment, the borehole string 12 is a production string. The borehole 14 may be an open hole or an at least partially cased hole having a casing 18, and may be generally vertical or include a deviated and/or horizontal component. A "borehole string", as used herein, refers to any structure or carrier suitable for lowering a tool through a borehole and/or connecting a tool to the surface, and is not limited to the structure and configuration described herein. A "carrier" as described herein means any device, device component, combination of devices, media and/or member that may be used to convey, house, support or otherwise facilitate the use of another device, device component, combination of devices, media and/or member. Exemplary non-limiting carriers include borehole strings of the coiled tube type, of the jointed pipe type and any combination or portion thereof. Other carrier examples include casing pipes, wirelines, wireline sondes, slickline sondes, drop shots, downhole subs, bottomhole assemblies, and drill strings.

The system 10 includes a flow control tool or device or valve 20 for controlling flow of fluid from the formation into a completion or production string, controlling fluid flow through the borehole, and/or controlling fluid flow into the formation. In one embodiment, the flow control device 20 operates as an inflow control device. The inflow control device is configured to allow fluids from the formation to enter the production string, and may also serve to filter or remove solids and particulates (e.g., sand) and/or other undesirable materials from the fluids prior to entering the production string. As used herein, the term "fluid" or "fluids" includes liquids, gases, hydrocarbons, multi-phase fluids, mixtures of two of more fluids, water, brine, engineered fluids such as drilling mud, fluids injected from the surface such as water, and naturally occurring fluids such as oil and gas.

The system 10 may also include one or more packers 24 for establishing a production zone 26 that is isolated from the rest of the borehole 14. Any number of production zones 26 can be established, each having one or more flow control devices 28 therein. The flow control device 20, in one embodiment, includes at least one inflow control valve 28 that is controlled at the surface and/or at least one inflow control device (ICD) that is pre-designed to operate downhole without surface control. The flow control device 20 may be or include any suitable valve, choke or other device that can regulate the flow of the fluid into the production string 12. Although the production zone 26 is shown in an open hole portion of the borehole, it is not so limited. For example, the production zone can be cased by a solid or perforated casing or sand exclusion screen.

Formation fluid is produced from one or more production zones (e.g., an upper production zone and a lower production zone) that are established via the packers 24. Various components may be included in the system for facilitating production, such as perforations in the casing and screens to prevent or inhibit solids, such as sand, from entering into the borehole from production zones. The system may also include an artificial lift mechanism, such as an electrical submersible pump (ESP), a gas lift system, a beam pump, a jet pump, a hydraulic pump or a progressive cavity pump, to pump fluids to the surface.

During production, formation fluid from production zones enters an annulus of the borehole 14 and into the production string 12. The flow control device 20 and/or inflow control valves 28 regulate the fluid flow into the production string 12 and may be used to adjust flow of the fluid to the surface. Each valve, choke and other such device in the well may be operated electrically, hydraulically, mechanically and/or pneumatically from the surface.

Various sensors may be placed at suitable locations in the borehole 14 and/or the production string 12 to provide measurements or information relating to downhole parameters of interest. Exemplary sensors include temperature sensors (e.g., a distributed temperature sensing (DTS) system), pressure sensors, flow measurement sensors, resistivity sensors, sensors that provide information about density, viscosity, water content or water cut, and chemical sensors. Density sensors may be fluid density measurements for fluid from each production zone and that of the combined fluid from two or more production zones. Resistivity sensors may provide measurements relating to the water content or the water cut of the fluid mixture received from each production zones. Other sensors may be used to estimate the oil/water ratio and gas/oil ratio for each production zone and for the combined fluid. The temperature, pressure and flow sensors provide measurements for the pressure, temperature and flow rate of the fluid.

For example, one or more production logging tools (PLTs) are incorporated in the production string to measure fluid properties such as flow rate, density, phase velocity, water holdup, pressure and temperature. Other sensors such as permanent downhole gauges (PDGs) may be permanently installed in the borehole to provide acoustic or seismic measurements, formation pressure and temperature measurements, resistivity measurements and measurements relating to the properties of the casing and/or formation. Sensors also may be provided at the surface, such as a sensor for measuring the water content in the received fluid, total flow rate for the received fluid, fluid pressure at the wellhead, temperature, etc. The signals from the downhole sensors may be partially or fully processed downhole (such as by a microprocessor and associated electronic circuitry that is in signal or data communication with the downhole sensors and devices) and then communicated to the surface controller via a signal/data link.

In one embodiment, various components of the system are in communication with a surface processing device or system 30 that includes a processor 32. The surface processing system may be configured as a surface control system that controls various production and/or injection parameters, receives data from downhole and surface sensors, analyzes the data and/or displays measurement data, analysis results and/or prediction or forecasting results. The surface processing system includes components as necessary to provide for storing and/or processing data collected from various sensors therein. Exemplary components include, without limitation, at least one processor, storage, memory, input devices, output devices and the like. Any number of other surface systems or equipment may be included in the system, such as a fluid injection control system 34.

In one embodiment, control valves or other inflow control devices and sensors are disposed downhole in a "smart" or "intelligent" well configuration. Smart well technology involves measurement and reservoir flow control features that are disposed downhole. Installation of downhole active flow control devices (multi-node), inflow control valves, measurement devices (e.g., for pressure, temperature and flow rate), and/or downhole processing facilities such as hydro-cyclones in the borehole allows for active production monitoring and control. Intelligent wells facilitate control of parameters such as fluid flow and pressure, and facilitate periodically or continuously updating reservoir models during production.

Figure 2:
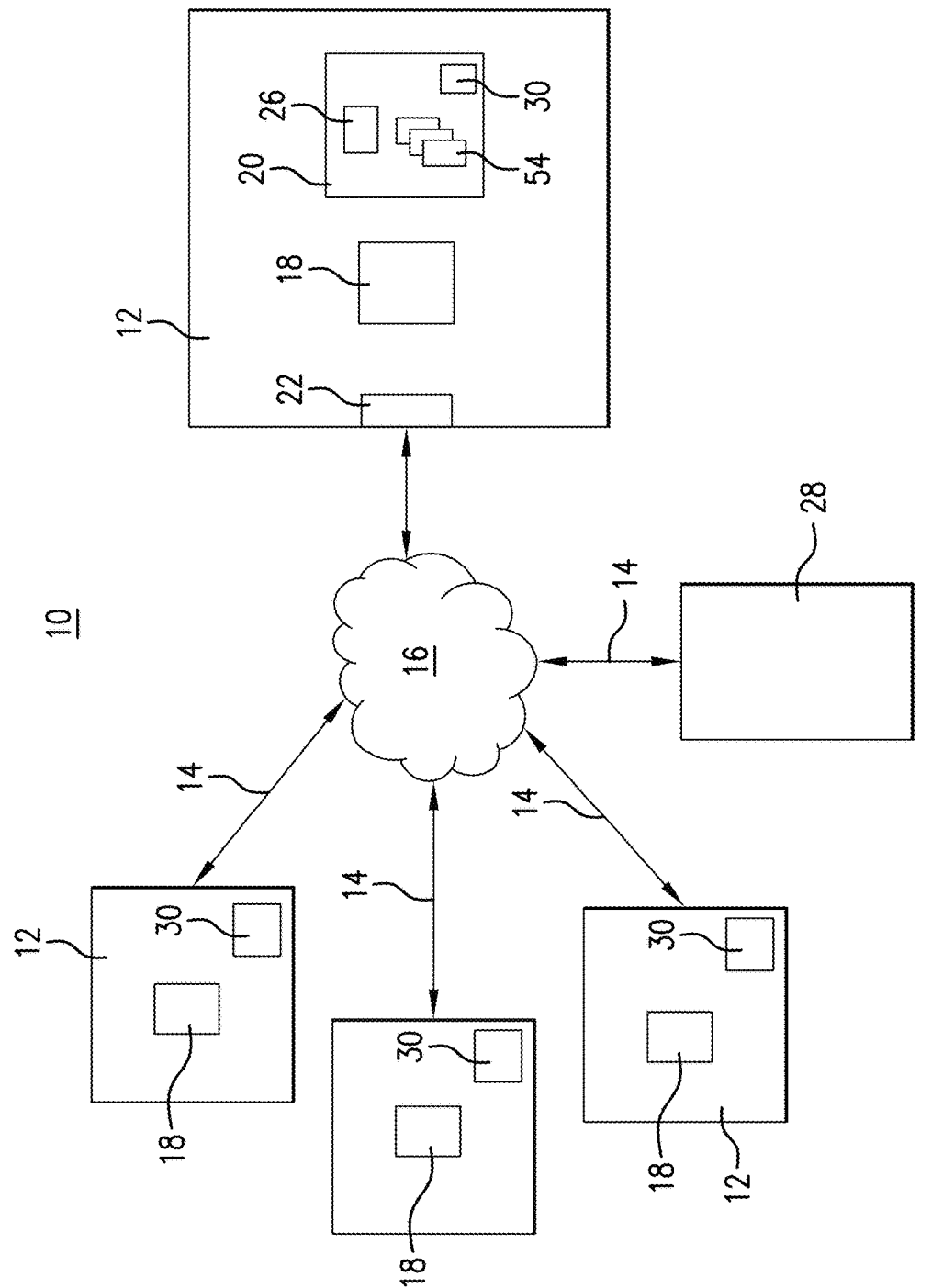
FIG. 2 depicts an embodiment of a processing system.

FIG. 2 is a block diagram of a distributed data storage, processing and communication system 40, which may be used to embody and/or perform the embodiments described herein. The system 40 includes a plurality of processing devices or nodes 42. The nodes 42 each have computing components and capabilities, are connected by links 44, which may be wired or wireless. One or more of the nodes 42 may be connected via a network 46, such as the Internet or an internal network. Each node 42 is capable of independent processing, and includes suitable components such as a processor 48, memory 50 and input/output interface(s) 52. The memory 50 stores data and programs, such as input data from a user or other processors and programs. In one embodiment, the memory 50 stores various processing or program modules 54 for performing aspects of embodiments described herein, which may be incorporated into a program suite. The nodes may be computing devices of varying size and capabilities such as server machines, desktop computers, laptops, tablets and other mobile devices.

In one embodiment, the system includes one or more data storage locations. For example, the system 40 includes a node configured as a database 56. In one embodiment, one or more of the nodes 42 is a host that stores data and communicates with one or more nodes 42 as clients. For example, one or more of the processing devices 42 includes a server that acts as a host computer or host storage device and performs data management and data services functions. An exemplary client/server system or network includes an energy industry data storage and sharing network that is accessible by multiple client devices that can send data to one or more data repositories and retrieve data stored in one or more data repositories.

A processing system, such as the surface processing unit 30, the system 40 and/or the processing device(s) 42, incorporates an integrated suite or system of processing modules or programs that provide various modeling, simulation and analysis services. The system provides methodologies and simulation and/or analysis tools for simulation and analysis of downhole components and a formation region such as a near wellbore environment. The near wellbore environment may include a borehole or portions thereof (e.g., production zones), downhole components deployed in the borehole, and a volume of a formation around the borehole. The system allows for multi-dimensional representation of the physical structure of the near wellbore environment accounting for, e.g., reservoir variability, fracture tunnels, wellbore configuration and hardware, fluid characteristics and properties, and characteristics and transport of sands/particles. In addition to simulation of the physics or mechanics of wellbore functional dynamics, a probabilistic capability may also be incorporated (e.g., as an uncertainty analysis module) to allow for assessment of uncertainties, variabilities, and sensitivities. In one embodiment, the processing system includes a performance enhancement module configured to receive measurement data or other monitoring information during an energy industry operation, and identify performance enhancement opportunities.

Models and computational tools have broad applicability to different downhole configurations (e.g., completion types) and reservoir characteristics spanning from unconsolidated or semi-consolidated rock to hard rock. The system also allows for the addition of new models for different applications or physical processes to be easily incorporated into the system and address the evolving needs or requirements of clients.

There was, and still is, an industry technology gap for advanced predictive methodologies for the design, analysis, and assessment of near wellbore performance. The near wellbore environment is characterized by large pressure drop (drawdown), high fluid velocities, multiphase fluids, widely varying permeability, unconsolidated and damaged reservoir formation, transient formation loads (stresses), and sand transport and filtration (trapping). When designing or analysing specific completions a completions engineer will typically use a variety of independent, simplified semi-analytical tools to predict the characteristics of the well. Unfortunately, these simplified analytic models are typically insufficient to predict the multi-scale (spatial and temporal) inflow characteristics of the well and reservoir structural performance in the near wellbore region. The use of these tools for design and analysis generally leads to overly simplistic analyses of what is a complex nonlinear problem, and often results in poor business decisions due to the inadequate prediction of outcomes and uncertainty ranges.

Embodiments described herein address such insufficiencies by providing methodologies based on mathematical models and solution methods for the near wellbore region that integrates into a single approach the disparate length and time scales of this problem for use by, e.g., completion/production engineers. The methodologies, in one embodiment, are based on sets of mathematical models and solution methods which allow for investigating and analyzing through computational simulation the near wellbore region and its characteristics as a function of time and space, allow for designing and assessing well performance and predicting future operational states, and allow for monitoring production performance and controlling production operations to improve or optimize production. The model forms and methods and the associated resulting software are applicable to a range of completion types, fluid characteristics, reservoir characteristics, and well operational states. These models and methods allow for development of a functional design and/or monitoring tool ultimately specific to each subsurface environment and conditions and capable of aiding completion/production engineers during completion design, evaluation, and operation assessments and evaluations.

Figure 3:
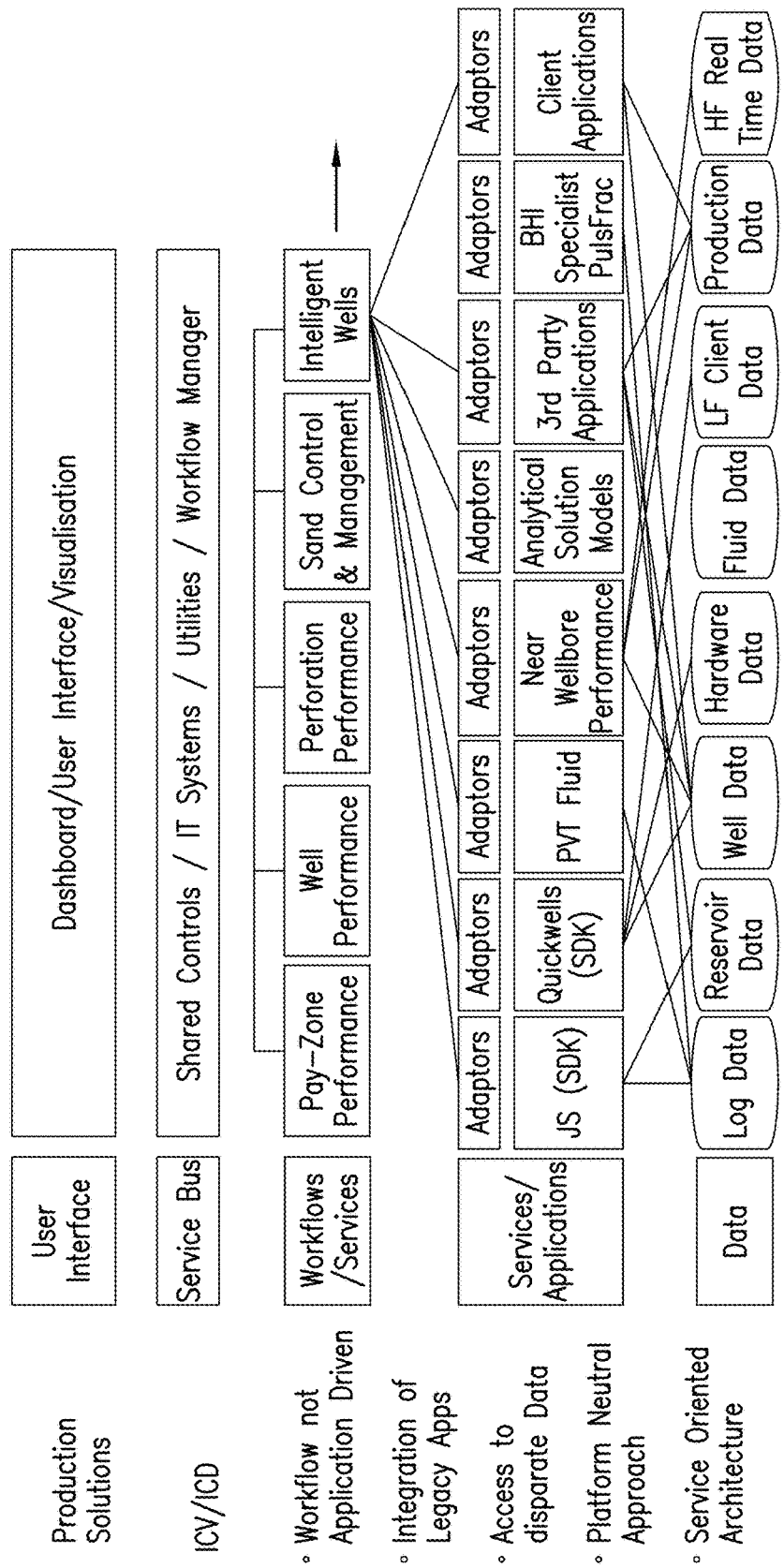
FIG. 3 depicts a processing system including processing modules, workflows and interfaces for performing functions including modeling, simulation and optimization of downhole components and environments.

FIG. 3 illustrates various aspects of an embodiment of the processing system, which provides a user interface that allows a user to visualize results, access and/or create workflows, execute models, simulations and predictions, and perform various processing and analysis methods. Many types of input data may be input to the system, which may be real time data acquired during an energy industry operation and/or stored data (e.g., data stored in the database 56). The system includes a number of services/applications (discussed herein as processing modules) for executing models, simulations and analyses. In one embodiment, the system stores and/or provides tools for the creation of various workflows that can be created and/or accessed by a user to accomplish a variety of functions, such as evaluating well and pay-zone performance, sand control, performance of flow control devices or other components, using the processing modules.

Figure 4A:
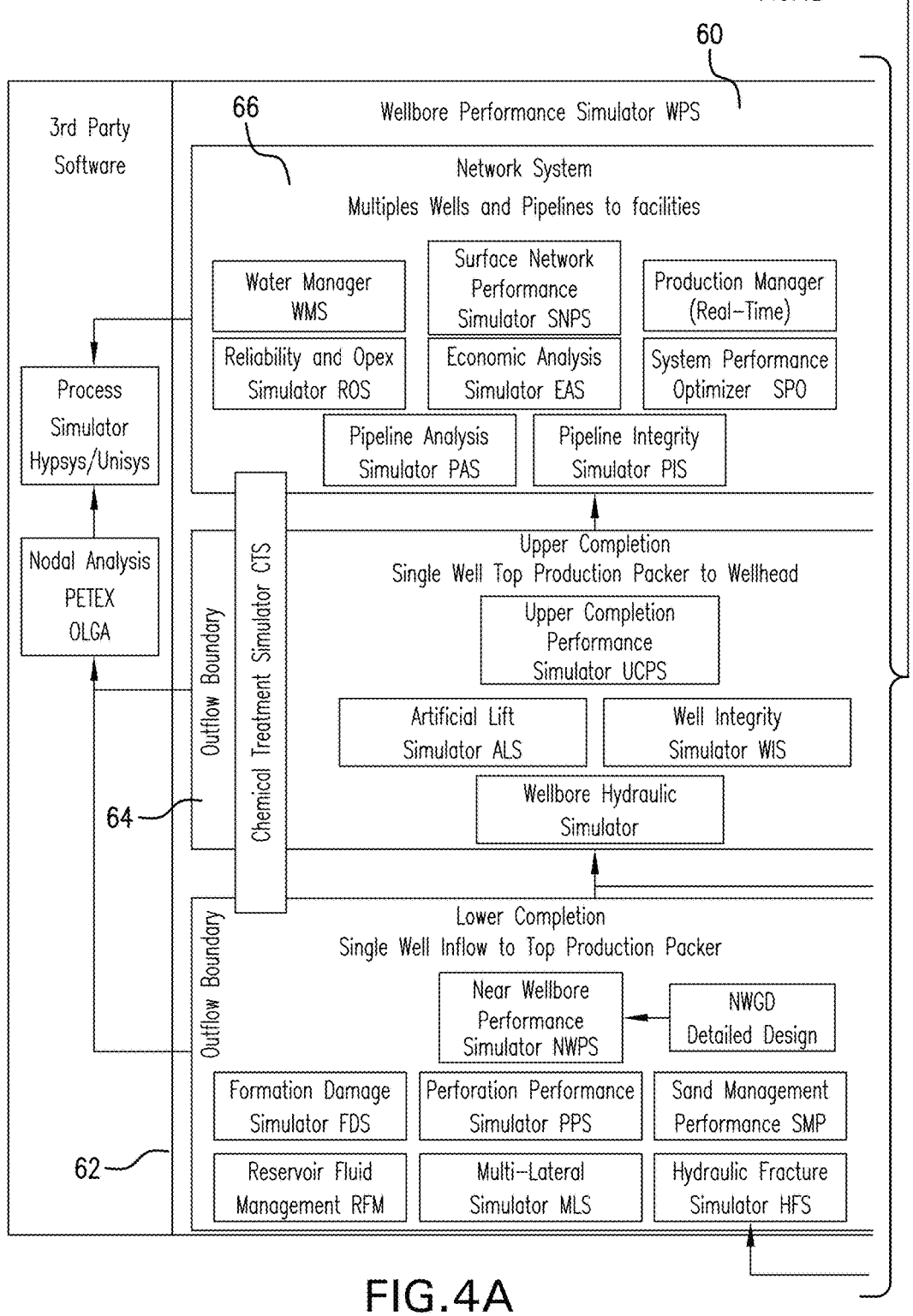
FIG. 4 depicts a processing environment that includes a wellbore performance simulation processing suite.
Figure 4B:
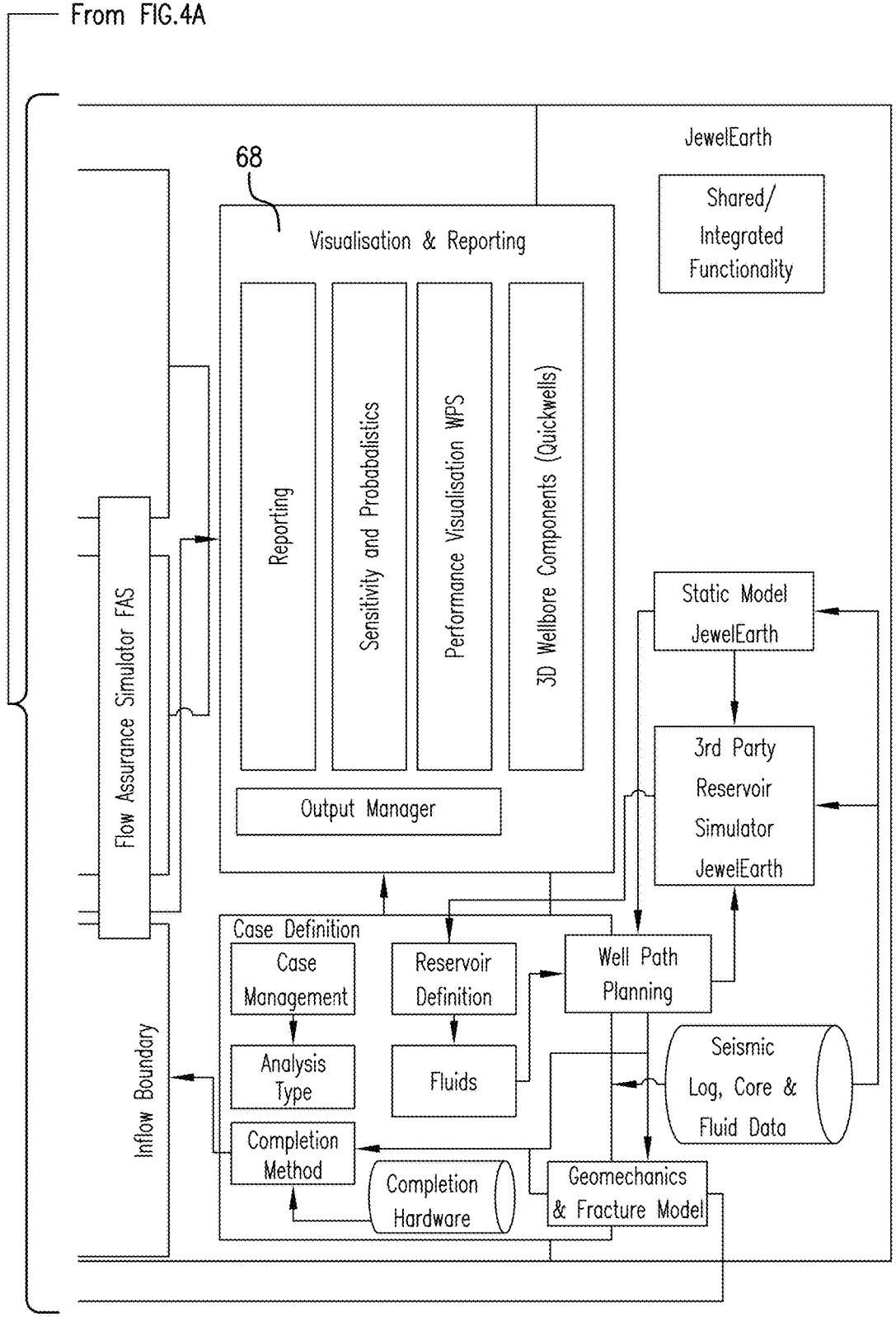

FIG. 4 illustrates aspects of an embodiment of the system, which includes multiple processing modules for simulating wellbore performance, and is denoted as a wellbore performance simulator (WPS) 60. The WPS 60 includes a "lower completion" module suite 62 that includes modules for defining well characteristics, operational characteristics and problems to be solved. The suite 62 provides performance analysis of production zones below a top production packer, and includes modules such as a near wellbore inflow (NWI) simulator, an input module (NWGD) for inputting design information and data (e.g., from a case definition module) into the NWI simulator, and various other simulation modules such as a fluid management module, formation damage simulator, hydraulic fracture simulator and others. An "upper completion" module suite 64 provides for simulation of production of fluids to the surface, and includes modules such as an upper completion performance simulator (UCPS), an artificial lift simulator and a well integrity simulator. A "surface performance" and/or optimization module suite 66 includes various modules for evaluating, performance, equipment integrity and system performance, and for evaluating economic returns. The WPS 60 also includes a visualization and reporting module 68. As shown in FIG. 4, the WPS 60 can connect or interface with various other processors and locations, such as third party software and an energy industry data storage, analysis and/or modeling software program. An example is JewelSuite™ analysis and modeling software by Baker Hughes Incorporated.

Figure 5:
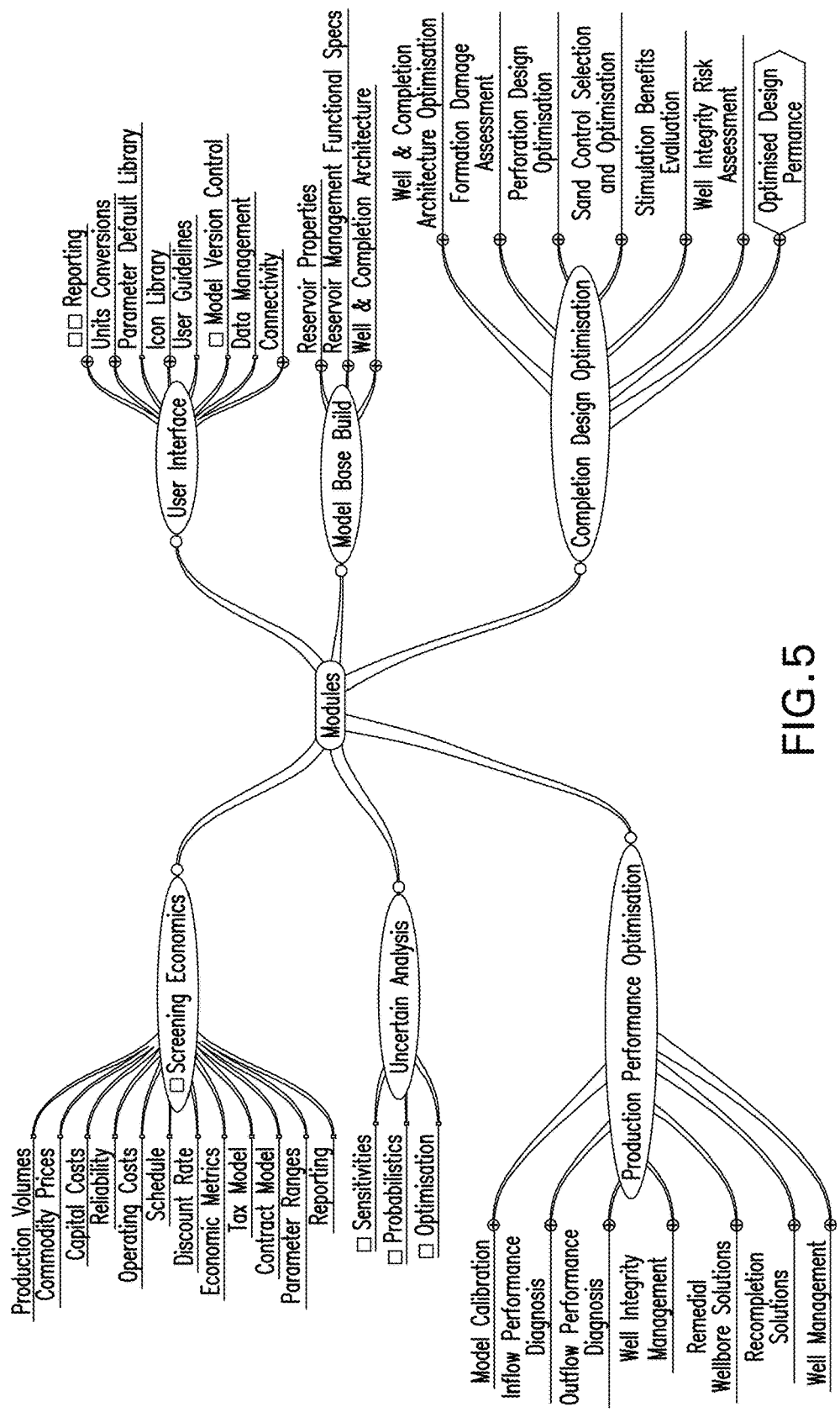
FIG. 5 depicts examples of processing modules and functions performed by each module.

The various modules provide multi-dimensional simulations that provide a state-of-the-art capability not currently available to the practicing engineer, and provide a rigorous platform to simulate well performance down to the perforation scale increasing confidence in performance predictions in order to, e.g., evaluate and optimize completion designs and equipment selection, maximize performance within the multiple constraints of flow, stress and sand filtration, and optimize remedial activities and production operation decisions. FIG. 5 illustrates examples of modules that may be included in the system and functions performed by each module.

An embodiment of the system is a workflow based, integrated system having a plurality of modules for performing analyses such as a life of well analysis. The system provides a hierarchical methodology whereby semi-analytical engineering models may be applied for quick assessments or provide the ability to perform multi-dimensional simulations, capturing the nonlinear dynamics of the flow field, sand production, transport, filtration, and reservoir failure effects. The multi-dimensional simulations provide a state-of-the-art capability not currently available to the practicing engineer.

The system may also incorporate uncertainty analysis methods to examine the sensitivity of results to selected model inputs as well as the ability to perform full probabilistic analyses providing probability distributions for designated inputs, allowing for assessment of uncertainties and suggesting optimal set points for design and operation. In one embodiment, the uncertainty analysis is performed as part of a performance enhancement or optimization method to generate a "performance envelope", which is defined as a range of values of an operational parameter or ranges of values of multiple operating parameters, which are suggested by the system in order to improve or optimize performance, e.g., to improve rates of production fluids (oil and gas), reduce operating times and/or improve efficiency.

The system may also include an interface to external data sources (measured or simulated) as inputs and boundary conditions, and in so doing, the proposed near wellbore methodology will have the ability to unobtrusively fit into a completion/production engineer's overall workflow, and therefore, provide an enhanced integrated functionality unique to the application. For example, the interface can provide access to other sources, systems and programs, such as: links to databases or Completion ArchiTEX™ software by Baker Hughes Incorporated.

The system may employ a number of types of models for simulating or modeling the downhole environment. Numerical and/or analytical models of differing scales may be employed. For example, a small scale model such as a regional influx model provides a simplified model of fluid flux from the reservoir to a simplified wellbore, and may be used in conjunction with interface routines that provide handshaking functionality between larger scale models such as a near wellbore model and a global reservoir model. An example of a small scale model provides a representation of a single perforation tunnel geometry and its associated local environment, and describes fracture or perforation tunnels and the physics of fluid flow through the tunnels.

Larger scale models may be employed, such as a model of an entire borehole, a multi-dimensional model of a production zone or formation, and a global reservoir model. The large scale model may be a three-dimensional model solving the governing equations for liquid fluid flow, heat transport, sand transport/filtration, and modification of the porous media due to local damage, stress failure, and sand filtration.

Large scale models (e.g., simulating an entire wellbore or production zone) may incorporate the small scale models as components. For example, a large scale model may incorporate multiple perforation or production zones or regions. The large scale model simulates liquid-phase fluid flow, which may be a multiphase flow model accounting for a plurality of phases, such as one or more liquid phases (e.g., oil and/or water) and a gas phase.

Additional models and methods may be incorporated. For example, probabilistic methods may be implemented to provide for assessment of hardware reliability, input sensitivity factors, and uncertainties in input data. Examples of additional models include a sand transport model that simulates multiphase transport, and a sand erosion model to simulate the interaction between mobile sand and hardware components such as sand screens. Other models include descriptive models characterizing wellbore string hardware components.

Completion operations and production operations models may be used for assessment of well performance as part of a design phase or a production phase. These models may address a wide spectrum of processes such as the modeling of fracturing treatments, gun system implementations and effectiveness, sensor deployments and prediction of measured data, inflow control device performance, water shutoff treatment techniques (mechanical and chemical), and other evolving technologies.

Various processing modules may be utilized to perform modeling and simulation, such as an extended wellbore grid (XWB) solver, a near wellbore (NWB) solver, a completion modeler and a multiphase flow simulator (backbone). The completion modeling is performed by an integrated solver that incorporates these modules to adequately take into account, e.g., the complex flow conduits encountered in inflow control device and/or inflow control valve completions. The approach uses both the analytical and numerical simulators in conjunction with the optimizer to provide a differentiated model approach to the design and performance optimization of components such as inflow control device (ICD) and inflow control valve (ICV) completion equipment.

FIGS. 6-9 illustrate aspects of embodiments of an energy operation planning, analysis and control method that may be performed by a processing device or system such as the surface processing device 30, one or more nodes 42 and/or the WPS 60. The processing system provides an environment that supports the creation of customizable workflows that can be executed by a processing device and/or used by a user to guide decision-making. For example, a user may follow aspects of workflows to direct execution of various modeling and/or analysis modules of different complexities.

Although embodiments of the method are described in conjunction with a completion system for stimulation and/or production operations, they are not so limited, and may be used with any suitable system for performing various energy industry operations.

Figure 6A:
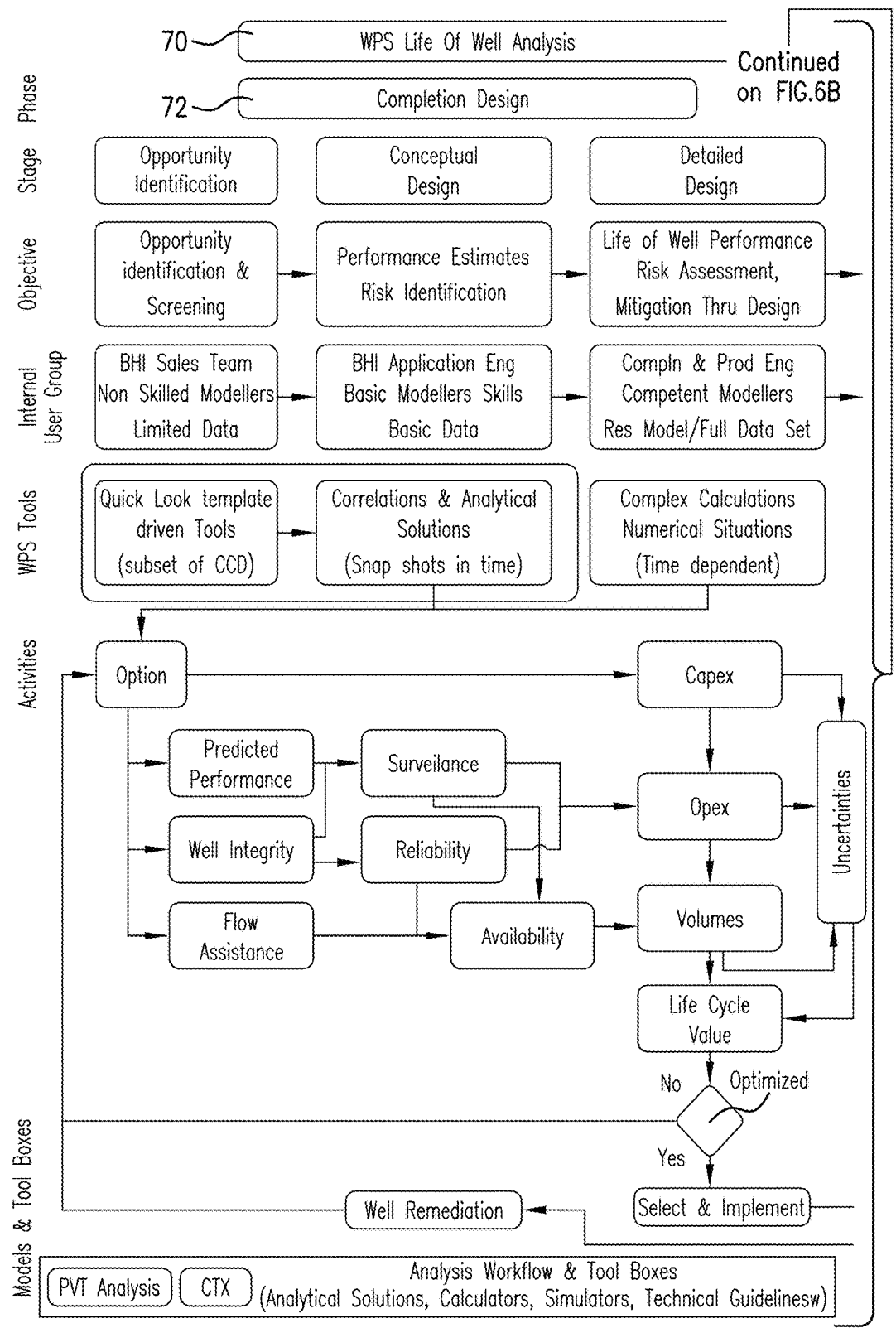
FIG. 6 depicts an example of life of well workflows and processing modules or tools that may be generated or supplied to a user.
Figure 6B:
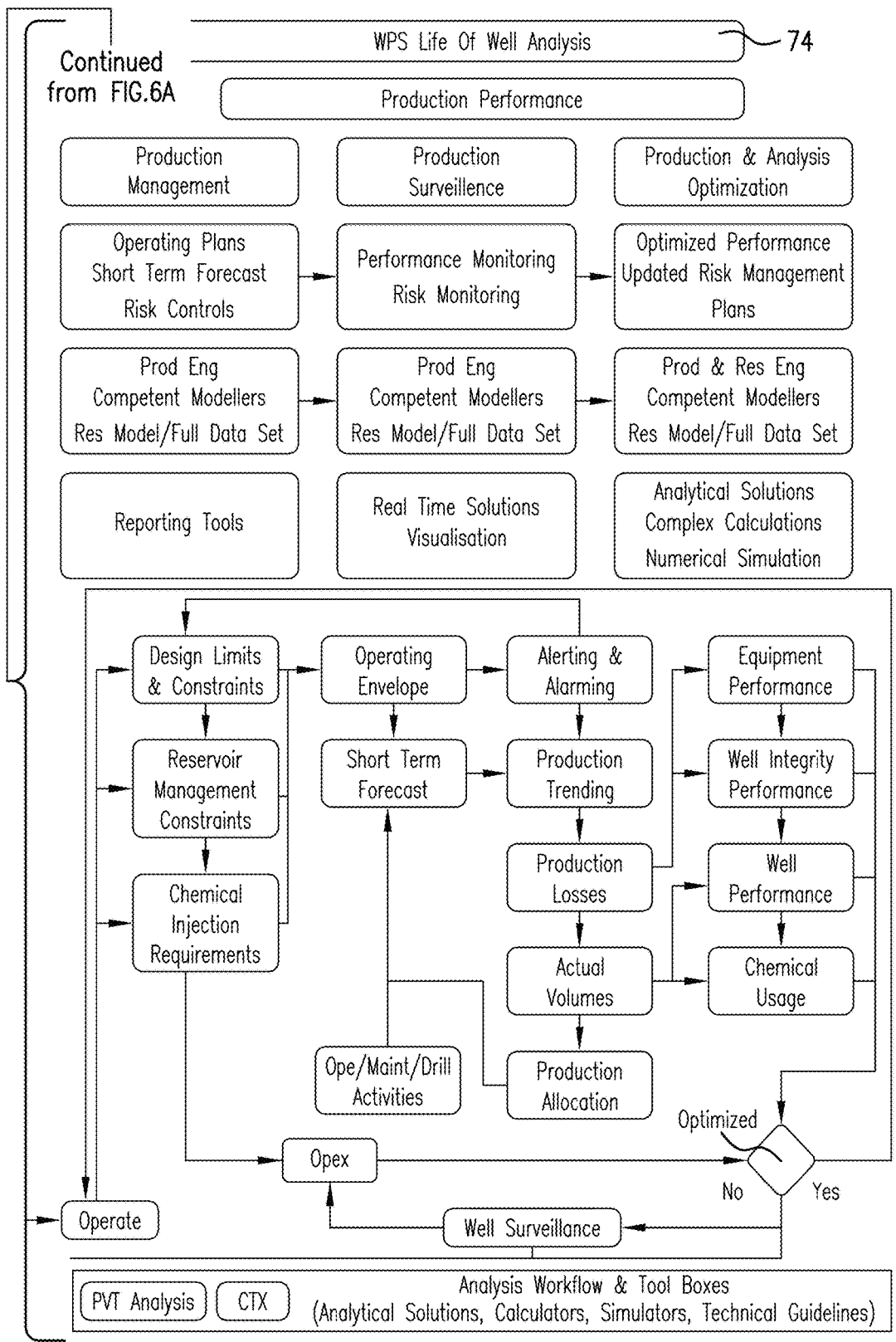
Figure 7:
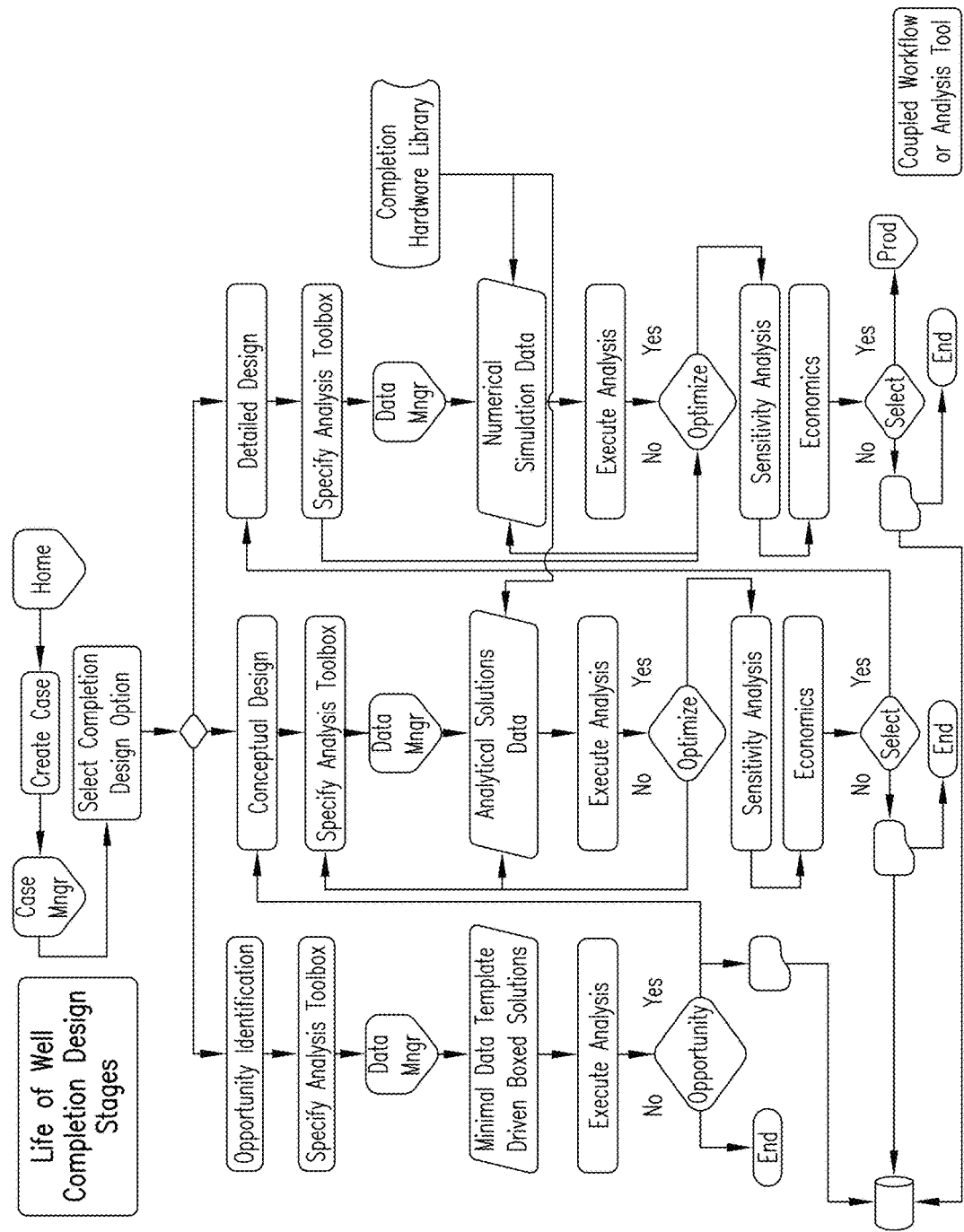
FIG. 7 depicts an example of a workflow that directs execution of various processes and/or guides a user in design of a wellbore completion system.

The method includes planning and designing a completion using one or more mathematical models, establishing operating envelopes, identifying performance enhancement opportunities, and/or controlling operational parameters. FIGS. 6 and 7 illustrate examples of workflows that may be input to or generated by the processing device, and are configured to execute and/or guide performance of the method. These workflows are provided for discussion purposes and are not intended to be limiting; the processing system can customize workflows based on planned operations, selected equipment and other considerations.

In one embodiment, the method includes a closed loop well management method that includes monitoring operational parameters, production parameters and measurements, comparing measurements to operational limits, assessing performance, and/or identifying improvement or optimization opportunities. The method may include performing operational parameter adjustments for, e.g., keeping parameters within performance constraints, and improving production.

The method, in one embodiment, includes a design phase in which systems and/or components to be used are modeled and simulated, and the design is adjusted as desired based on the modeling. FIG. 6 shows an example of an integrated workflow 70, all or a portion which is followed by the processor (or by the processor and a user) during the method. The workflow 70 includes a design phase 72 and a performance monitoring phase 74.

The workflow of FIG. 6 may be displayed or otherwise executed with a user interface to allow a user to determine or change design parameters and select analyses having different levels of complexity. For example, the workflow presents multiple completion design options, each having a different level of sensitivity or complexity. For example, a user can select a "conceptual design" (CCD) option, which prompts the selection of an analysis toolbox including modules such as an analytical model, which is cruder than the relatively more precise (and more involved in terms of computational and resource requirements) numerical modeling modules (e.g., a localized and/or extended formation simulator and wellbore model). The conceptual design option can thus provide a quicker output than a "detailed design" (DCD) option, which utilizes numerical models (e.g., a localized and/or extended formation simulator and wellbore model) that are typically more involved in terms of computational and resource requirements. Another option is quick look or screening option (shown as "Opportunity Identification in FIG. 6) that provides less detailed analyses of proposed designs, e.g., by using small scale models discussed above. It is noted that the user may select multiple options for execution (e.g., sequentially or in parallel). The processing system thus can utilize small scale simulation and simulations of varying complexities to improve efficiency and accuracy (for example, by focusing on one or a few aspects, such as drainage volume) in modeling without compromising functionality.

For example, in the early stages of field development planning, fast running well performance models (e.g., CCD models) predict performance, assess reservoir risks and evaluate the impact of data uncertainties to enable optimal completion method to be selected and operating strategy determined. For more detailed performance analysis, defining well operating envelopes and troubleshooting of production problems identified via production surveillance activities, a suite of numerical flow simulation models are available via the DCD option.

Figure 8:
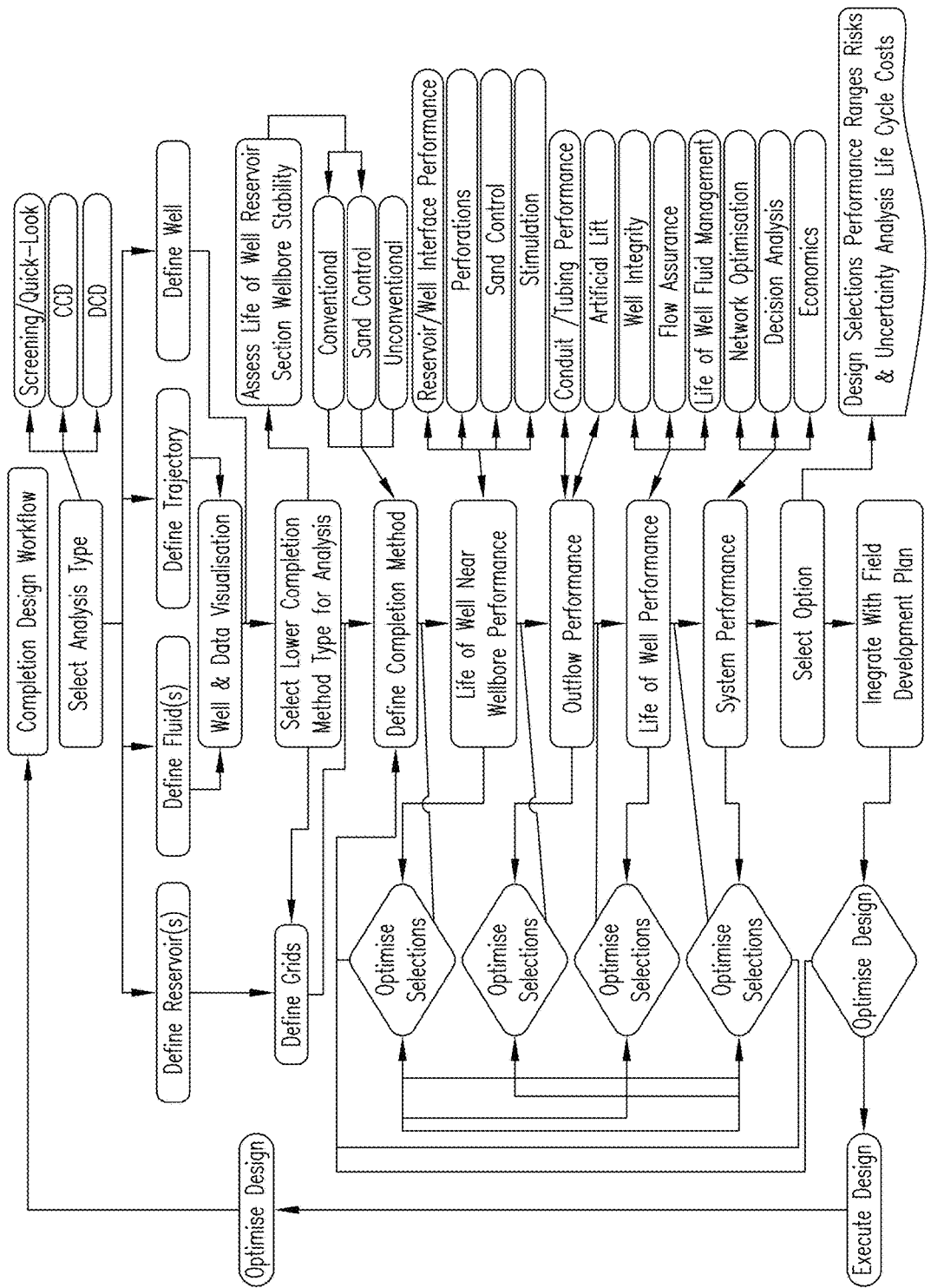
FIG. 8 depicts an example of a workflow that directs execution of various processes and/or guides a user in design of a wellbore completion system.
Figure 9A:
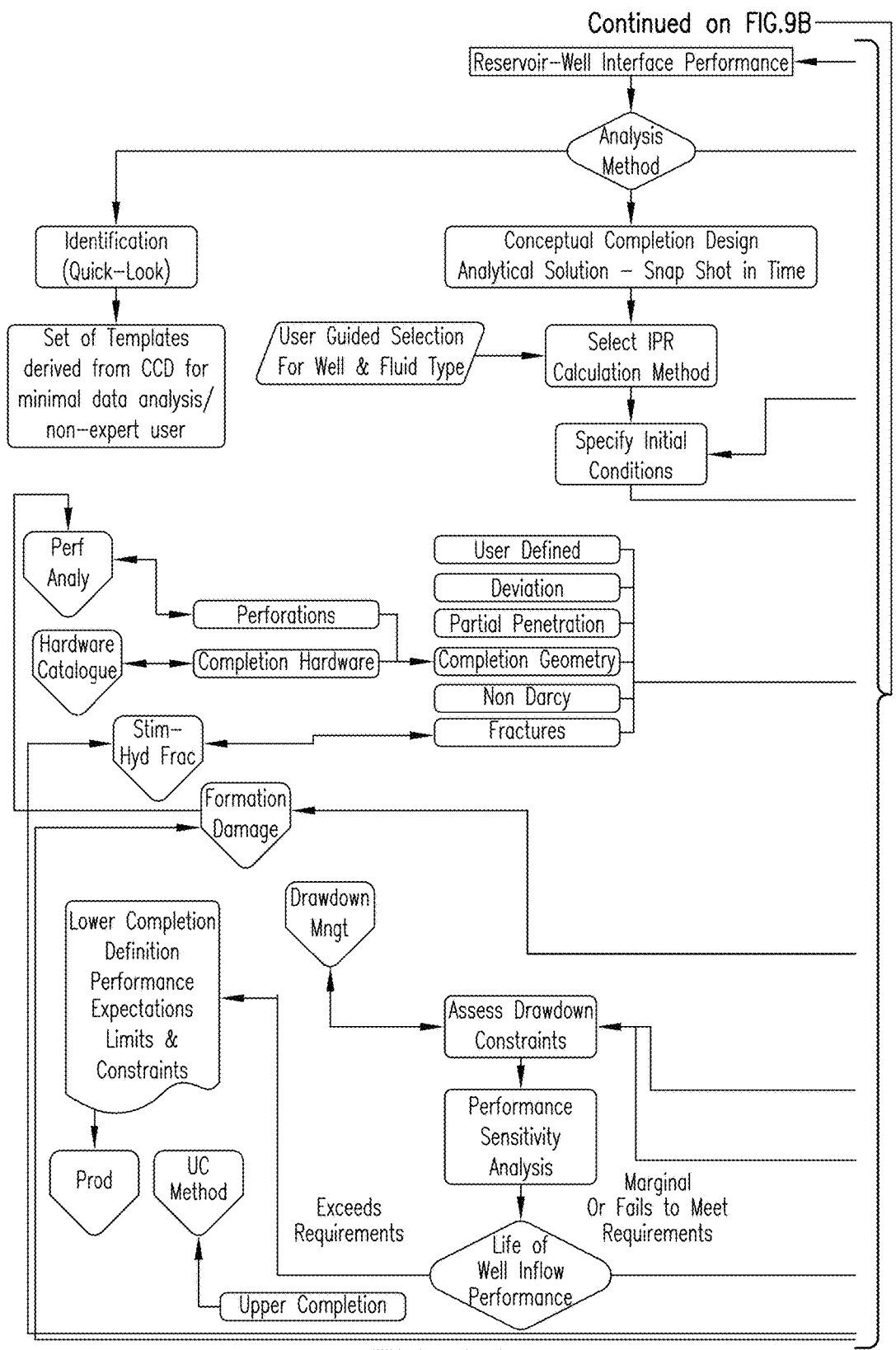
FIG. 9 depicts an example of a workflow for near wellbore performance analysis and risk assessment.
Figure 9B:
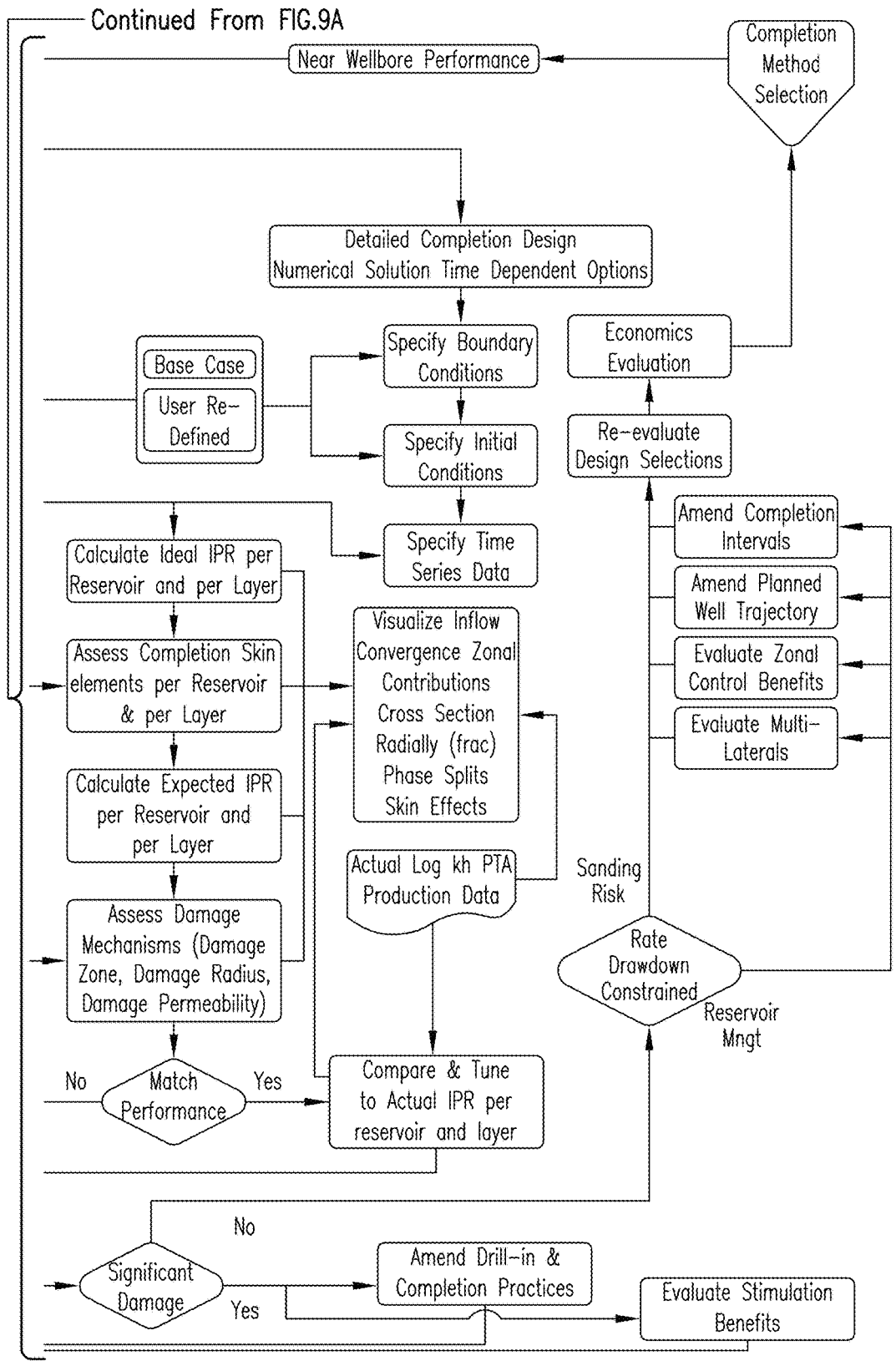

FIG. 7 illustrates design stages that can be executed, including the fastest performing "Opportunity Identification" (screening) stage and relatively slower but more comprehensive CCD and DCD stages. FIG. 8 shows another example of a completion design workflow that allows for selection of completion design options (screening, CCD, DCD) and also allows for selection of different inputs and analyses. This workflow also prescribes methodologies to optimize the design by employing selected processing modules. FIG. 9 shows a further example of a workflow for near wellbore performance analysis and risk assessment.

The workflows discussed herein are examples of workflows that can be created and are not intended to be limiting, as a user can select or design any workflow, including inputs and analyses, based on the specific goals of the user. The workflows, in one embodiment, are not pre-defined, so that a user has full flexibility to select objectives, program modules and results.

During the design phase, a user interacts with the system via a graphical user interface. For example, a user inputs various information that can be displayed and allows for the user to set and/or adjust input data such as formation and reservoir characteristics data. Examples of data and information that can be specified and/or imported are discussed as follows. Data can be individually entered by a user via text boxes or other interface features, or data can be stored in libraries or databases as, e.g., data files, which can be imported.

Various data is input to define the reservoir, including lithology characteristics, reservoir properties (e.g., depth, thickness) fracture networks, boundaries and other properties. Borehole data can be input, such as borehole diameter, trajectory, inclination, azimuth and others. Measurement data describing fluid properties (e.g., pressure-volume-temperature or PVT data) may be input at design stages and as real time measurement data during operation. Petrophysical data includes borehole properties such as diameter (e.g., from a caliper log), and data regarding formation layers, rock types net/gross, permeability, porosity, rock strength and others. The petrophysical data may be imported from logs generated during the operation, at another time in the same borehole, or in another borehole in the same or similar formation.

Completion data may be specified by selecting components and/or assemblies, and selecting characteristics of the components and relevant operational parameters and limits. For example, a user inputs individual components from a catalog and selects attributes such as the number or assemblies in a multi-node assembly, design rules, material characteristics (e.g., strength), pressure drop characteristics and operating constraints and limits. For example, detailed or existing completion designs can be imported from a source such as Completion ArchiTEX™ (CTX™) 3D completion design software from Baker Hughes, Inc., to accelerate the workflow, minimizing duplication of data and risk of errors in data entry transfer.

Upon receiving input data, the processing system, in one embodiment, generates a near wellbore grid of a formation volume and populates the grid with petrophysical data. Completion data is imported or specified, and an integrated solver performs life of well calculations that includes generating flow models and outputting performance results and optimization results via, e.g., the user interface.

For example, the system includes a multi-well extended wellbore grid (XWB) solver that utilizes boundary conditions such as no-flow boundaries for all external bounds. In one example, each boundary edge's boundary conditions can be set independently. Boundary conditions may include no-flow, constant pressure, variable pressure, and/or varying fluxes of each phase, i.e. a user can define the flux of each phase independently. The boundary conditions may be set cell-by-cell.

In one example, the input to the integrated simulator is through a single keyword file. The keyword file for XWB is closest to the anticipated modifications. The integrated solver accepts well trajectory data as an array of TVD (true vertical depth), MD (measured depth), INCLINATION and AZIMUTH. The integrated solver internally calculates a grid and utilizes it to calculate well way points for the XWB grid. By default, grid generation is transparent to the user. The integrated solver keyword file includes completion configuration that provides the start MD of the completion, length of completion, type of completion and attributes of completion of its type (perforation length etc.)

XWB grid generation may be an integrated module and can be controlled by the user. The grid generation may be handled internally in XWB for dipped formation layers by adjusting the gravity vector appropriately or by rotating the grid accordingly.

The integrated solver and the optimization modules can be used to maximize the cumulative oil production throughout the life of well. For example, an optimizer provides recommendations such as the location and number of packers (with or without some "locked" packers), the number of ICDs or ICVs in each partition or production zone, and ICD or ICV sizes (strength) in each partition. In addition to ICD optimization the ICV/MultiNode system operation optimization may recommend choke settings as function of time. In another example, the modules are used for artificial lift performance (e.g., optimize gas lift utilization or ESP predictive run life expectancy) for well management and well intervention planning purposes. It is noted that the outputs and recommendations may be calculated in real time, e.g., during production.

The workflow 70 can be extended to enable production diagnostics and production optimization of set points for surface controlled ICV in horizontal or conventional multi-zones reservoirs or stacked reservoirs. In addition, the optimizer may be utilized in solving additional workflow incorporating artificial lift, surface networks, flow assurance, well integrity design and operating as part of the multi-year development program in line with the original concept.

Figure 10:
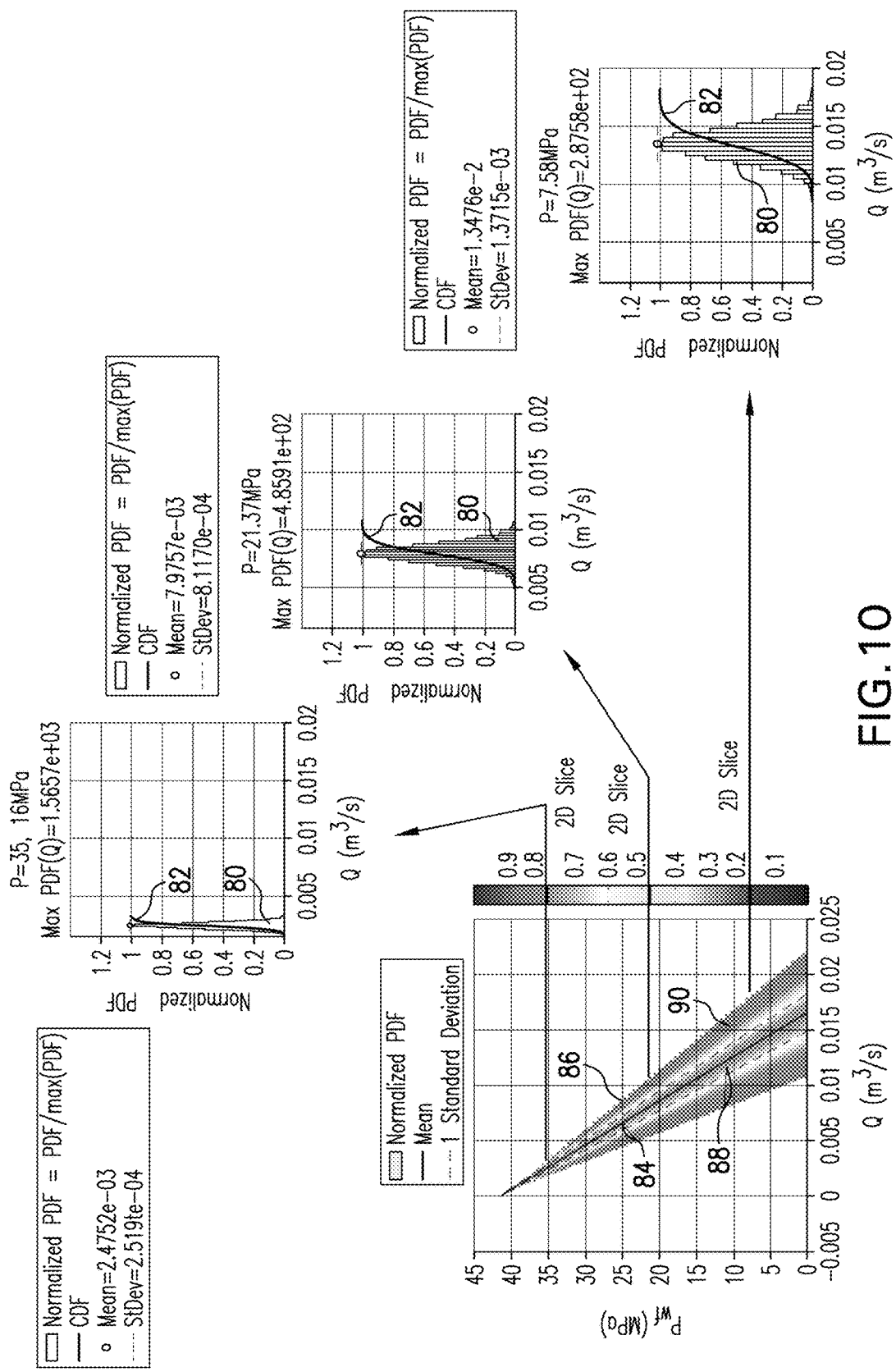
FIG. 10 depicts an example of uncertainty analysis results as applied to an inflow model.
Figure 11:
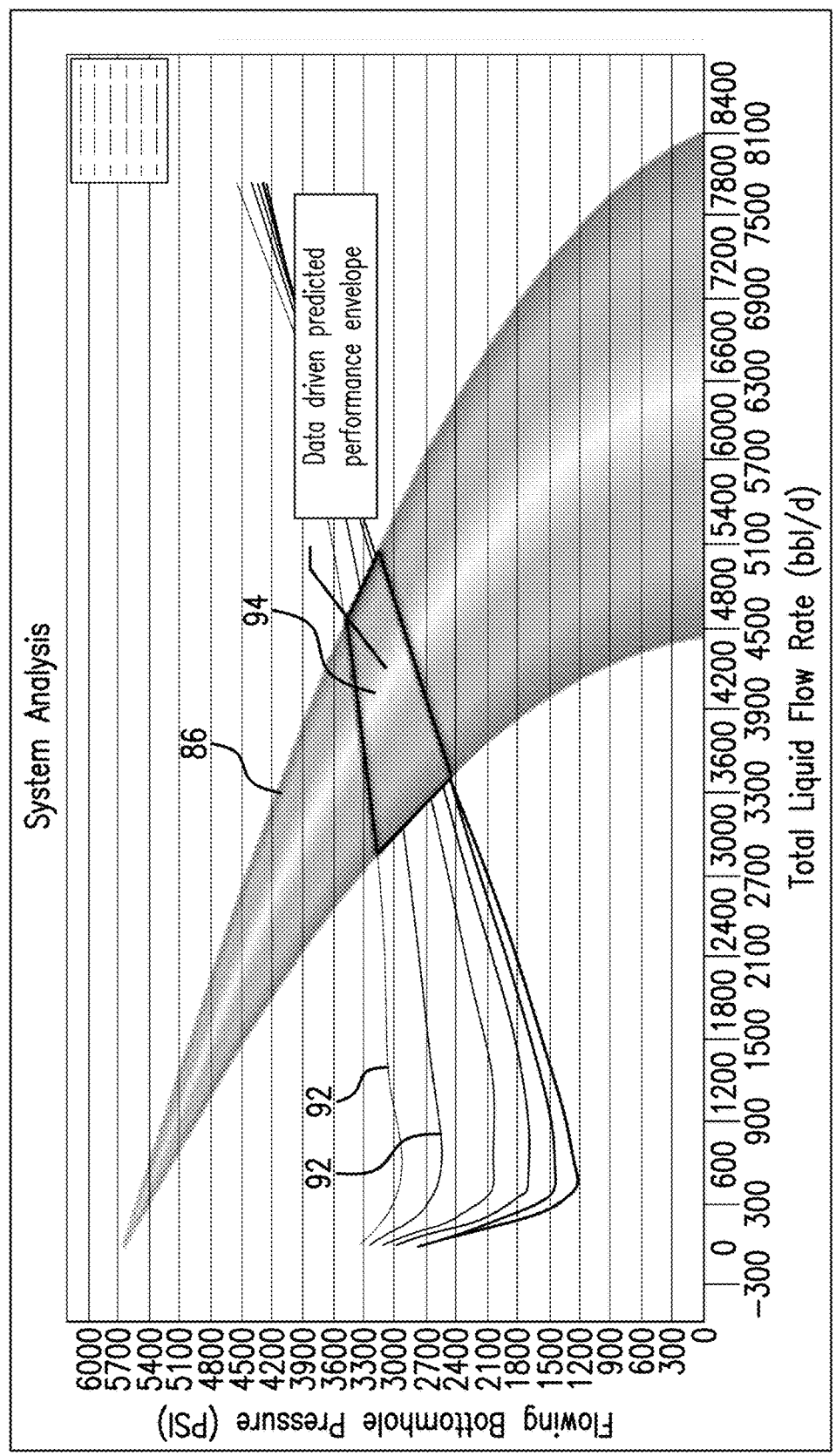
FIG. 11 depicts an example of a performance envelope generated via an uncertainty analysis.

In one embodiment, the method includes performing an uncertainty analysis, which may include selecting operational parameter ranges or envelopes (referred to herein as "performance envelopes") that can be used by the system and/or the user to identify opportunities to improve the energy industry operation. The uncertainty analysis may be performed using modules and/or functionality for performing assessment of hardware reliability, input sensitivity factors, and uncertainties in input data. This embodiment provides several reliability and sensitivity analysis capabilities, including Monte Carlo sampling, Latin Hypercube sampling, Advanced Mean Value methods, Iterated Advanced Mean Value methods, and hybrid methods. Subroutines may be embedded into the near wellbore simulator and/or integrated simulator for performing assessments. FIGS. 10 and 11 illustrate results of the uncertainty analysis in the form of uncertainty ranges, which may be used in the generation of performance envelopes.

For example, an uncertainty analysis module executes a selected analysis method (e.g., Monte Carlo or Latin Hypercube sampling) and receives input specifying a data type used as an input variable, such as flow rate and/or pressure. Each input variable is assigned a unique uncertainty, and a number of random variable values are generated for each input variable. The random variable values are simulated using, e.g., the near wellbore simulation, and output values are generated along with uncertainties or uncertainty ranges.

In one embodiment, the uncertainty analysis is used to generate a probability distribution function (PDF) that describes the uncertainty in a selected variable. For example, a PDF associated with flow rate as a function of pressure is estimated at one or more pressure values.

FIG. 10 illustrates an example of uncertainty analysis results, which include the probability of the flow rate as a function of pressure given uncertainty in permeability. These results include a probability distribution function (PDF) 80 obtained by generating 5000 Monte-Carlo samples at each pressure step (61 pressures in this example) in an original IPR (inflow performance relationship) analysis. Two-dimensional slices taken at various pressures show the PDF 80 and a cumulative distribution function (CDF) 82 at any individual pressure (Pwf). The scale is kept constant to show the variable spread in the flow rate at different Pwf.

PDFs at multiple pressure steps are combined to generate a curve including uncertainty ranges, which may be used to calculate a performance envelope. For example, the PDFs 80 of FIG. 10 are combined to generate a three-dimensional cross-plot showing sample results for pressure as a function of flow rate. A mean curve 84 is calculated by calculating the mean of each PDF and an uncertainty plot 86 is calculated that includes color-coded probabilities. For example, a red region 88 denotes the most probable flow rate and a blue region 90 denotes a least probable flow rate at each individual constant pressure value.

The uncertainty analysis, in one embodiment, is used to create a performance envelope that prescribes optimal or desired operational parameters settings for the energy industry operation. Uncertainty ranges for a variable are combined with other data ranges to generate a performance expectation range or envelope.

FIG. 11 shows an example of the uncertainty plot 86 generated for total liquid flow rate (in barrels per day or bbl/d) as a function of bottomhole pressure. For a multiple zone well, the uncertainty plot 86 may be generated on a per-zone basis (i.e., fluid flow rate from a zone vs pressure in the zone). As shown in FIG. 11, outflow rates for different water cuts are calculated using, e.g., the near wellbore simulation, to define a range of outflow values as a function of pressure, shown as a series of curves 92. The outflow rate ranges are compared to the probability data to generate a predicted performance envelope 94. The predicted performance envelope 94 represents the intersection between the uncertainty plot 86 and an uncertainty range or plot for another parameter. In this example, the other parameter is outflow, although any suitable combination of parameters may be used to generate the uncertainty plot and the performance envelope. The performance envelope provides a model match area that accounts for data and modeling uncertainties. The predicted performance envelope may be used to identify improvement or optimization opportunities during an operation as discussed further below.

In one embodiment, the method also includes generating an integrated well operation envelope (referred to herein as an "operating envelope") using the integrated workflows. The operating envelope is generated by inputting or calculating operating constraints based on a variety of safety and performance considerations. For example, constraints are selected to keep the system within safe operating limits. Areas that may be addressed in generating the operation envelope include near wellbore performance, well performance, well operations, well integrity and flow assurance.

Figure 12:
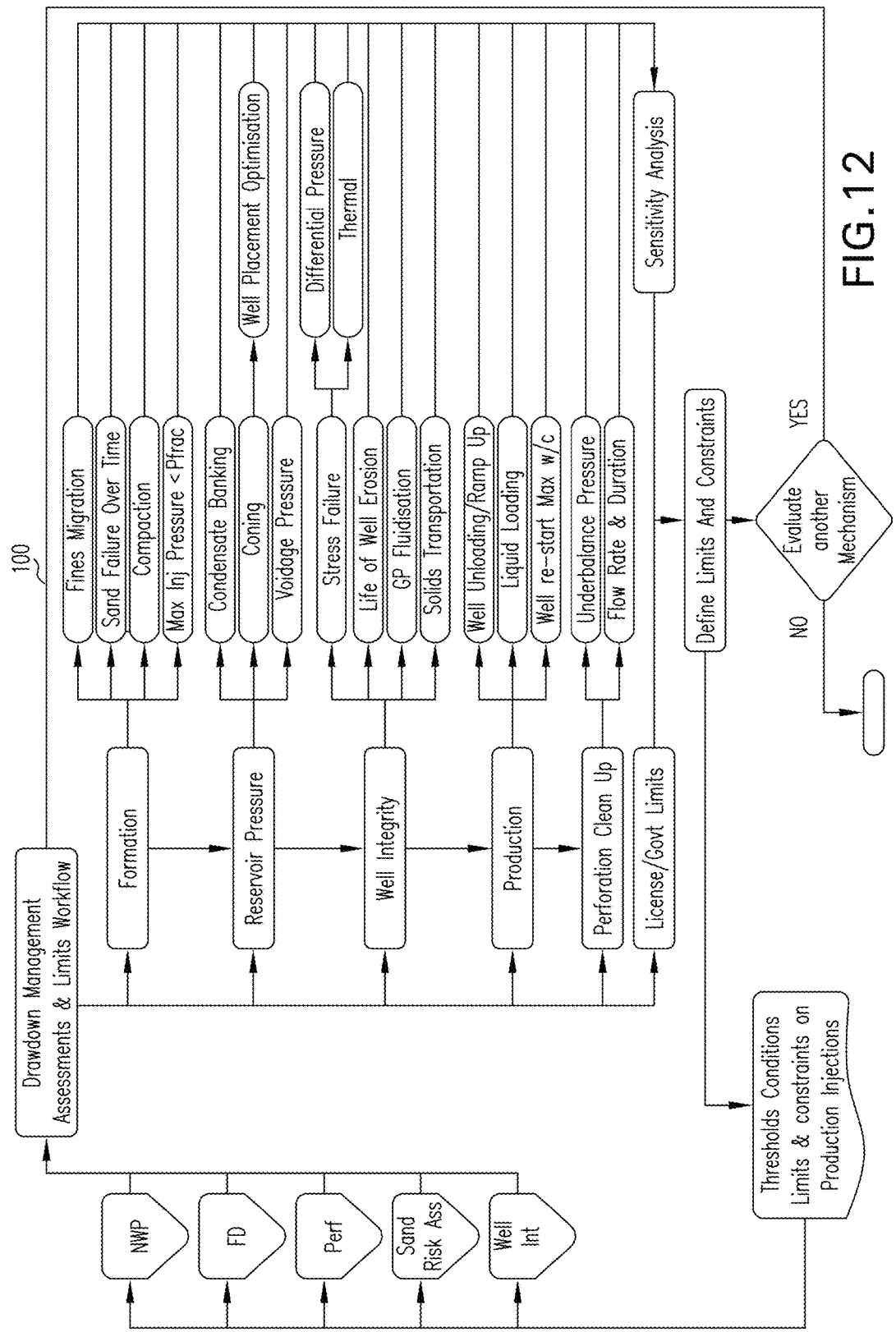
FIG. 12 depicts an example of a workflow for establishing operational parameter limits based on various risk factors.

The operating envelope is generated to ensure that formations and systems are operated safely and effectively, and may be performed according to a workflow stored and/or generated by the processing system. An example of a workflow 100 for establishing operating limits is shown in FIG. 12. The workflow 100, as with other workflows described herein, may be built in a modular manner to allow different considerations and/or operating parameters to be considered.

As shown in the workflow 100, various aspects of a planned operation can be considered for generation of operating limits. Threshold conditions, limits and constraints relating to a number of considerations may be input. Such considerations include risk factors associated with near wellbore performance (e.g., reservoir inflow), well or borehole performance (e.g., well integrity constraints such as collapse, burst and temperature limits, erosion and sand management (e.g., sand management plan, corrosion plan, flow assurance (chemical injection and management), and well flow management. Flow management considerations include, for example, minimum turn down rates to prevent well stability issues, bean-up profiles, drawdown management limits, zonal flow management, and artificial lift requirements and management.

The method uses these considerations to prescribe operational parameter limits. For example, the method considers a number of aspects of a planned operation, such as formation behavior (e.g., compaction and sand failure over time), reservoir pressure conditions (e.g., coning and voidage pressure), well integrity (e.g., stress failure, erosion and solids transport) and others as shown in FIG. 12. A sensitivity analysis may be performed for inputs and conditions having uncertainties. As a result, the processing system outputs limits and constraints that take the above aspects into consideration.

Figure 13:
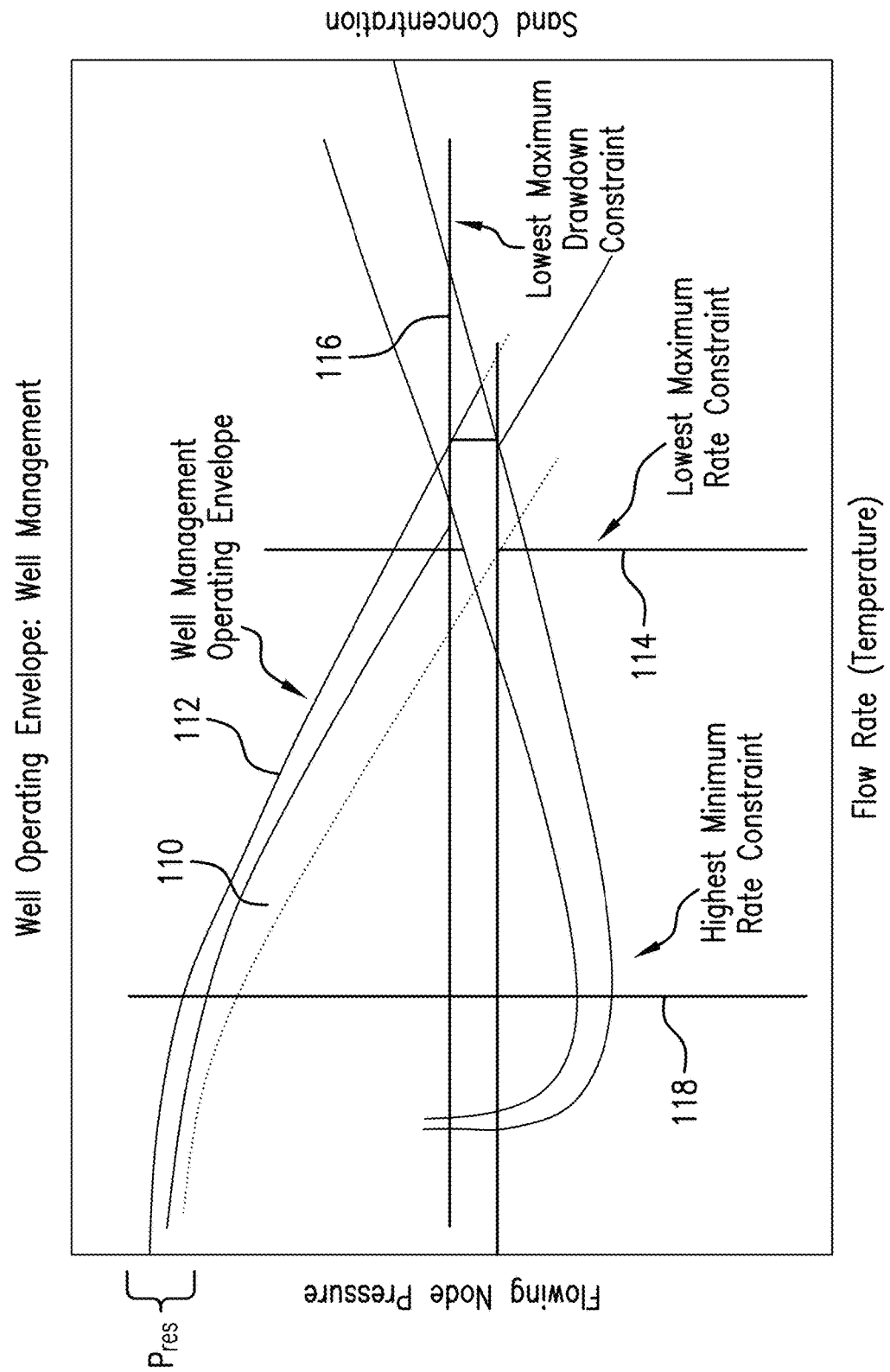
FIG. 13 depicts an example of an operating envelope that prescribes operational parameter limits based on well management considerations.
Figure 14:
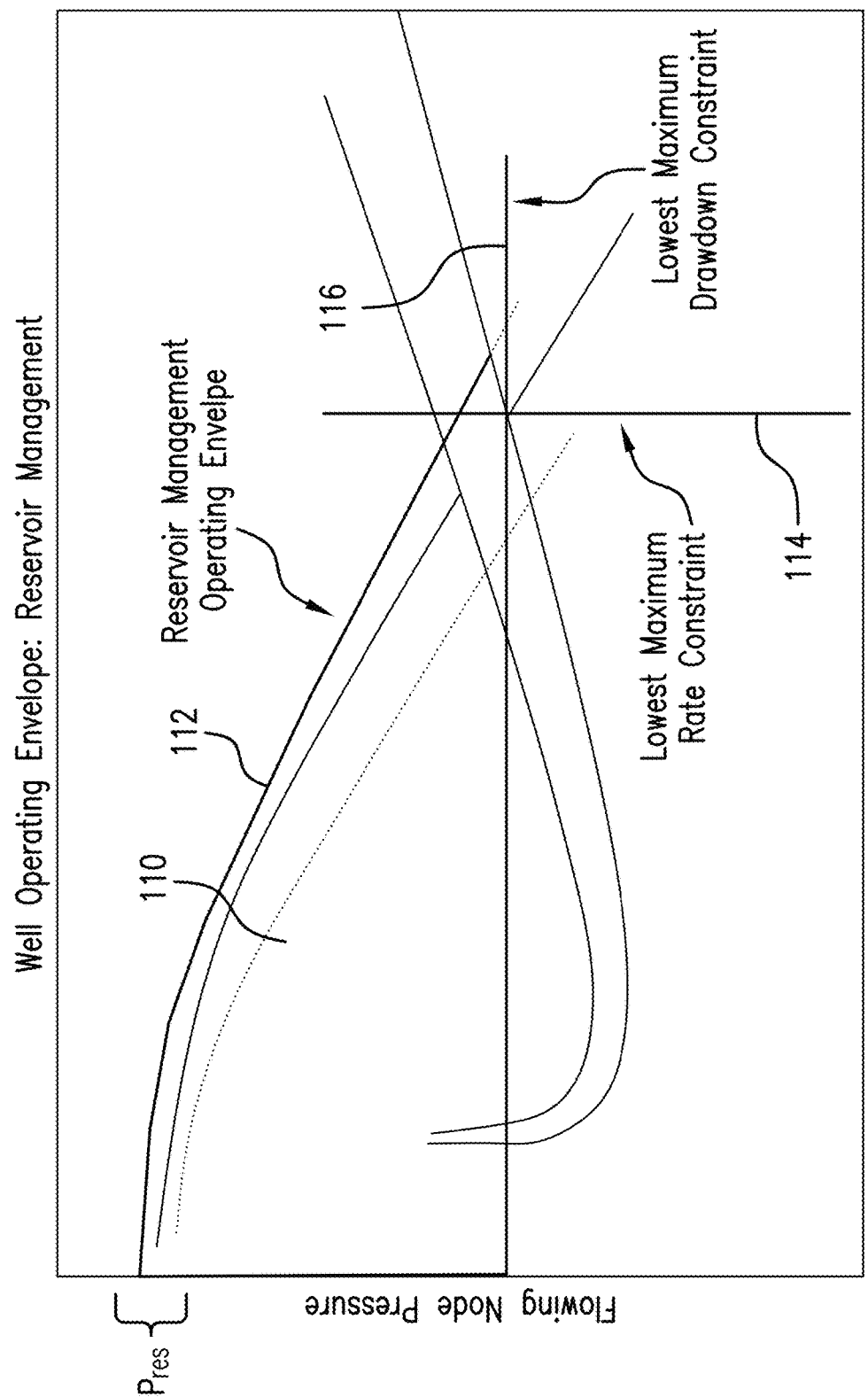
FIG. 14 depicts an example of an operating envelope that prescribes operational parameter limits based on reservoir management considerations.

Different operating envelopes may be generated for different considerations. FIGS. 13 and 14 show examples of operating envelopes that prescribe limits on node pressure and flow rate based on various risk factors.

FIG. 13 shows an example of constraints determined as appropriate for well integrity, well flow and flow assurance aspects. In this example, an operating envelope 110 of flow rate as a function of node pressure (e.g., bottomhole pressure or pressure at a production zone) is generated that is bounded by reservoir pressure 112 and operating limits including a lowest maximum flow rate constraint 114 calculated based on equipment sizing, equipment erosional velocity limits, gravel pack fluidization, and thermally induced stresses. A minimum node pressure constraint 116 is calculated based on equipment limits for pressure differential, sand failure limits, formation compaction and deposition (e.g., wax, scale, asphaltene). A minimum flow rate constraint 118 may also be calculated based on flow stability considerations, solids transportation velocity and hydrate risk regions.

FIG. 14 shows another example of the operating envelope 110 generated based on reservoir characteristics. In this example, the lowest maximum flow rate constraint 114 is calculated based on sweep management and critical coning rate considerations. The minimum node pressure constraint 116 is calculated to establish a maximum drawdown pressure based on voidage replacement, enhanced oil recovery treatments, bubble point pressure, fines migration, coning prevention, condensate banking, and perforation/completion zone. The operating envelope prescribes minimum constraints that control the operating environment.

The processing system automates the process of identification of the boundaries of each applicable flow assurance and system integrity risk factor that may be dynamic and system dependent. The following steps describe an example of an algorithm to identify the boundaries of each of the risk factors as a function of flow rate and pressure.

In this example, the in-situ flow conditions at every point through the system are calculated via numerical or analytical modeling for every possible flow rate of a production system. These conditions include, e.g., in-situ pressure, temperature, velocities, compositions, densities, viscosities and other thermo-hydraulic parameters of each existing phase.

Then, utilizing the in-situ flow conditions, all applicable flow assurance and system integrity related risk factors (e.g., hydrate formation, erosion, corrosion, sand transportation, amount of gas in the pump, multi-point injection, etc.) are calculated at in-situ conditions. These risk factors are compared against the in-situ condition to determine whether they would occur. By doing so, a boundary of the risk factor is developed as a function of flow rate and pressure. The uncertainties in the system parameters are factored in creating these boundaries.

Automation of this process saves many hours of work and provides unprecedented insight into the total production system leading to more efficient and accurate comprehensive system analysis.

The method also includes a performance monitoring phase that utilizes inputs from the design phase, operating and performance envelopes, and real time measurements during an energy industry operation. The performance monitoring phase of the method includes receiving real time measurements, such as flow rate and node pressure, and ensures that the operation is proceeding within limits prescribed by an operating envelope or envelopes. In one embodiment, the performance monitoring phase includes identifying opportunities for operation performance enhancement or improvement. The processing system may automatically adjust operational parameters based on the operating envelope and/or performance envelope.

Figure 15:
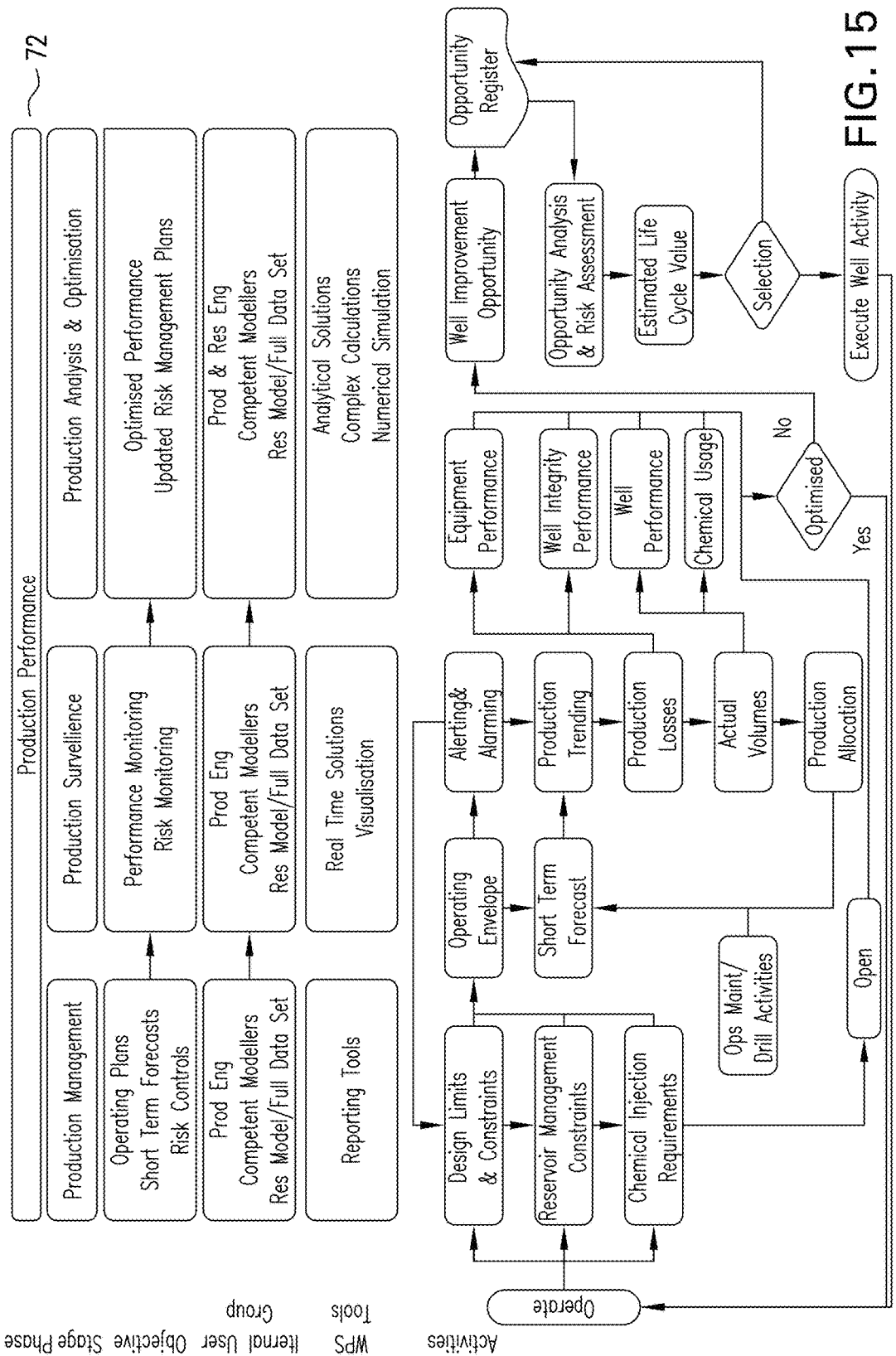
FIGS. 15 and 16 depict examples of a production performance monitoring workflow that includes real time functionality for ensuring safe operation of wells within operating envelopes and identifying performance improvement opportunities.
Figure 16B:
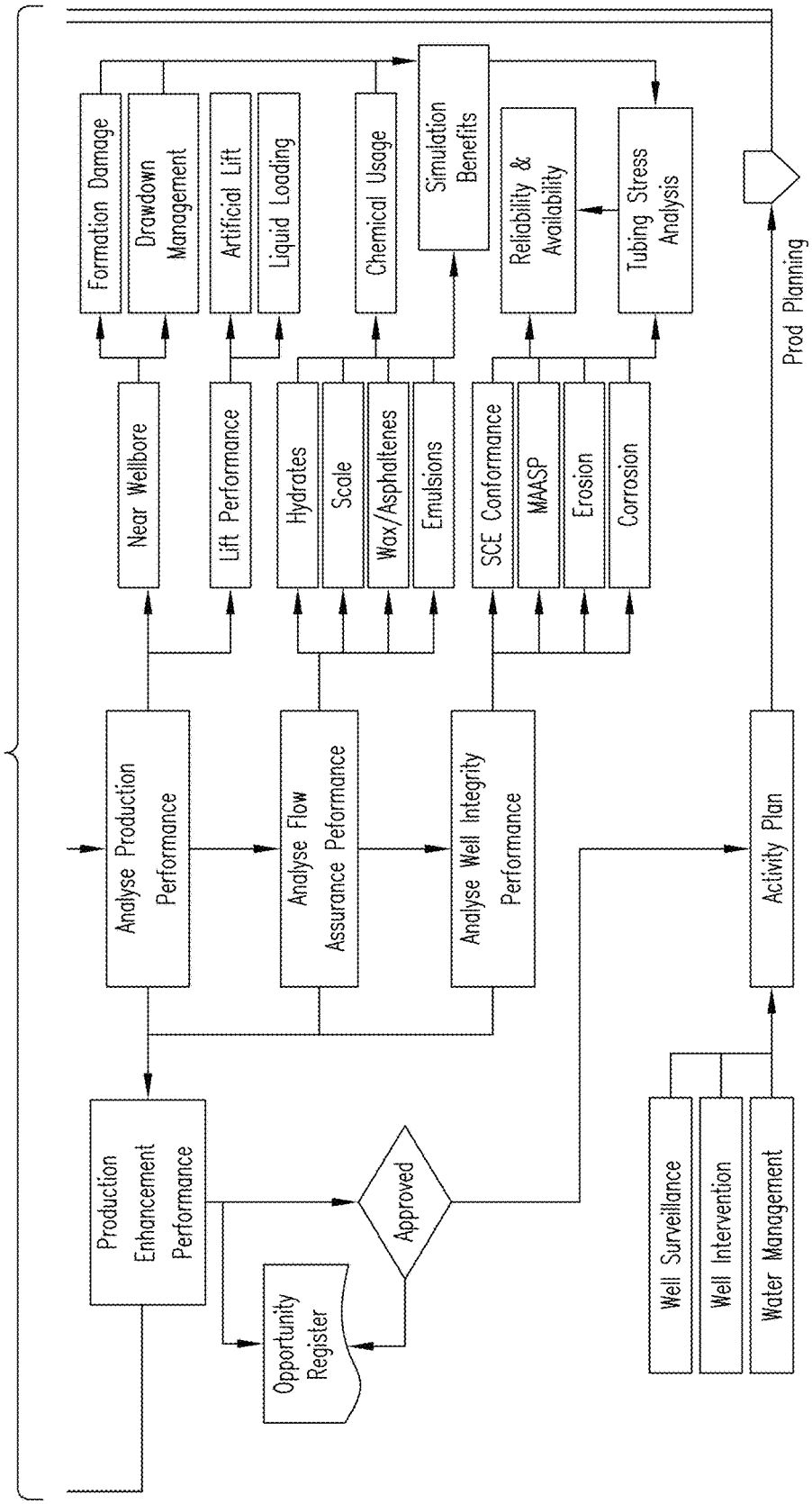

FIGS. 15 and 16 show examples of the performance monitoring workflow that includes functionality for identifying performance improvement opportunities as discussed further below. These workflows illustrate a dynamic, closed loop, well management solution through an integrated well modelling workflow that provides a clear definition of reservoir management, well integrity and flow assurance operating regions that are used to create an integrated well operating envelope using the modeling modules and tracks compliance and performance enhancement opportunities.

Figure 17:
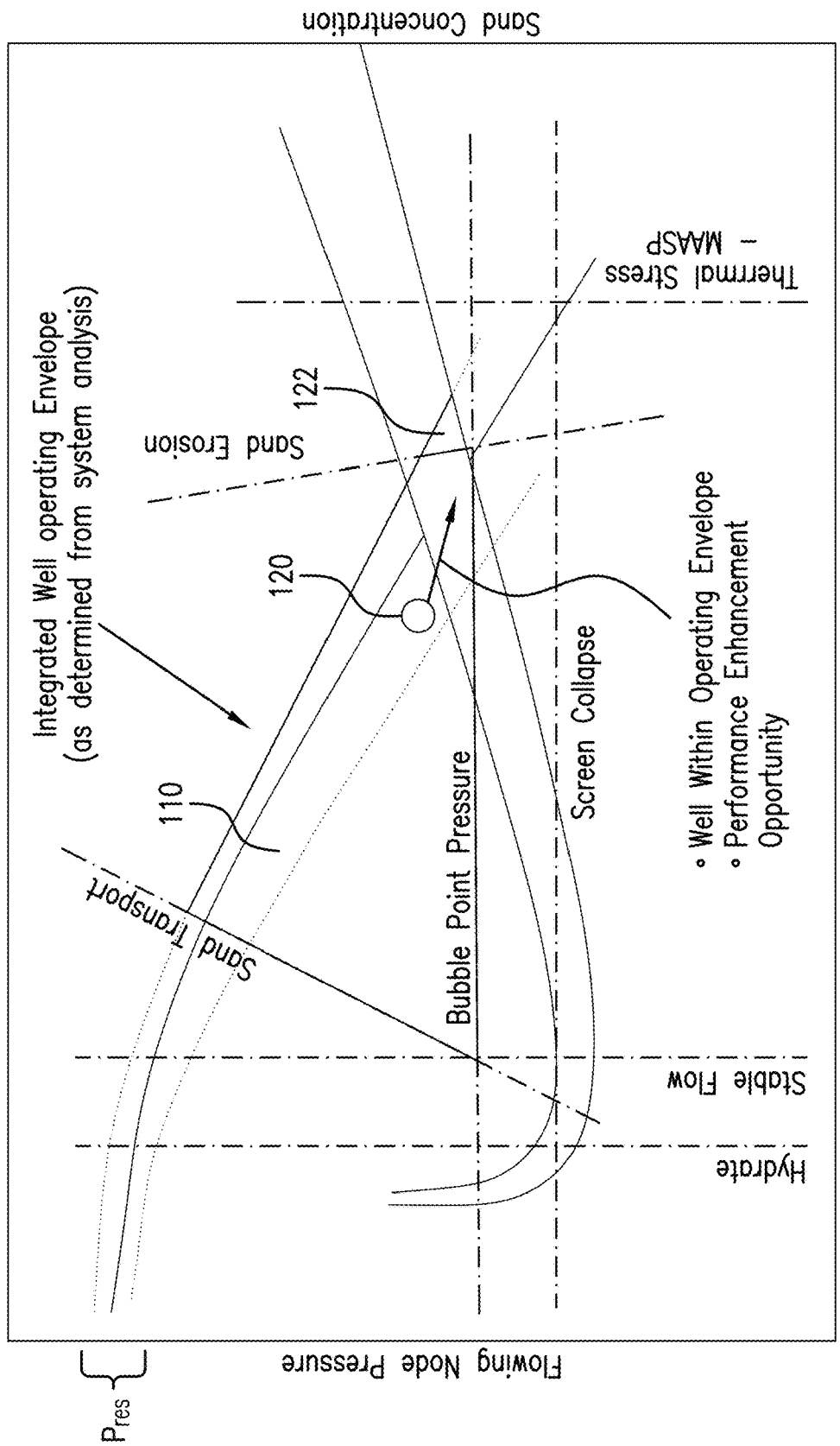
FIG. 17 depicts an example of an integrated well operating envelope, displayed with current performance of an operation and performance improvement potential generated based on a method of establishing operational limits and an uncertainty analysis.

During the performance monitoring phase, the processing system receives real time measurements such as flow rate, temperature and pressure measurements, and compares the measurements to limits established by the operating envelope. The measurements may be compared directly to operating envelope limits, or input to one or more models to calculate parameters that can be compared to the operating envelope. An example of the operating envelope 110 is shown in FIG. 17, which incorporates limits calculated based on various considerations and boundaries calculated based on various risk factors, thus representing an integrated operating envelope. In this example, the limits are calculated based on reservoir management and well management considerations as discussed above. In one embodiment, the performance monitoring phases, as well as other phases and methods described herein, are performed using a processing platform that integrates modeling, planning and design software with real time monitoring and analytics software such as FieldPulse™ real-time production monitoring and model-based predictive analytics software by Baker Hughes, Inc.

The processing system compares measurement data such as flow rate and node pressure data (e.g., data point 120) to the envelope 110. If the measurement data is within the operating envelope, the energy industry operation proceeds. If the measurement data falls outside the envelope, the operation is considered to be underperforming, and the data may be flagged to an operator and stored or logged. In one embodiment, the processing system automatically adjusts appropriate parameters to bring the measurement data within the envelope 110 or shuts down the operation.

In one embodiment, measurement data is also compared to a performance envelope such as a performance envelope 122. Models are matched in real time to determine whether measurement data falls within the performance envelope. If the measurement data falls outside the performance envelope, the borehole is considered to be underperforming. Operational parameters may be adjusted to improve the operation by moving the measurement data into the performance envelope 122 (while also maintaining the measurement data within the operating envelope). Alternatively, the processing system can generate an alarm or indication to inform a user and/or provide recommendations for adjustment.

In one embodiment, an underperforming borehole is captured in an opportunity register or other appropriate data structure that identifies the borehole, and may also include information such as the measurement data and operating limits.

In one embodiment, the performance monitoring phase includes a performance tracking method for multiple boreholes that includes performing two or more calculations for each well using algorithms that model a particular performance aspect of the corresponding well. Each algorithm operates on data obtained from production sensors to provide a particular performance indicator (PI). The PI may be expressed mathematically as: $PI_n=f_n(x,y,z)$ where n represents a particular performance model and x, y and z represent different types of sensor data recognizing that there may be any number of different types of sensor data. The algorithm may use common sensor data or sensor data that is unique to that particular algorithm. Once two or more performance indicators are obtained for each borehole, they are individually weighted with a weighting factor and then combined to provide a performance index value. Because the performance indicators may be based on different units, the performance index value is unit-less and may be referred to as the unit-less performance index value. The unit-less performance index (PIdx) may be expressed mathematically as $PIdx=(w_1 \cdot PI_1)+(w_2 \cdot PI_2)+(w_3 \cdot PI_3)$ for three different performance indicators where $w_1$, $w_2$ and $w_3$ represent weighting factors for the corresponding performance models. More generally, PIdx may be represented in one or more embodiments as $$PIdx = \sum_n w_n * PI_n.$$

values or weighting factors may be assigned by a user based on the user's perceived value or importance of a particular performance model.

In one example of a performance index process, three different calculations are performed. A first calculation (Calculation 1) is a rate deviation calculation, a second calculation (Calculation 2) is a model deviation calculation, and a third calculation (Calculation 3) is a rate decline calculation. The rate decline calculation is the deviation of the metered (or measured) rate from the estimated (or calculated) rate. In this calculation, the measured rate could be replaced by a generally accepted rate such as an allocated rate (i.e., a rate not directed metered but inferred using other measurements) in lieu of a having metered rate:

Difference (%)=measured value/estimated value*100.

The resulting percentage is used as the output of Calculation 1. If the calculation could not be performed (e.g., by data being unavailable), then the answer is 0. Deviations within a defined minor deviation range are labeled as a minor deviation. Deviations that exceed the minor deviation range are labeled major deviations.

The model deviation calculation is performed if there is access to a model inflow performance relationship (IPR) and vertical lift performance (VLP) data associated with the well on which the calculation is being performed. A standard deviation is used to define the boundaries of the IPR and VLP Curve. This creates a tolerance boundary range (e.g., similar to the uncertainty plot 86) that can be used to create a performance envelope. The metered Production Rate and Bottom Hole Pressure are then compared against the performance envelope. If the data is outside of the performance envelope, then a deviation has occurred. If a deviation occurs, then the distance from the zone of tolerance is used as the output of Calculation 2. The output number is a percentage (%) based on the distance from the tolerance zone. For example, the percentage may be determined by the distance to the boundary divided by the width of the boundary times 100. If no deviation occurs, the answer is 0. If the calculation could not be performed due to the lack of a model or data, the answer is 0.

The production decline calculation is the slope (or gradient) of decline based on the measured production rate. Production decline may be measured in Barrels of Oil per Day (BOPD) or million standard cubic feet (MSCF) for gas. In this calculation, the measured rate could be replaced by a generally accepted rate such as an allocated rate (i.e., a rate not directed metered but inferred using other measurements) in lieu of a having a measured rate. Three (3) curve fitting algorithms are performed on a sample of the measured rate—exponential, hyperbolic and harmonic. If all three curves fit the data, the hyperbolic curve fit is used to calculate the slope. Then preference falls to harmonic and last to exponential. The absolute (ABS) of the slope is used as the output of Calculation 3. The output value will be a percentage (%). If no curve fits the data, the output value of Calculation 3 is 0. If the calculation could not be performed, the answer is 0. The three curve fits are calculated using algorithms that are accepted and documented within the oil and gas industry.

At this point in the process, each well will have a percentage score for each calculation and each well will have a three (3) difference percentage scores. Before assigning a final score to the well a weighting factor is assigned for each of the calculations. The factor can be any number; a higher number will produce a greater influence on the final well calculation score. For example, Calculation 1 may have a weighting factor of 1, Calculation 2 may have a weighting factor of 1, and Calculation 3 may have a weighting factor of 2. Each calculation score is multiplied by the weighing factor. The results of each factored score are summed to create the final score.

Score=20% (initial score)*1 (factor)=20   Calculation 1

Score=5% (initial score)*1 (factor)=5   Calculation 2

Score=2% (initial score)*2 (factor)=4   Calculation 3

Summing the three weighted calculation scores gives a sum total score of 29 (unit-less). In this type of scoring (i.e., inversely related), higher scores indicate lower performance, and lower scores indicate higher performance. It can be appreciated that in other embodiments the scoring system can be reversed (i.e., directly related) such that the higher the score indicates higher performance while the lower the score indicates lower the performance.

Based on the unit-less performance indices of the wells, the wells can be ranked in order from low-performance to high-performance. Further, the user can use a performance index threshold value to identify those wells having a performance index value that exceeds the threshold value as "low performing wells." The threshold value can be based on experience or a mathematical metric such as an average index value or mean index value of all the wells.

Figure 18:
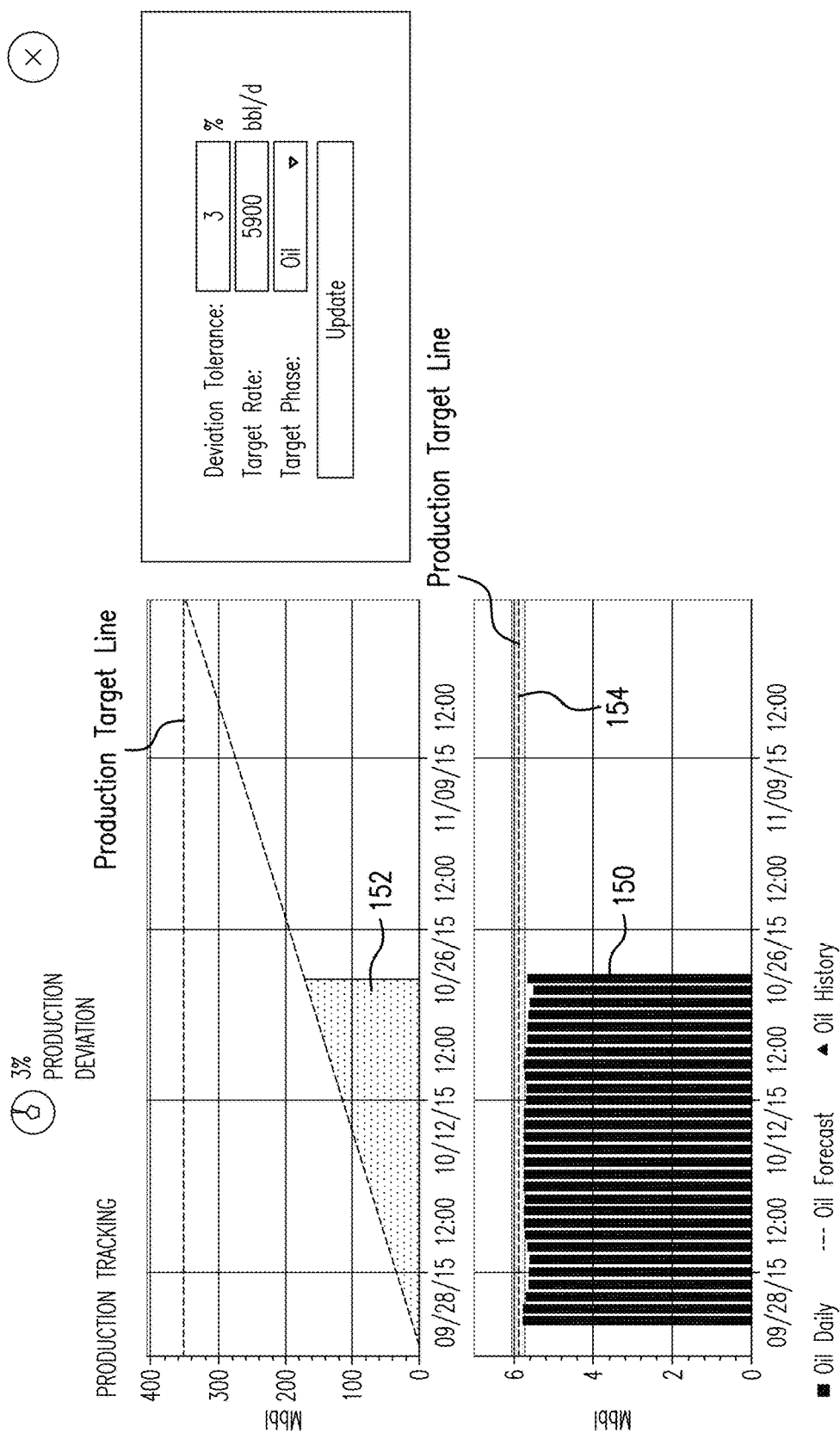
FIG. 18 depicts an example of production deviation data that can be used in performance monitoring.

FIG. 18 illustrates an example of a graphical user interface 130 that allows a user to interact with the processing system. The interface allows user to create a case for simulation and/or optimization, and specify or import data such as well trajectory data, PVT (pressure, volume, temperature) data, reservoir fluid characteristics and petrophysical data describing formation materials. The interface allows the user to enter data, visualize entered data and results, select and create workflows (including selection of processing modules), and modify designs. The interface includes selection icons or buttons 132 to allow the user to access parts of the system, including saving and accessing case files, and selecting and specifying well, formation, completion and fluid characteristics. The selection icons or buttons also allow the user to manage various simulations and analyses, including performance analysis, risk assessment, design optimization, and economic (cost/benefit) analysis. All aspects of modeling and simulation, including input data, workflows and results, can be visualized via the interface.

In one embodiment, the user interface includes display features that present multiple analyses and simulation results in a concise and familiar manner in a single chart or display for easier identification of a safe operating zone of the system to facilitate better design and operation decisions. For example, the integrated operating envelope can be displayed and may provide displays of various boundaries calculated using different risk factors and considerations. In addition, the performance envelope may be displayed with the operating envelope and/or with real time measurement data to provide an intuitive description of operational parameters relative to operating limits and opportunities to improve or enhance an operation.

In the example of FIG. 18, the interface 130 includes a window or display configured as a design or component display window 134 (CTX software) may be included to visually specify the current design. A PVT modeling view 136 displays results of PVT modeling, and a simulation view 138 displays results of numerical performance simulations. A performance results display 140 provides the user with results such as production data, real time measurement data (flow, temperature, production fluid information, etc.) cumulative production forecasts and economic forecasts (e.g., discounted cash flow). An uncertainty analysis display 142 displays results on uncertainty analysis as discussed above.

Other aspects of the processing system and method may be displayed, such as input data, logging data, design data, simulation grids, and performance and operating envelopes. A user can select display windows to display any information input to and/or resulting from the methods described herein.

The integrated real time performance monitoring method is unique in its approach to well management. It enables operators to demonstrate effective and safe management of wells and allows engineers to focus on optimizing the value of the asset, not searching for data which can lead to delays and potentially errors in analysis.

FIGS. 18-21 illustrate an embodiment of the performance monitoring phase which includes monitoring one or more individual wells, identifying underperforming wells and/or indicating opportunities for improvement. In this embodiment, a performance index is calculated for each monitored well, which may be used to identify improvement or optimization opportunities. Each of FIGS. 18-21 may represent all or a portion of a display that can be accessed, adjusted and inspected by a user.

Multiple performance indicators or key performance indicators (KPIs) are selected, which in this embodiment include model deviation, production or rate deviation, production decline and data quality. Other performance indicators or KPIs may be used in addition to and/or in place of one or more of the above KPIs.

For example, as shown in FIG. 18, a rate deviation calculation is performed based on measured production values 150 and/or production history data 152, and a comparison to an expected production rate or rate target 154. In this example, a deviation tolerance (e.g., 3%) is selected and may be changed by a user via a user interface.

Figure 19:
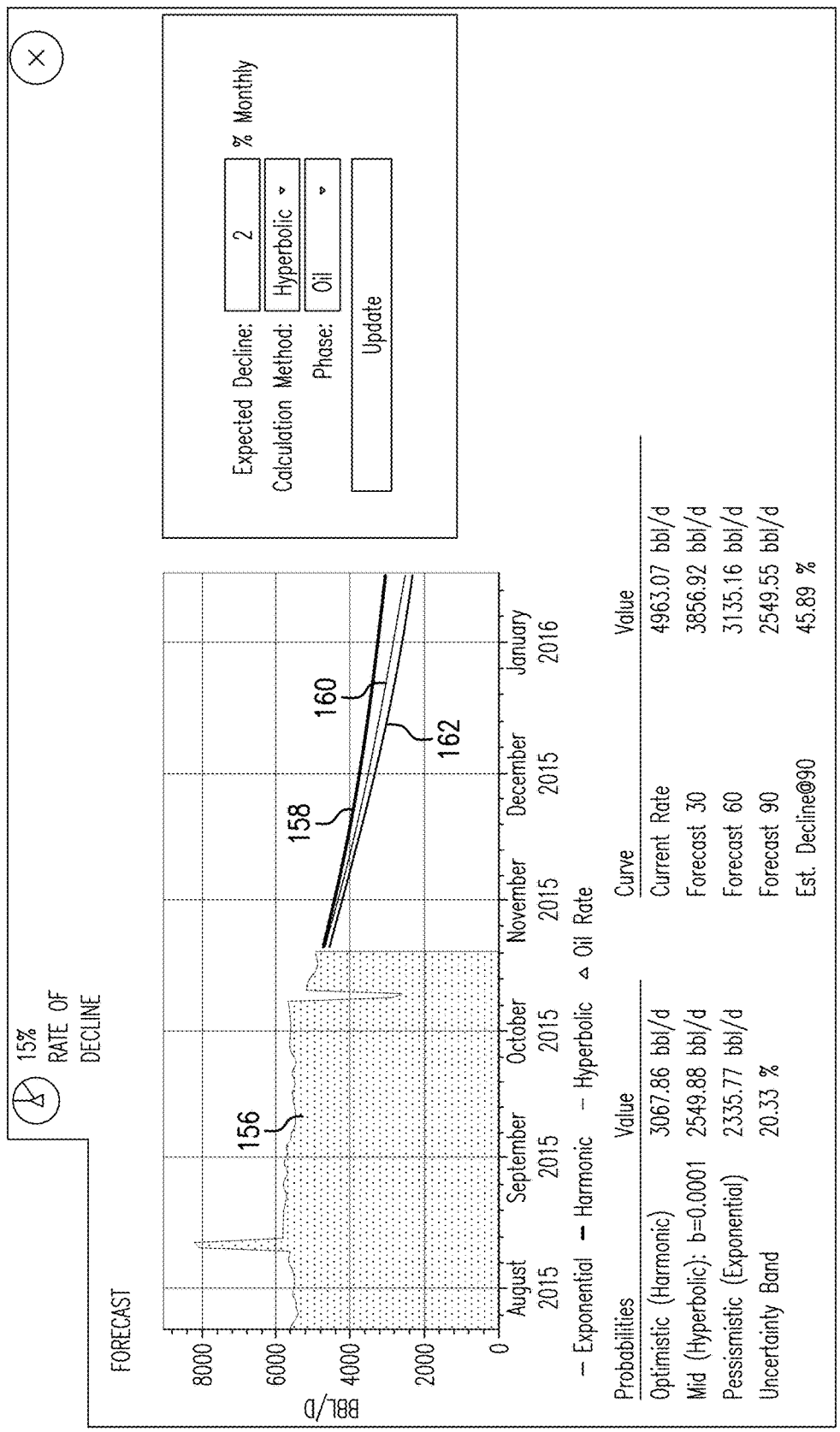
FIG. 19 depicts an example of production rate decline data that can be used in performance monitoring.

An expected decline indicator is calculated based on measured oil production rates (bbl/d) by curve fitting using a selected curve fitting method. For example, FIG. 19 shows production rates 156 and an expected decline value (in percentage) calculated using hyperbolic curve fitting. Multiple curve fitting methods can be chosen or selected as shown in FIG. 19, which illustrates decline curves 158, 160 and 162 for harmonic, hyperbolic and exponential fits respectively. As shown, each KPI may be set with dynamic boundaries instead of fixed limits, to allow wells to drift and perform within acceptable performance limits, e.g., to avoid noisy KPIs or false alerts. The KPIs may be monitored as discussed herein to identify opportunities for improvement and/or to detect abnormal well performance.

The model deviation may be used as a performance indicator, and may also be used for updating or adjusting models of the operation, borehole and/or formation (e.g., in real time during the operation)

Figure 21:
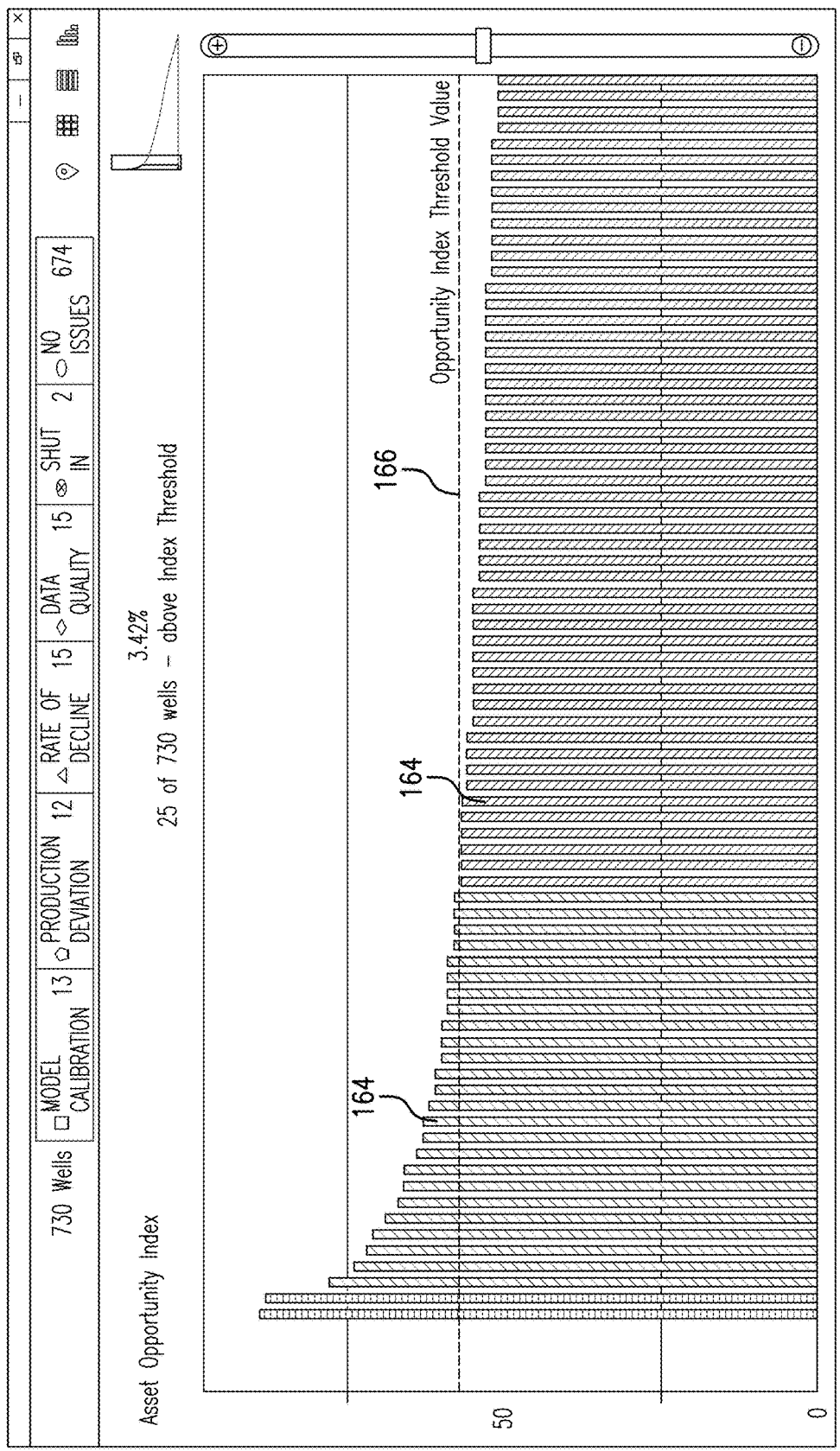
FIG. 21 depicts an example of tracking well performance using an opportunity index.
Figure 22:
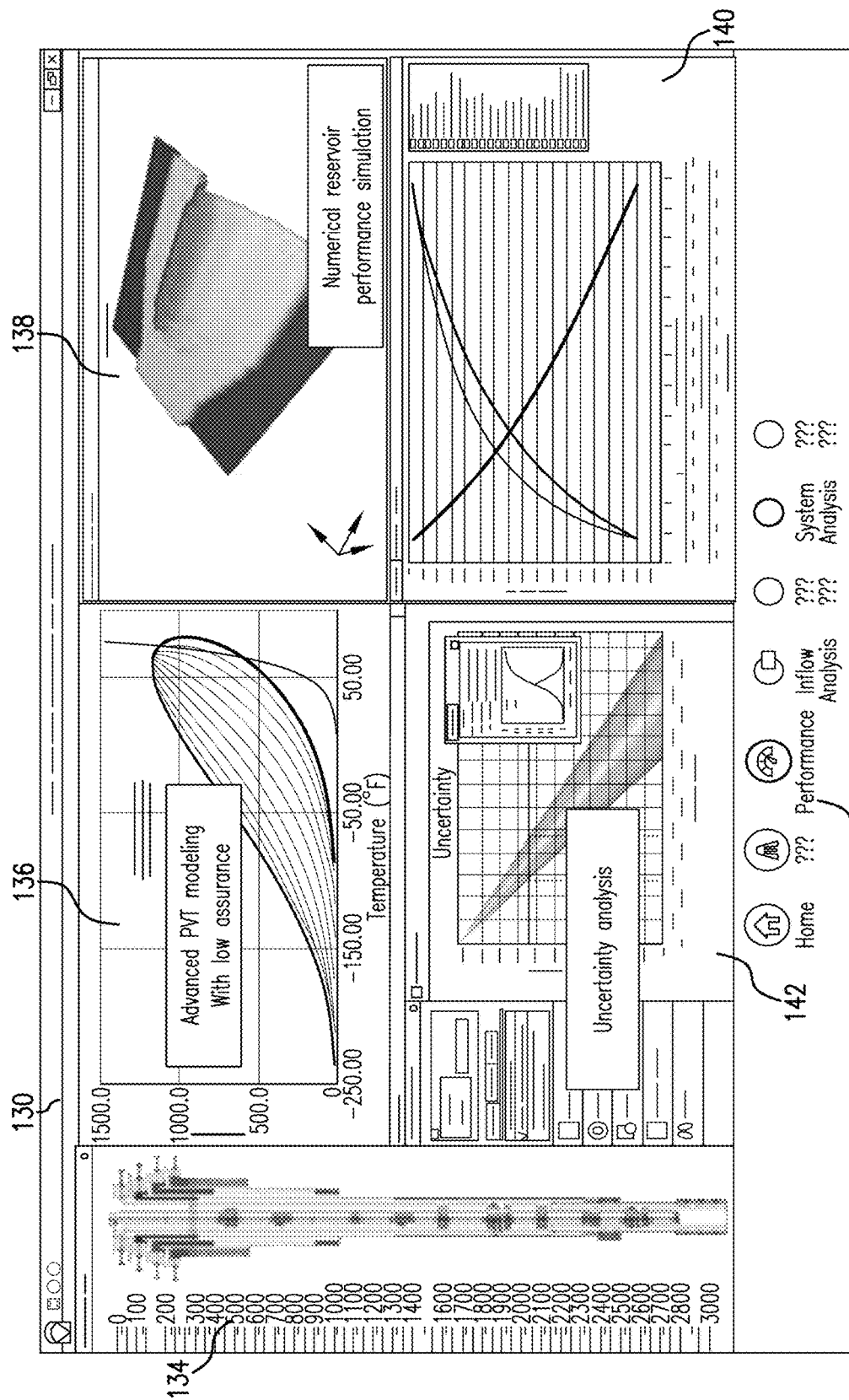
FIG. 22 depicts an example of a user interface.

The performance indicators are combined to generate a performance score or ranking, shown for example in FIG. 21 as an opportunity index calculated as a function of the performance indicators including model deviation or calibration (A), production deviation (B), rate of decline (C), data quality (D) and weighting factors (E). The opportunity index is also a function of well test data.

Figure 20:
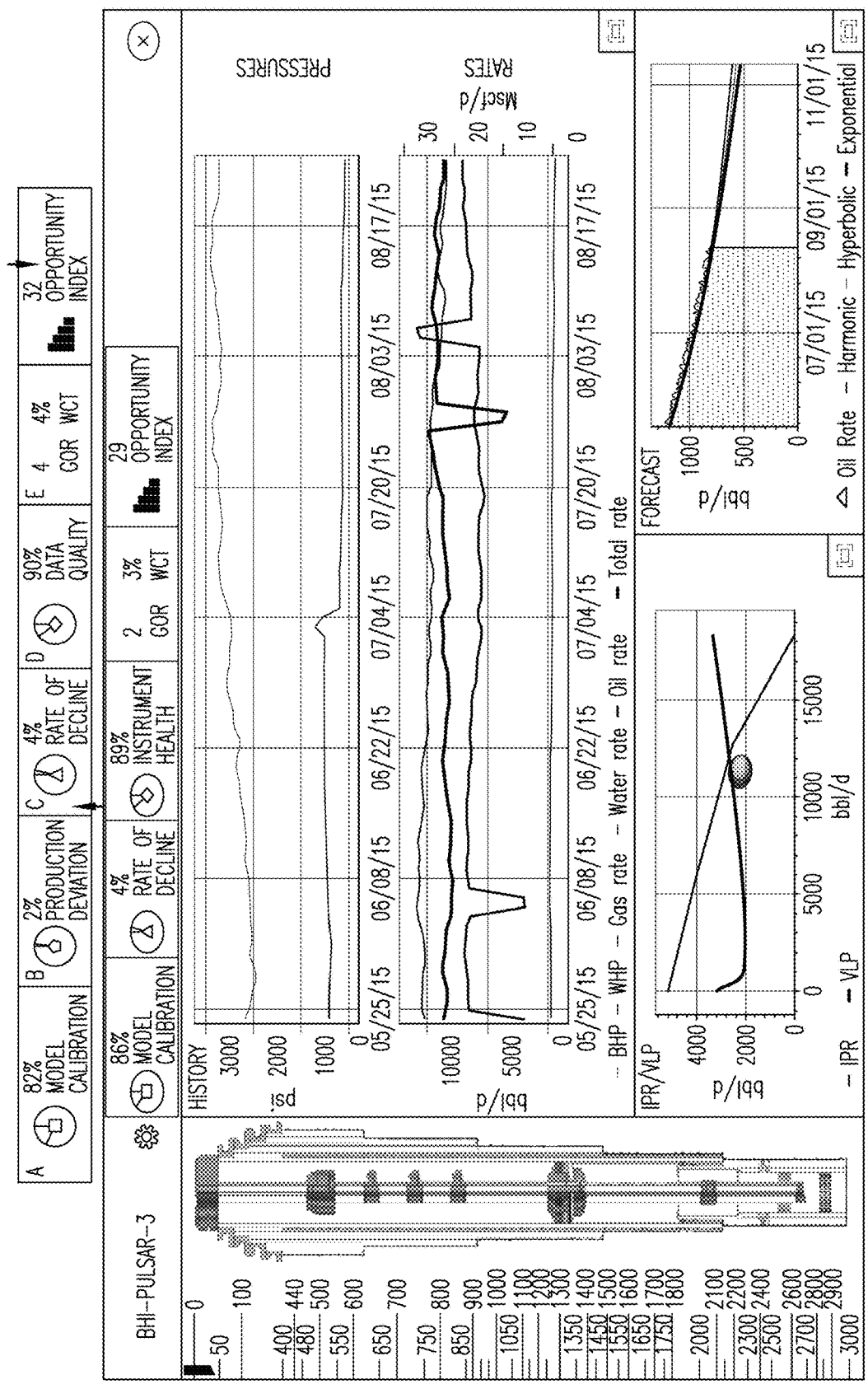
FIG. 20 depicts an example of an opportunity index calculation.

Each well can be monitored by tracking the performance index over time and comparing the performance index to a threshold value. An example of monitoring and display of performance index values 164 and a threshold 166 are shown in FIG. 20

During monitoring, measurement data and other information gathered during an operation may be input to formation and/or borehole models to integrate instrumentation data, models and test data. This integrated monitoring allows for, tracking measured performance vs. modeled performance, model calibration and/or virtual metering. In addition, model deviation is detected and can be used to adjust one or more KPIs.

Figure 23:
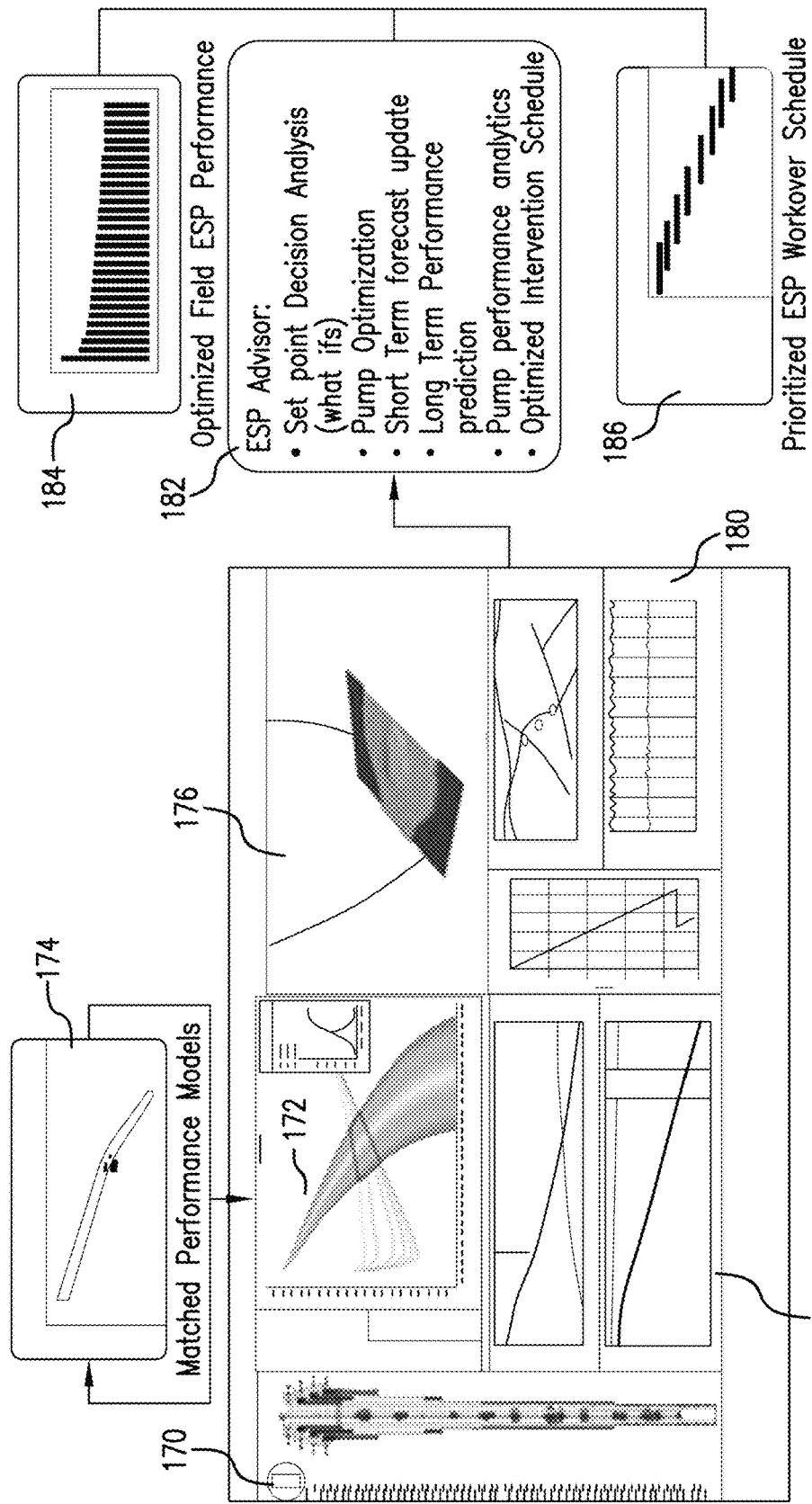
FIG. 23 depicts aspects of life of well performance modelling and integrated workflows for to enhance completion design decisions and optimize life of well performance

An example of a system and aspects of a method for design, modeling, prediction, optimization, performance monitoring and/or ranking is shown in FIG. 23. The system and method provide life of well performance model features and integration of workflows to enhance completion design decisions and optimize life of well performance for a well completed with an electrical submersible pump (ESP) for artificial lift. The workflows can model current and future state performance to enable forecasting and planning of well intervention requirements.

In this example, a user interface displays a well status diagram 170 (e.g., using CTX data), and well performance modeling and uncertainty analysis results 172 obtained by matching performance models to actual results (display 174 shows an example of matched performance models). The user interface also displays a numerical sector model 176, which can be used for life of well performance predictions and set point "what if" case analysis. The user interface also displays history matched life of well performance predictions 178. Such predictions may include or be based on, e.g., rate, water cut, pressure. Other predictions include estimated range of timing for artificial lift, and cost benefit analysis.

Other features include pump selection and well performance data 180, which allows for selection of individual wells or pumps and provides a forecast of operating conditions with time plus uncertainties. Another feature of the system and method is an ESP advisor 182, which provides various functions such as short term optimization, long term performance information, pump analytics, failure/replacement analysis and/or workover planning. For example, the advisor 182 provides set point decision analysis (the effects of various what if scenarios), pump optimization changes or suggestions, short term forecast updates, long term performance predictions, pump performance analytics data and/or an optimized intervention schedule. The ESP advisor may generate ESP performance indicators (e.g., KPIs) and optimization priorities (display 184) and a ranked replacement schedule 186 based on performance indicators.

Figure 24:
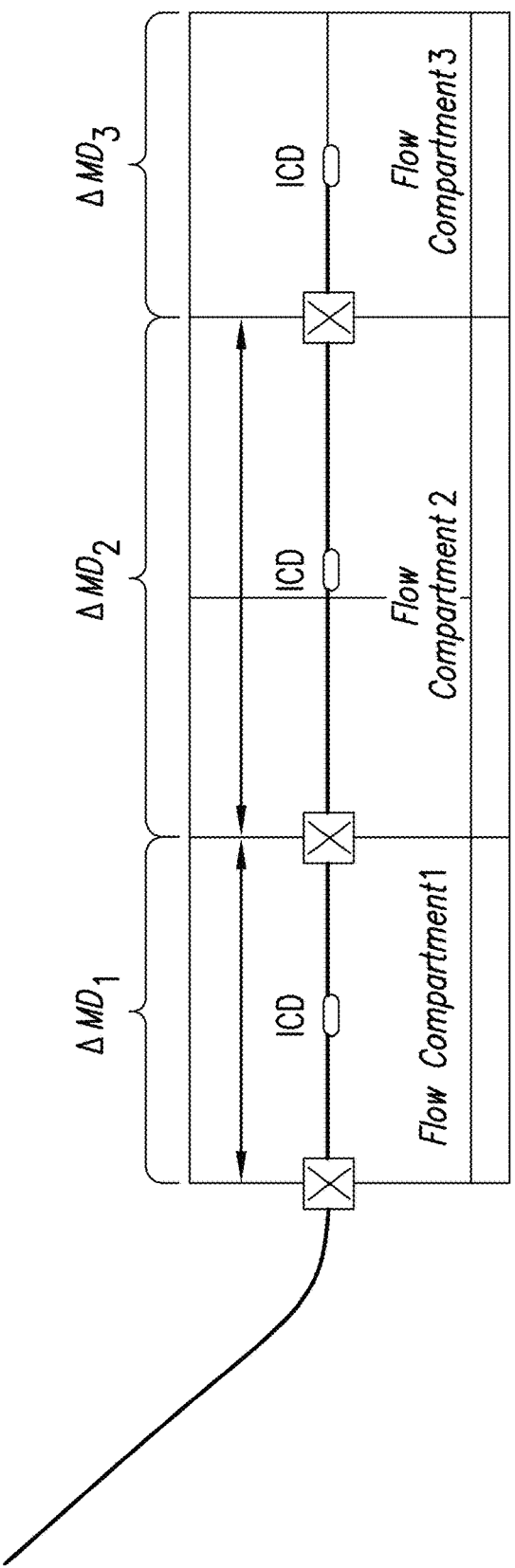
FIG. 24 depicts a portion of an example of an inflow control system using ICD.

FIGS. 24-28 illustrate embodiments of an optimization method that may be performed via the system and one or more workflows. FIG. 24 represents an example of a multiple packer system that can be modeled according to one or more of the following workflows.

In this embodiment, a first workflow is used to model components such as a number of packers and fluid control devices (e.g., ICDs). This workflow uses the location of a predefined number of packers as the design variables to optimize the system. The number of packers (N) remains constant during the optimization process, and there are (N−1) degrees of freedom. A single ICD is placed centrally between each set of packers and between the last packer and the end of the last unit for a total of (N) ICDs.

The optimization problem includes:
one statically placed packer at the head of the first unit;
two (i.e., N−1) packers are moved around within the system until an optimized system is achieved, which corresponds to two degrees of freedom: $\Delta M\,D_1$ and $\Delta M\,D_2$; and three ICDs are placed in the system, one centrally in each flow compartment created by the packers.

Another workflow uses a number of equally spaced packers as the design variable to optimize the system. There is one degree of freedom, the number (N) of equally spaced packers. A single ICD is placed centrally between each set of packers and between the last packer and the end of the last unit for a total of (N) equally spaced ICDs.

In this second workflow, there are two natural, originally-in-place units. The optimization problem includes:
one statically placed packer at the head of the first unit. If there is only one packer selected, then it is placed in this location and the ICD is centered between the beginning and end of all units; and
remaining packers are equally spaced across the system.

Various methods of optimization may be employed alone or in combination. For example, linear decomposition and combination of IPR. Another: average properties and calculation of new IPR, calculation of new IPR on smallest units.

Figure 25:
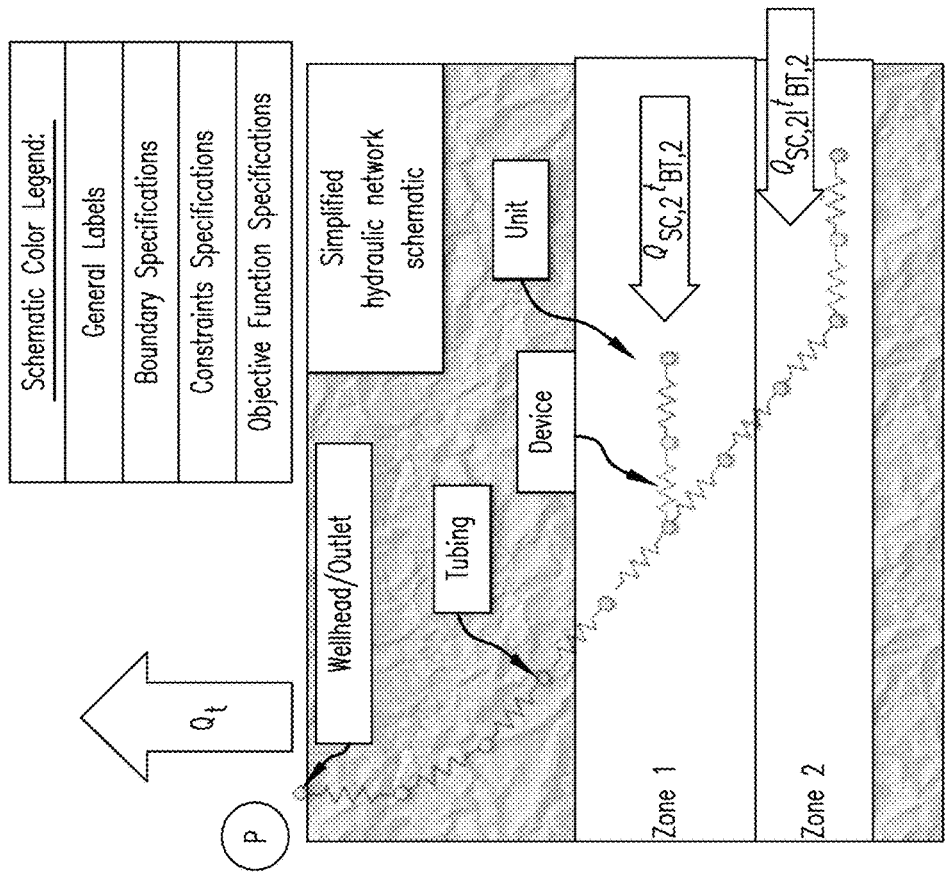
Figure 26:
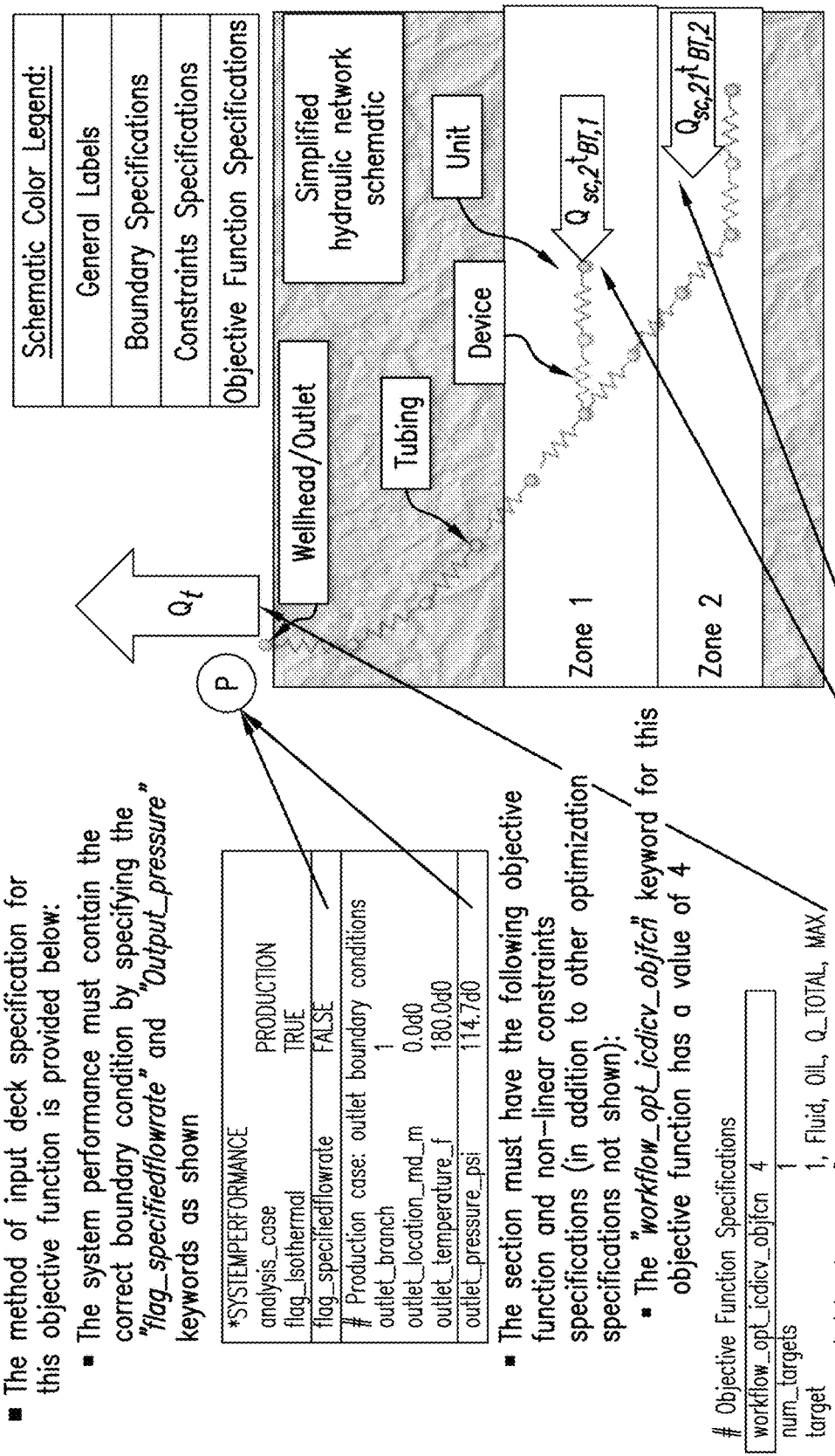

In one embodiment, optimization is performed using one of a number of objective functions. A first objective function is designed to maximize total system flow rate and to control or delay breakthrough time (or limit flow rates) in individual units. The flow rate is maximized through the objective function of the optimization problem. The per unit breakthrough time or flow rate is limited by applying non-linear constraints to the system. The first objective function my be used in an optimization method for maximizing flow rate and controlling flow or breakthrough time, an example of which is shown in FIGS. 25 and 26.

This objective function is one of the most general and practical and requires the least amount of information to use. It does not rely on prescribed target flow rate or breakthrough times, which may be difficult or require extra work to know a priori. It only requires an estimate of the limiting breakthrough time or flow rate, as opposed to trying to obtain an exact target. Non-linear constraint functionality to implement this objective function is explained as follows.

The constraint referred to herein as the "exact L1 penalty", which is for problems of the form:

$$\text{minimize}\left[f(x) + \sum_{j=1}^{n} c_j \max(g_j(x), 0)\right]$$

subject to variable bounds: [l≤x≤u],
where f(x) is the main objective function, x is a set of design variables bounded by lower (l) and upper (u) bounds, $c_j$ are a set of n penalty parameters, and g(x) is a constraint value function of the form $g_j(x) \leq 0$ which only has an effect if the constraint is violated.

When constraints are violated, as per the equation above, a positive value is applied to the objective function to signal a value that cannot possibly be an optimally feasible solution.

The penalty parameter is of the form:

$$c_j = \lambda \left[ 1 + \frac{(B_m - B_{m,constraint})}{B_m, \text{constraint}} \right]$$

where $\lambda$ is a penalty factor and $B_m$ is the limited variable in the constraint function, per unit m, defined by $g(x)=B_m-B_{m,constant}<0$ This form serves two purposes: to give a normalized relative weighting to each of the constraints, and to provide a slope to the penalty parameter as the constrained value is further from the prescribed constraint condition. This provides a way to encourage convergence as "more" infeasible samples will have larger penalty values. This is opposed to applying a constant penalty which will cause too much time to be spent on a flat or nearly constant penalty surface.

The caveat of the "exact L1 penalty" method is that penalty parameter values must be appropriate for the modeled system. Smaller parameters can increase speed of optimization but can result in missing the global optimum. Larger penalty parameters can assure convergence but can bias away from feasible/infeasible result boundaries which can slow convergence. Values for $\lambda$ may be assigned by default within an optimization or modeling module based on observations of the optimization during implementation. A keyword may also be available for modification of $\lambda$ for expert users.

Figure 28:
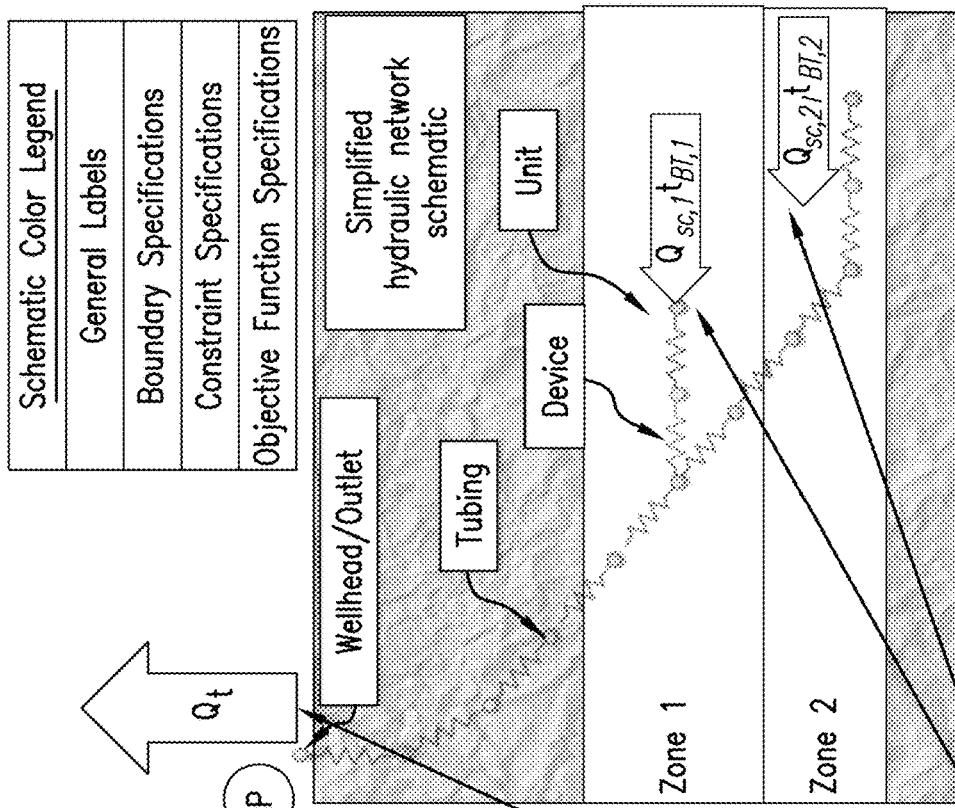
Figure 29B:
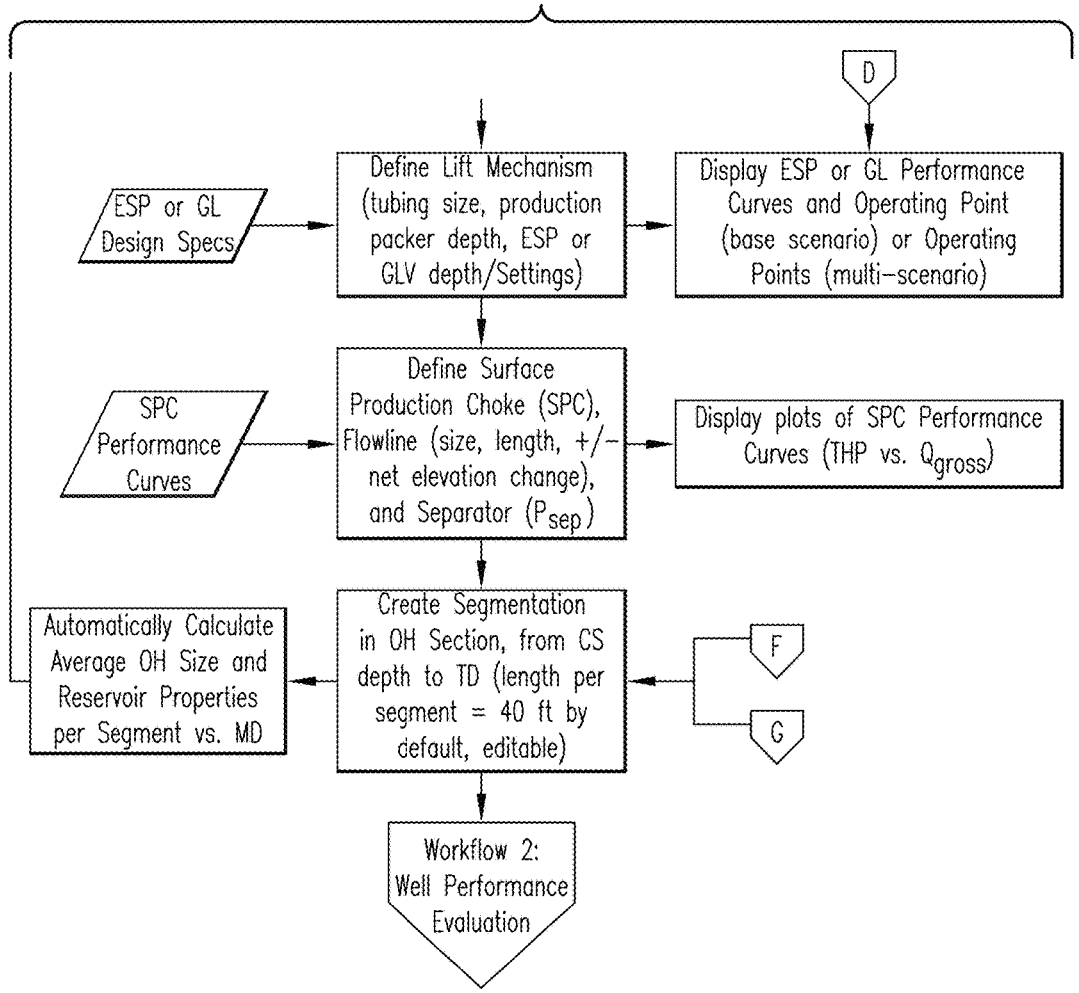
FIGS. 29-32 depict examples of ICD workflows for performing simulation, modeling and component design optimization.
Figure 30B:
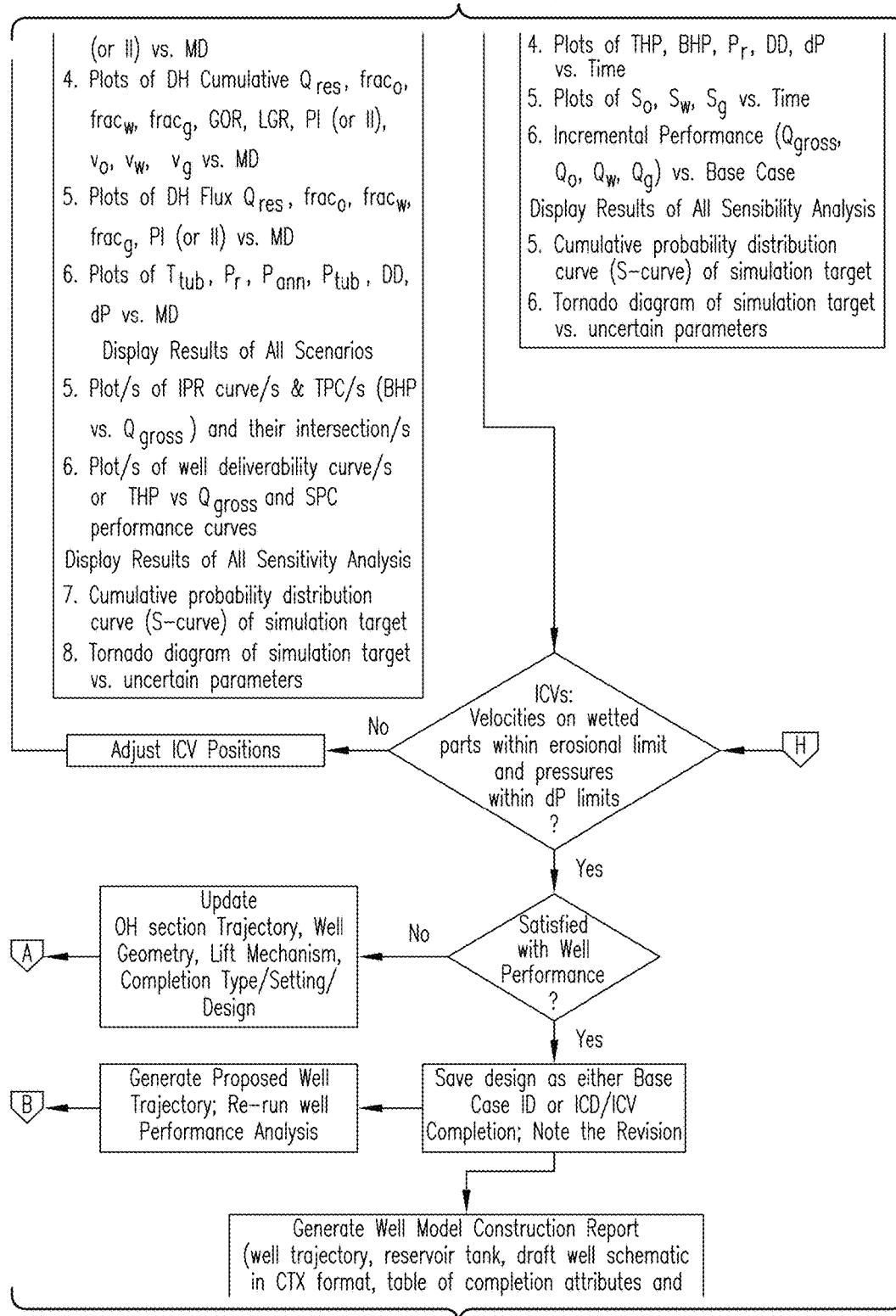
Figure 30C:
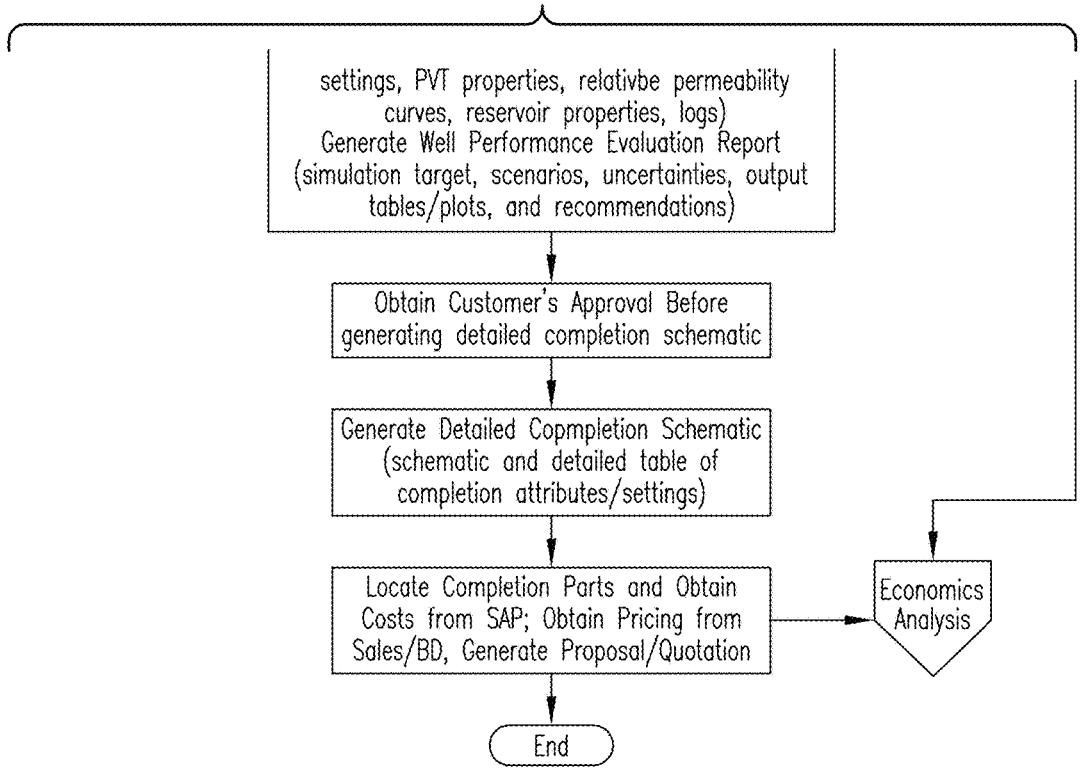
Figure 31A:
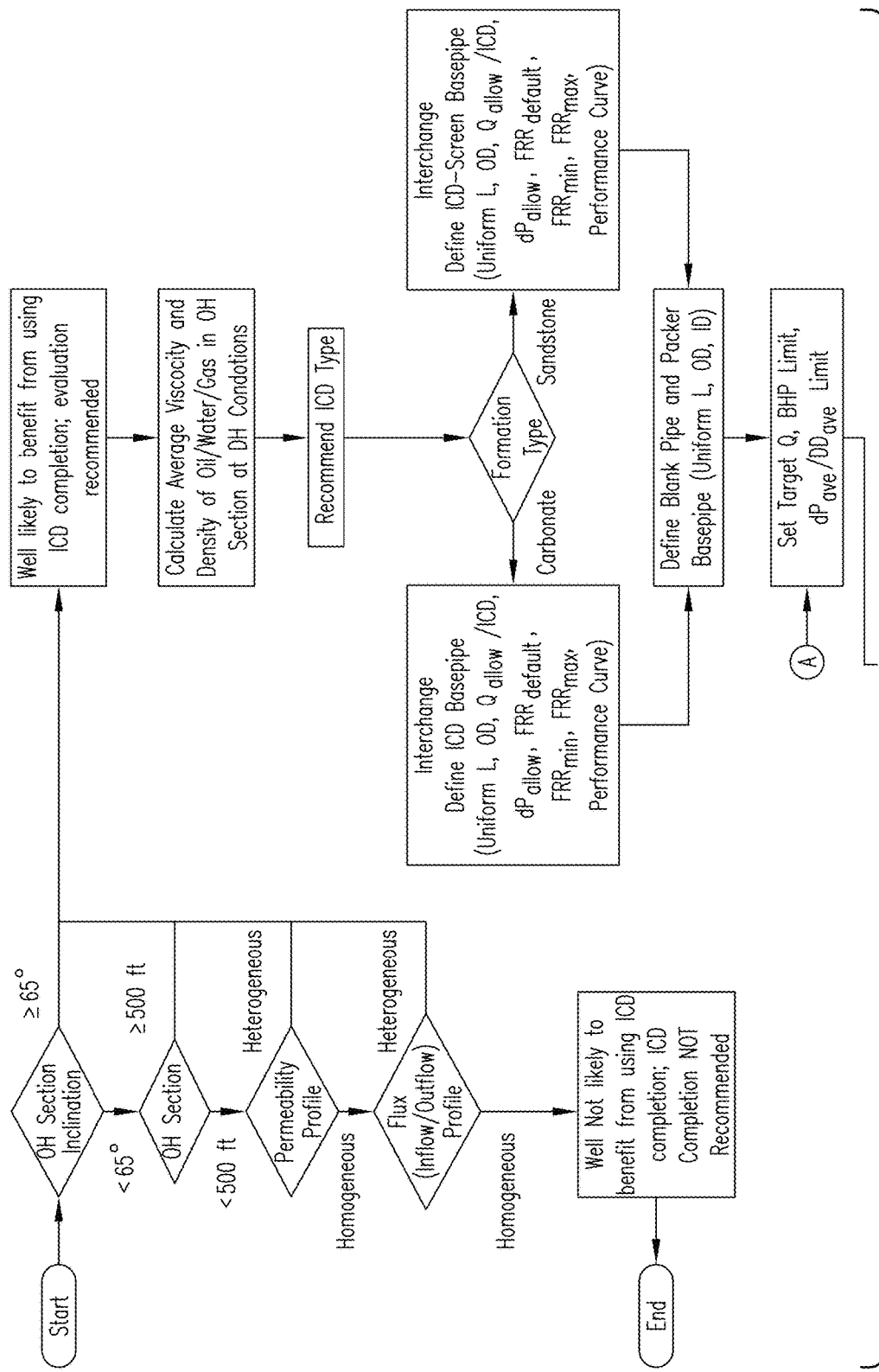
Figure 31B:
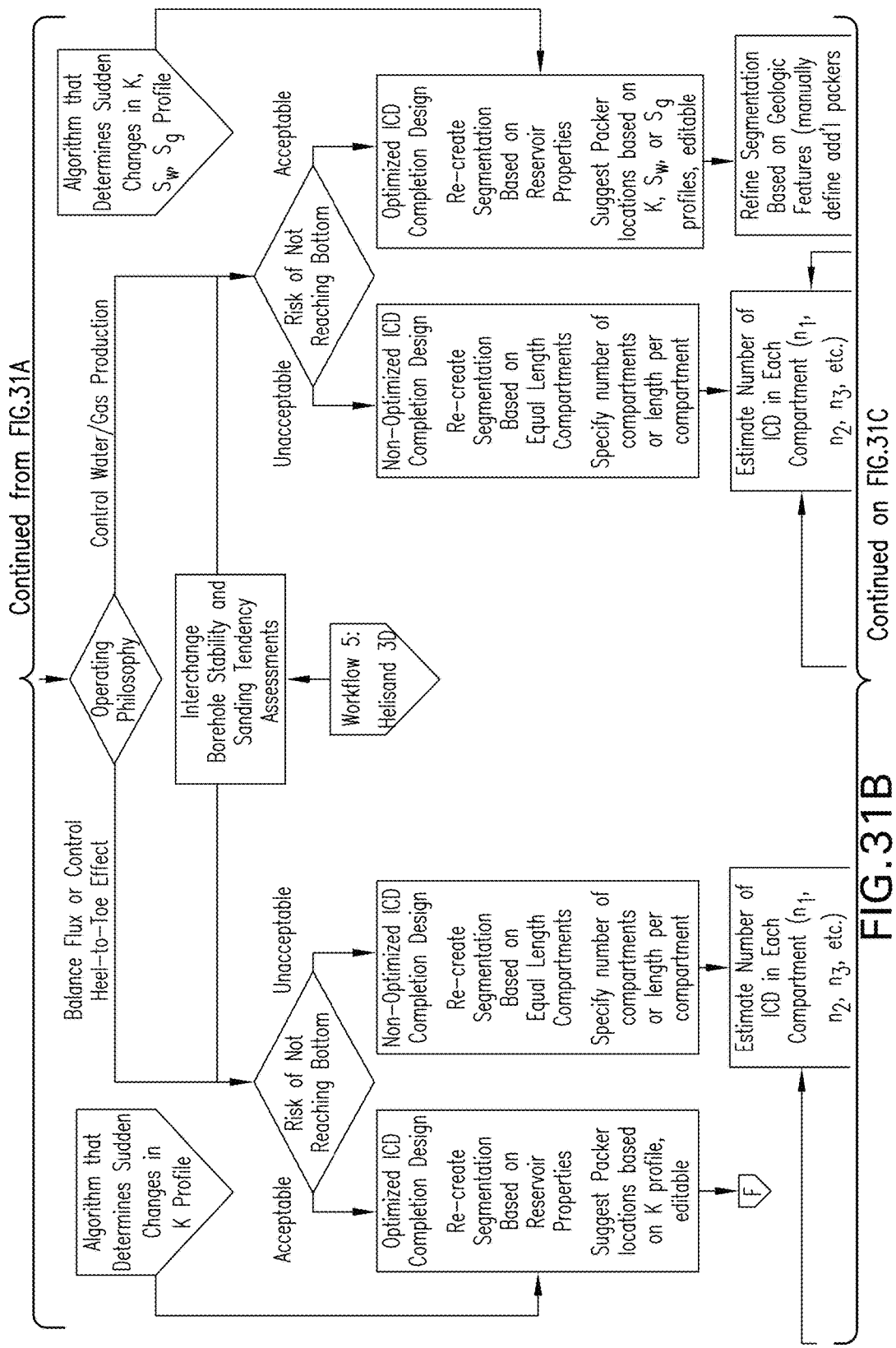
Figure 32A:
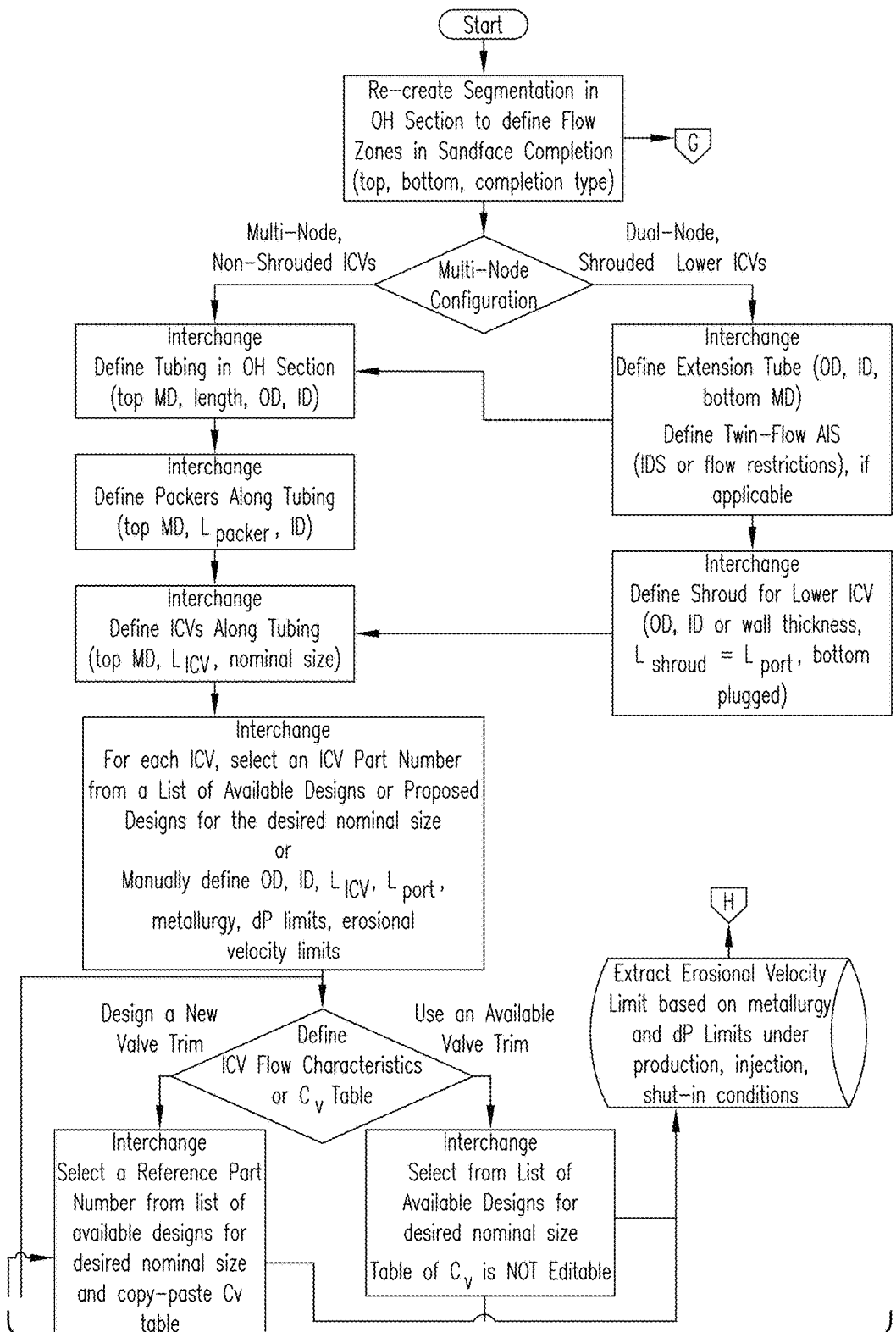
Figure 32B:
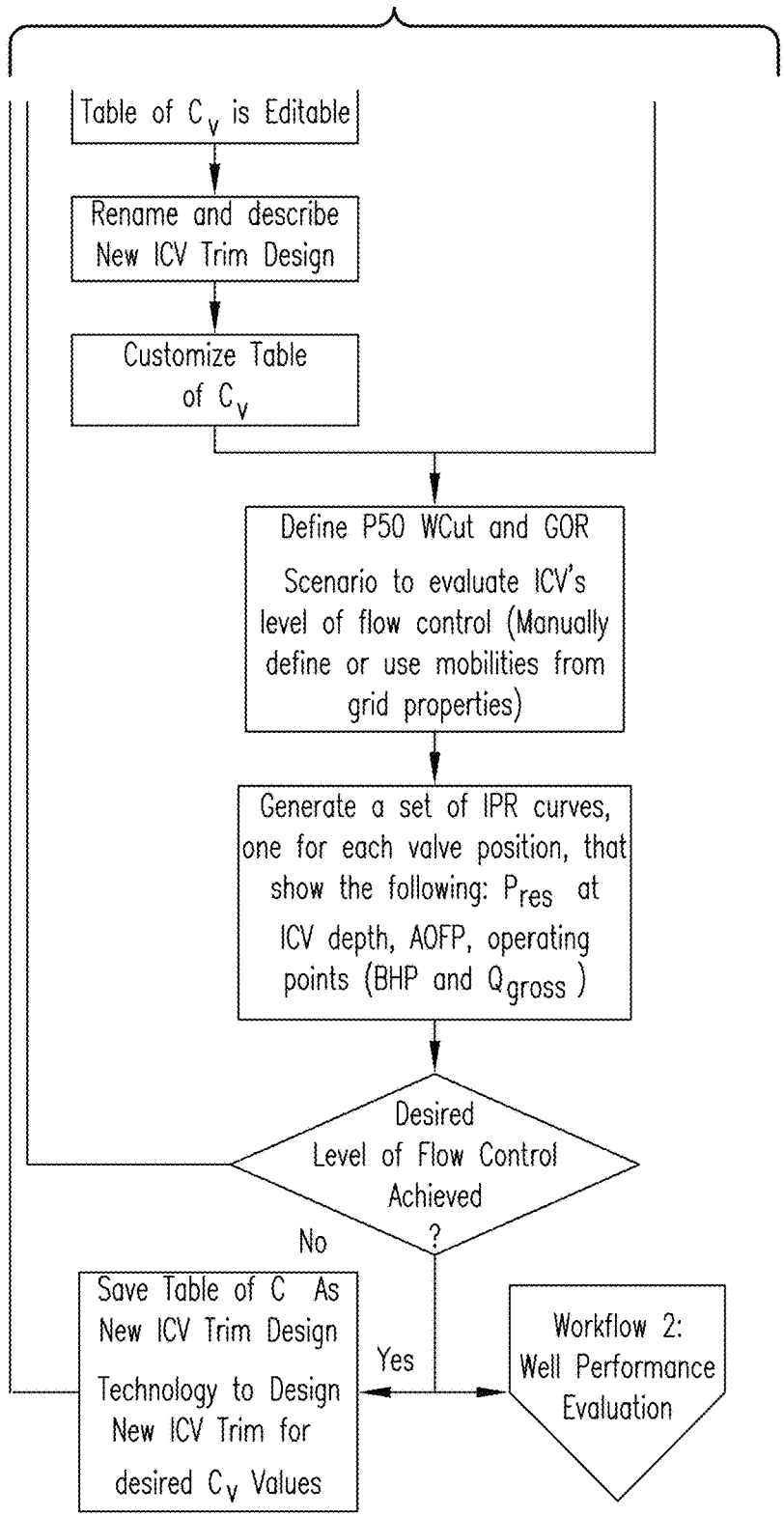

A second objective function is introduced to facilitate packer completion optimization of an unknown number of packers, and subsequently an unknown number of pseudo-units. This is similar to the first objective function except the breakthrough time constraint value is specified globally. Global specification is provided since the number of flow compartments and their defining bounds changes as the packers are moved and/or added. The second objective function my be used in an optimization method for maximizing flow rate and controlling global breakthrough time, an example of which is shown in FIGS. 27 and 28.

FIGS. 29-32 illustrate additional examples of workflows that may be generated by the system. The workflows are denoted as Workflow 1 through Workflow 4, which may operate in conjunction and include interchanges as illustrated. In the example workflow of FIG. 32, the following premises may be employed:

A library of available Inflow Control Devices and/or Valves should be available in a drop drown menu. Each ICD or ICV listed should have the nominal size and description.

As a completion component, an ICD or ICV is represented as a short piece of pipe with ID, ODICV, LICV.

The location of tungsten carbide trim (port) along LICV is specified as some distance, Lport, from the bottom.

The port is represented as a point, i.e. very short length (~1 ft).

The ICV position, which determines the port size, should be manually specified.

The bottom is always open to flow by default. If the ICV is shrouded, the bottom is automatically plugged.

Attributes of shroud: OD and ID or wall thickness should be specified while length equals Lport.

Metallurgies and corresponding erosional velocity limits (e.g. API RP 14E C Factor) should be specified for erosional flowrate calculations.

For each ICV, a set of IPR curves will be generated, one for each valve position, that shows the following: Pres at ICV depth, OFP, operating points (BHP and Qgross).

Pres, BHP, THP, Qgross, % Qgross, Qo, Qw, Qres, WCut, GOR, dP, should be shown as points in Cumulative and Flux plots vs. MD.

The following acronyms and abbreviations are used in the workflows of FIGS. 24-27 and/or the above descriptions:
AIS: absolute isolation system
AOFP: absolute open flow potential
B: formation volume factor (gas, oil, water)
BD: business development
BHP: bottom hole pressure
BP: blank pipe
BUP: build-up pressure
CL: cemented liner
CS: casing shoe
Cv: flow coefficient
DD: drawdown
DDave: average drawdown
DH: downhole
dP: pressure drop across completion
dPallow max: allowable pressure drop across ICD
dPave: average pressure drop across completion
dPmax: maximum pressure drop across completion
dPmin: minimum pressure drop across completion
ESP: electric submersible pump
frac inflow volume fraction (gas, oil, water)
FRRdefault: default flow resistance setting of ICD
FRRmax: maximum flow resistance setting of ICD
FRRmin: minimum flow resistance setting of ICD
GL: gas lift
GLV: gas lift valve
GOC: gas-oil contact
GOR: gas-to-oil ratio
GP: gravel pack
ICD: inflow control device
ICV: interval control valve
ID: internal diameter
II: injectivity index (gas, oil, water)
IPR: inflow performance relationship
K: permeability
L: length (packer, ICV, shroud, OH)
Lport: distance of port from bottom of ICV
MD: measured depth
ni: number of ICDs in each compartment
OD: outside diameter
OH: open hole
P50: most likely scenario
Pann: annular pressure
PCL: perforated cemented liner
PI: productivity index (gas, oil, water)
PL: perforated liner
Pr: reservoir pressure
Psep: separator pressure
Ptub: tubing pressure
PVT: pressure-volume-temperature
Q: flow rate (gas, oil, water)
Qallow: maximum allowable rate
Qgross: gross rate
Qmax: maximum rate
Qmin: minimum rate
Qres: flow rate at reservoir condition
Rs: dissolved gas-oil ratio
s: skin factor
S: saturation (gas, oil, water)
SAS: stand-alone screen
SL: slotted liner
SPC: surface production choke
STD: standard conditions TD: total depth
THP: tubing head pressure
TPC: tubing performance curve
Tr: reservoir temperature
Ttub: tubing temperature
v: velocity (gas, oil, water)
WCut: water cut
WOC: water-oil contact
Z: gas compressibility factor
$\Phi$: porosity
$\rho$: density
$\mu$: viscosity Embodiments described herein provide numerous advantages. For example, the embodiments provide reservoir development and production management tools that allow data to be processed via integrated workflows and analyzed more rigorously across the classical discipline boundaries to ensure effective exploitation of the reservoir's resources throughout its lifecycle. The embodiments also present solutions that deliver high performance wells and completions that yield the predicted recoveries per well and well production rates so that well count can be reduced, reliable wells and completions to avoid incurring the high cost of intervention, and robust reservoir management and flow assurance solutions consistent with the complexities of subsea development and operations that provide flexibility to respond to production uncertainties. Additional advantages include:
Integrated, Configurable Workflows;
Integration of legacy and new software applications;
Vendor neutral platform—flexibility for client preferences;
Collaborative User Environment/Interactive Interface;
Rapid access to and assimilation of Well Completion & Production Data; and
Support variety of End user Environments.

Embodiments described herein provide for seamless adaptive real-time data assimilation to allow the processing device to continually reduce uncertainty in predictive models for better prognosis and optimization decisions. In addition, the processing system and method perform adaptive modeling by adjusting models and/or workflows to match the availability of type of data.

The integrated workflows may be used for prognosis of operational risks such as lift requirement, and lift equipment efficiency reduction due to dynamic conditions. For example, model based estimation of ESP degradation leads to time estimation of equipment life time or help to find optimum operational conditions to extend equipment life.

Embodiments described herein provide a hybrid approach to real-time diagnostics of well and/or individual equipment issues that combines high frequency data analysis and modeling. Current state-of-the-art techniques employ either a data only statistical approach or offline use of modeling in disjointed manual processes that are far less efficient and error prone. For example, real-time detection of multi-point injection using modeling of gas lift valve performance with surface data leads to more efficient gas lift operation without delays, thus reducing loss of production.

Embodiments can be performed for treatment of all field components as a complete system to better understand the sensitivity of the system to uncertainty in data and model parameters. This is usually not done in existing systems because the uncertainty analysis only available for certain components (mostly reservoir simulation) and the system is usually handled as decoupled components in offline manual analysis.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

The invention claimed is:

1. A method of performing aspects of an energy industry operation, the method comprising:
receiving input data at an integrated analysis system, the input data describing an assembly for performing the energy industry operation, the integrated analysis system including an analysis module and a production performance;
simulating the energy industry operation by the analysis module, wherein simulating includes predicting values of an operational parameter via one or more mathematical models of the assembly and a formation region, and estimating an uncertainty range of at least one of the input data and the predicted values of the operational parameter module;

generating a performance envelope based on the predicted values and the uncertainty range, the performance envelope prescribing a range of operational parameter values, wherein generating the performance envelope includes calculating a range of predicted inflow rates as a function of fluid pressure, predicting a range of fluid outflow rates, and calculating the performance envelope based on an intersection between the range of predicted inflow rates and the range of fluid outflow rates;

generating an operating envelope by the analysis module, the operating envelope prescribing operating constraints on the operational parameter;

during the energy industry operation, receiving real time measurements of the operational parameter by the production performance module, and comparing the measured operational parameter to the operating envelope and the performance envelope; and based on the measured operational parameter being outside the performance envelope, controlling the energy industry operation to adjust the operational parameter to return the operational parameter to within the performance envelope.

2. The method of claim 1, wherein the energy industry operation is a production operation, and the operational parameter includes a fluid flow rate as a function of fluid pressure.

3. The method of claim 2, wherein generating the operating envelope includes estimating a downhole condition for a plurality of operational parameter values via the one or more models of the assembly and the formation region, comparing the downhole condition to a plurality of risk factors, estimating a parameter limit associated with each risk factor, and combining the parameter limits to generate an integrated operating envelope.

4. The method of claim 1, further comprising generating customizable workflows for generating the operating envelope and the performance envelope.

5. The method of claim 1, wherein generating the operating envelope includes receiving a plurality of risk factors associated with the energy industry operation, and calculating a minimum parameter limit for each risk factor.

6. The method of claim 5, further comprising receiving measured operational parameter values at a plurality of sample times during the energy industry operation, and comparing the measured operational parameters to the predicted values at each sample time.

7. The method of claim 1, further comprising, in response to the measured operational parameter being outside of the performance envelope, generating an indication that a borehole associated with the energy industry operation is underperforming, and storing the indication in an opportunity register, wherein the borehole associated with the energy industry operation is considered underperforming when the measured operational parameter is outside of the performance envelope.

8. The method of claim 1, wherein comparing the measured operational parameter is performed for each of a plurality of sample times during the energy industry operation.

9. The method of claim 1, wherein controlling the energy industry operation includes receiving measured operational parameter values at a plurality of sample times during the energy industry operation, and performing at each sample time:

comparing a current measured operational parameter value to the operating envelope;

in response to the current measured operational parameter value being within the operating envelope, comparing the current measured operational parameter to the performance envelope; and in response to the current measured operational parameter being outside the performance envelope, adjusting the operational parameter until a subsequent measured operational parameter value is within the performance envelope.

10. A system for performing aspects of an energy industry operation, the system comprising:

an assembly including one or more components configured to be disposed in a borehole during an energy industry operation;

a sensor configured to measure an operational parameter of the energy industry operation; and a processing device configured to perform:

receiving input data at an integrated analysis system, the input data describing the assembly, the integrated analysis system including an analysis module and a production performance module;

simulating the energy industry operation by the analysis module, wherein simulating includes predicting values of an operational parameter via one or more mathematical models of the assembly and a formation region, and estimating an uncertainty range of at least one of the input data and the predicted values of the operational parameter;

generating a performance envelope based on the predicted values and the uncertainty range, the performance envelope prescribing a range of operational parameter values wherein generating the performance envelope includes calculating a range of predicted inflow rates as a function of the fluid pressure, predicting a range of fluid outflow rates, and calculating the performance envelope based on an intersection between the range of predicted inflow rates and the range of fluid outflow rates;

generating an operating envelope by the analysis module, the operating envelope prescribing operating constraints on the operational parameter;

during the energy industry operation, receiving real time measurements of the operational parameter by the production performance module, and comparing the measured operational parameter to the operating envelope and the performance envelope; and based on the measured operational parameter being outside the performance envelope, controlling the energy industry operation to adjust the operational parameter to return the operational parameter to within the performance envelope.

11. The system of claim 10, wherein the energy industry operation is a production operation, and the operational parameter includes a fluid flow rate as a function of fluid pressure.

12. The system of claim 11, wherein generating the operating envelope includes estimating a downhole condition for a plurality of operational parameter values via the one or more models of the assembly and the formation region, comparing the downhole condition to a plurality of risk factors, estimating a parameter limit associated with each risk factor, and combining the parameter limits to generate an integrated operating envelope.

13. The system of claim 10, wherein the processing device is configured to further perform generating customizable workflows for generating the operating envelope and the performance envelope.

14. The system of claim 10, wherein generating the operating envelope includes receiving a plurality of risk factors associated with the energy industry operation, and calculating a minimum parameter limit for each risk factor.

15. The system of claim 14, wherein the processing device is configured to further perform receiving measured operational parameter values at a plurality of sample times during the energy industry operation, and comparing the measured operational parameters to the predicted values at each sample time.

16. The system of claim 10, wherein the processing device is configured to further perform, in response to the measured operational parameter being outside of the performance envelope, generating an indication that a borehole associated with the energy industry operation is underperforming, and storing the indication in an opportunity register, wherein the borehole associated with the energy industry operation is considered underperforming when the measured operational parameter is outside of the performance envelope.

17. The system of claim 10, wherein comparing the measured operational parameter is performed for each of a plurality of sample times during the energy industry operation.

18. The system of claim 10, wherein controlling the energy industry operation includes receiving measured operational parameter values at a plurality of sample times during the energy industry operation, and performing at each sample time:
  comparing a current measured operational parameter value to the operating envelope;
  in response to the current measured operational parameter value being within the operating envelope, comparing the current measured operational parameter to the performance envelope; and
  in response to the current measured operational parameter being outside the performance envelope, adjusting the operational parameter until a subsequent measured operational parameter value is within the performance envelope.

* * * * *